(12) United States Patent
Shiraishi et al.

(10) Patent No.: US 7,470,308 B2
(45) Date of Patent: Dec. 30, 2008

(54) METHOD OF PRODUCING MAGNETIC PARTICLES AND REACTION METHOD USING MICROREACTOR AND MICROREACTOR

(75) Inventors: Fumiko Shiraishi, Minami-Ashigara (JP); Seiji Sugiyama, Minami-Ashigara (JP); Koukichi Waki, Minami-Ashigara (JP); Yasunori Ichikawa, Minami-Ashigara (JP); Tomohide Ueyama, Minami-Ashigara (JP); Yasushi Hattori, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 515 days.

(21) Appl. No.: 11/054,344

(22) Filed: Feb. 10, 2005

(65) Prior Publication Data
US 2005/0223847 A1 Oct. 13, 2005

(30) Foreign Application Priority Data

| Feb. 10, 2004 | (JP) | ............................ 2004-033407 |
| Feb. 16, 2004 | (JP) | ............................ 2004-038516 |
| Feb. 16, 2004 | (JP) | ............................ 2004-038517 |

(51) Int. Cl.
*B22F 9/24* (2006.01)
(52) U.S. Cl. ........................................ 75/348; 148/105
(58) Field of Classification Search ..................... 75/348
See application file for complete search history.

(56) References Cited

U.S. PATENT DOCUMENTS 6,254,662 B1 * 7/2001 Murray et al. ................. 75/348
6,875,253 B2 * 4/2005 Daimon et al. ................. 75/255
7,066,978 B2 * 6/2006 Waki et al. ..................... 75/348
2004/0033357 A1 * 2/2004 Hattori et al. ................. 428/379

FOREIGN PATENT DOCUMENTS

| JP | 5-173267 A | 7/1993 |
| JP | 2001-256631 A | 9/2001 |
| JP | 2001-521816 A | 11/2001 |
| JP | 2001-521913 A | 11/2001 |
| JP | 2002-341477 A | 11/2002 |
| JP | 2003-6830 A | 1/2003 |
| WO | WO 99/22857 A1 | 11/1998 |
| WO | WO 99/22858 A1 | 11/1998 |
| WO | 2002/062509 | 8/2002 |
| WO | WO-2004/108330 A1 * | 12/2004 |

OTHER PUBLICATIONS

Japanese Patent Application No. 2004-033407,Office Action issued Nov. 20, 2007, and English-language translation.

* cited by examiner

*Primary Examiner*—George Wyszomierski
(74) *Attorney, Agent, or Firm*—Sughrue Mion, PLLC

(57) ABSTRACT

In a method of producing magnetic particles which includes the steps of preparing alloy particles capable of forming a CuAu or $Cu_3Au$ hard magnetic ordered alloy phase and of forming magnetic particles for forming CuAu or $Cu_3Au$ magnetic particles, a plurality of solutions L1 and L2 for preparing the alloy particles are passed in a thin-plate laminar flow and diffused in the direction perpendicular to the flow direction at the contact interface of the solutions L1 and L2 in a mixing channel by using a microreactor, whereby a uniform mixing reaction is conducted in a short time.

8 Claims, 20 Drawing Sheets

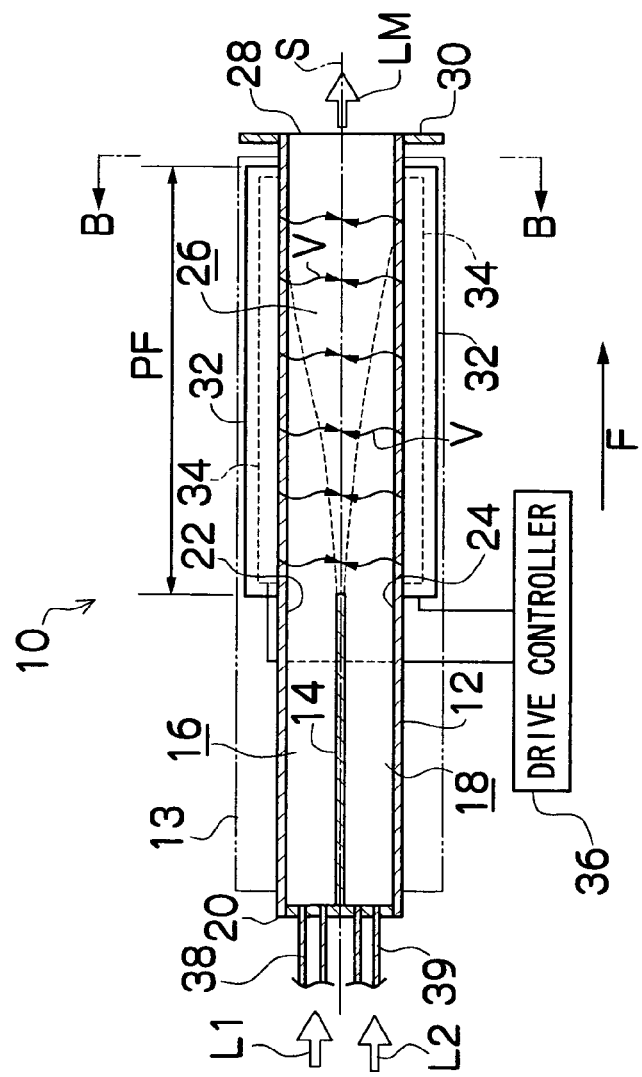
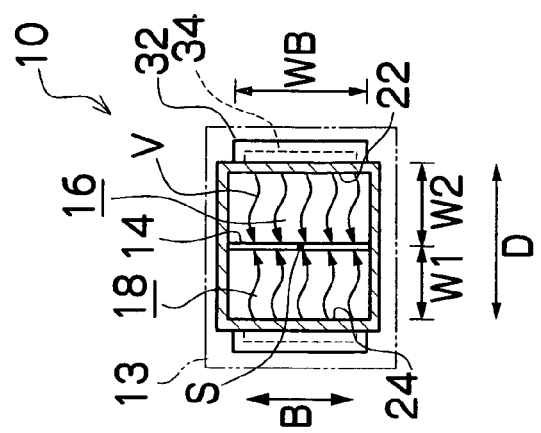
FIG.1A
FIG.1B

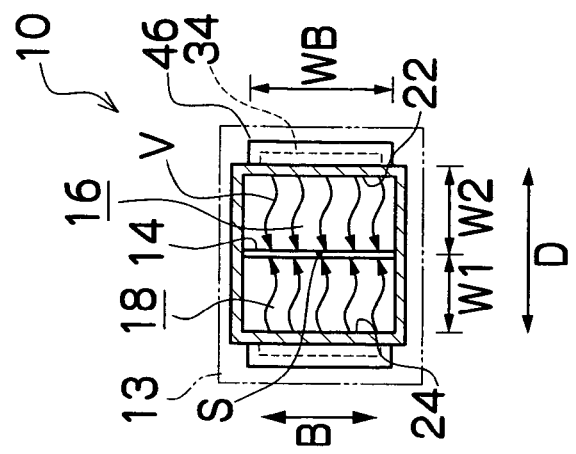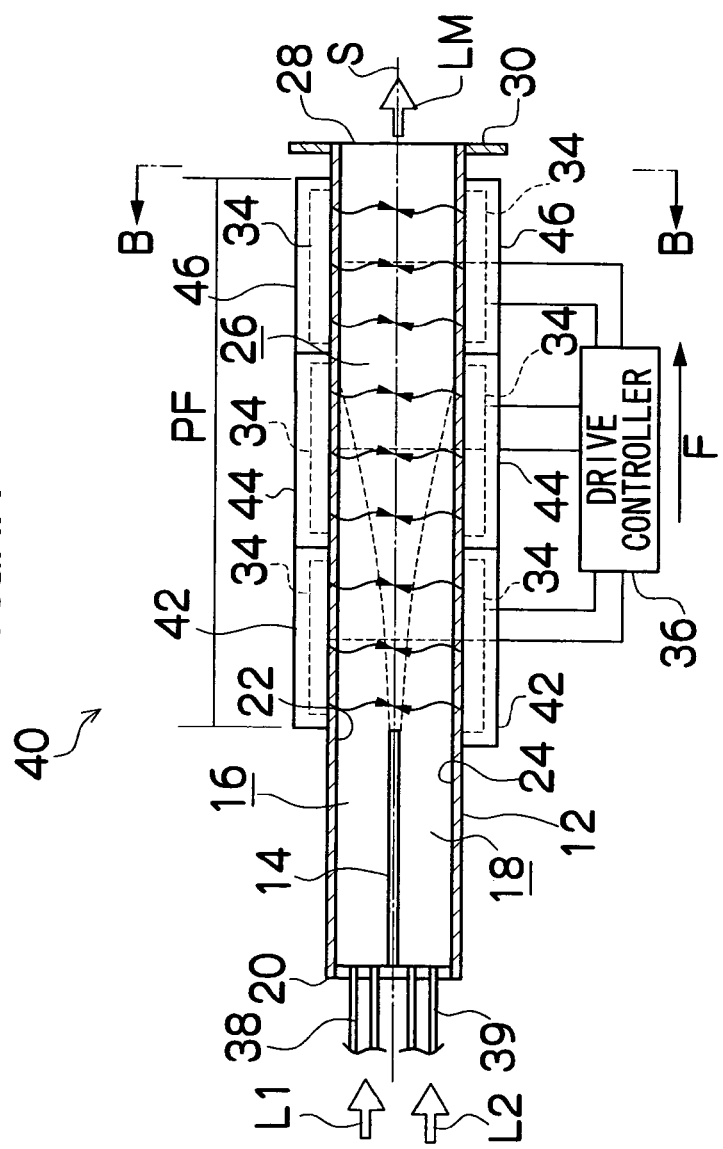

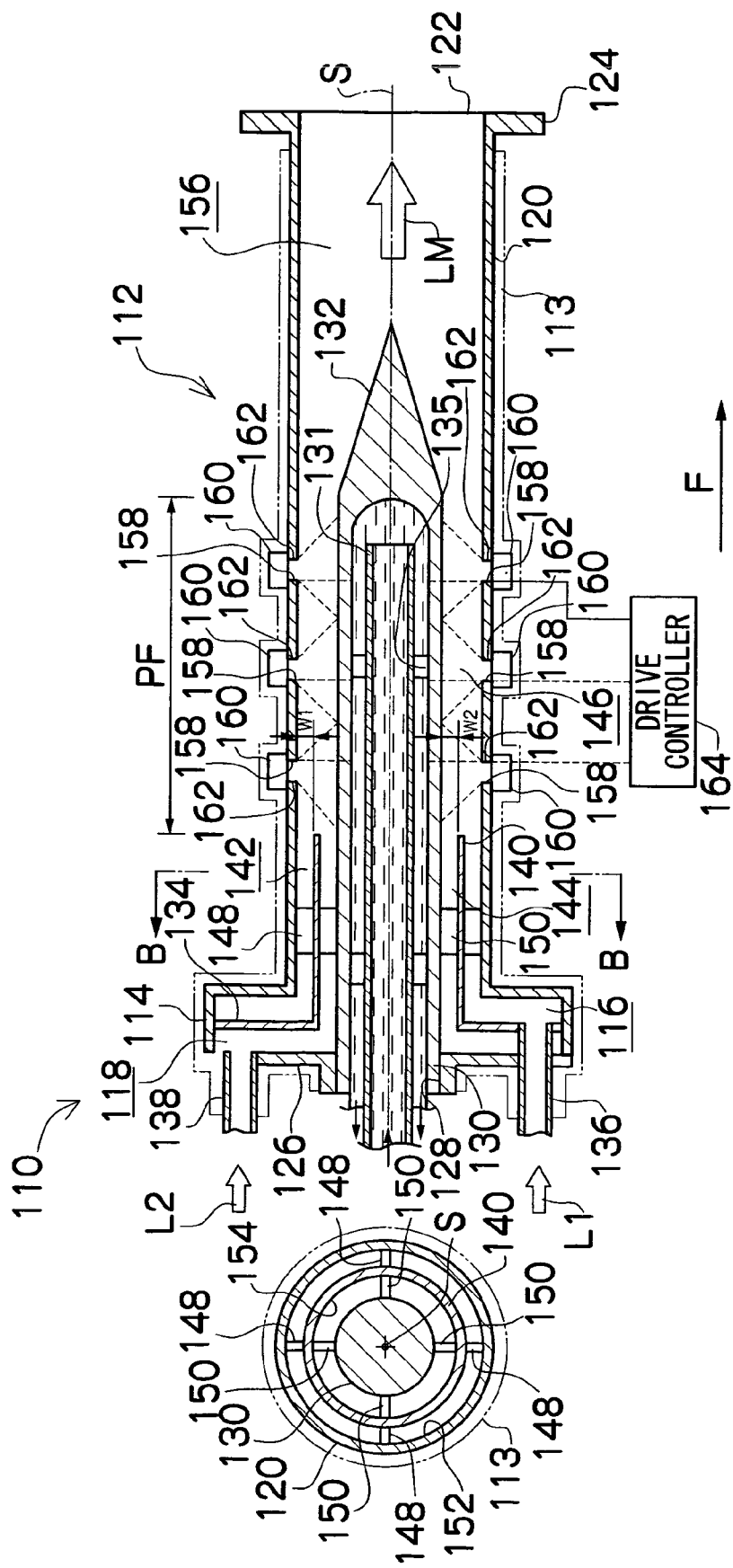

RELATED ART

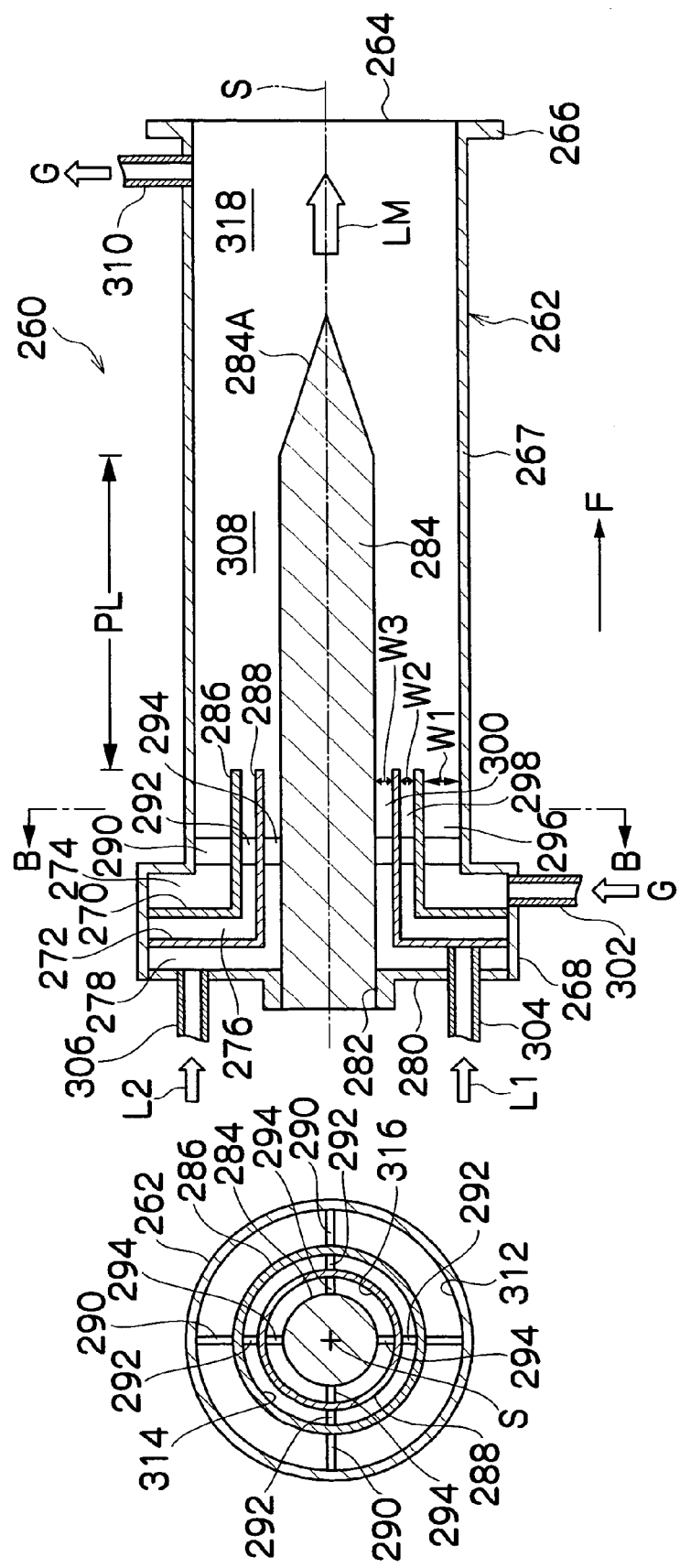

METHOD OF PRODUCING MAGNETIC PARTICLES AND REACTION METHOD USING MICROREACTOR AND MICROREACTOR

BACKGROUND OF THE INVENTION

1. Field of the Invention

The present invention relates to a method of producing magnetic particles by a microreactor and a reaction method using a microreactor suitable for producing magnetic particles involving generation of by-product gas, and a microreactor.

2. Description of the Related Art

To increase magnetic recording density, it is important to make the particle size of magnetic particles contained in the magnetic layer small. For example, in the case of widely used magnetic recording media such as videotapes, computer tapes and diskettes, the smaller the noise, the smaller the particle size when the hard magnetic materials have the same mass.

As a potential material of magnetic particles for improving the magnetic recording density, CuAu or $Cu_3Au$ hard magnetic ordered alloy has been attracting attention (e.g., Japanese Patent Application Laid-open No. 2003-6830, Japanese Patent Application Laid-open No. 2001-256631). It is known that the hard magnetic ordered alloy has large magnetocrystalline anisotropy due to the strain generated when formed into an ordered alloy and the alloy has hard magnetic properties even if the particle size of the magnetic particles is made smaller.

Magnetic particles which have hard magnetic properties are prepared by a liquid phase method or a gas phase method, but the magnetic particles immediately after being prepared by a liquid phase method which is practical and excellent in mass production are random and have a face-centered cubic structure. Crystal having a face-centered cubic structure usually has soft magnetic properties or paramagnetic properties and not suitable for magnetic recording media. For magnetic recording media, it is necessary to obtain hard magnetic ordered alloy having a coercive force of not less than 95.5 kA/m (1200 Oe). To obtain such hard magnetic ordered alloy, it is necessary to transform the random phase to an ordered phase. For this reason, the production of magnetic particles is constituted by the step of preparing alloy particles capable of forming a CuAu or $Cu_3Au$ hard magnetic ordered alloy phase and the step of forming magnetic particles for forming CuAu or $Cu_3Au$ magnetic particles from alloy particles prepared in the step of preparing alloy particles, and usually annealing treatment (heating treatment) is carried out in the step of forming magnetic particles.

However, properties of magnetic particles used for magnetic recording media are not determined only by the step of forming magnetic particles, and the important point is how to produce, in the step of preparing alloy particles, minute alloy particles excellent in monodispersibility and excellent in ease in transformation which achieves easy transformation from a random phase to an ordered phase. The alloy particles are usually prepared by mixing a plurality of solutions for preparing alloy particles by the liquid phase method described above and as a mixing reactor, one having an agitation blade in a tank as shown in FIG. 8 has been suggested (Japanese Patent Application Laid-open No. 5-173267).

In the mixing reactor 1, to stir the solution filled in a tank 2, stirring blade 5 is rotated by rotational driving force from a motor 3 utilizing magnetic force via a communicating device 4 for non-contact communication. In addition, on the outer periphery of the tank 1, to control the temperature of the solution filled inside, a temperature control device 6 for heating or cooling the solution is provided. An introduction tube 8 for introducing a solution is provided on the sealing cover 7 of the tank 2 and exhaust tube 9 for exhausting the reaction mixture is provided at the bottom of the tank 2.

As seen in International Patent Application Japanese Laid-open Nos. 2001-521913 and 2001-521816, as a reactor for increasing the product yield and the purity of the reaction product and for conducting a reaction using dangerous or explosive reagent safely, microreactors for reacting a plurality of fluids using an extremely fine microchannel (also referred to as mixing channel) having a channel width of not more than 1 mm are drawing attention. Due to the above-mentioned micro scale of the microchannel in which a reaction is conducted, the flow of the fluid flowing through the microchannel is mainly in a laminar flow. This enables liquids to be reacted to flow through the microchannel in a laminar flow even without mechanical stirring and diffuse just by spontaneous movement of the molecules, whereby a prompt reaction is achieved. Accordingly, when magnetic particles are produced using such microreactor, minute alloy particles excellent in monodispersibility and excellent in ease in transformation can be produced.

SUMMARY OF THE INVENTION

However, in the preparation of alloy particles by a conventional mixing reactor, tank 2 has a dead space and stirring of liquid becomes uneven, and particle growth of the prepared alloy particles occurs due to partial circulation in the tank 2, and there is a defect that minute alloy particles excellent in monodispersibility and excellent in ease in transformation cannot be produced. Recently, in particular, further reduced noise is demanded for widely used magnetic recording media such as videotapes, computer tapes and diskettes.

In addition, although minute magnetic particles excellent in monodisoersibility can be produced by a microreactor, some reaction involves generation of by-product gas (e.g., hydrogen gas) depending on the kind of magnetic particles and there is a problem that the conventional microreactors cannot be used for the reaction where by-product gas is generated.

The reason is that when assuming that 1 mole of by-product gas is generated, the by-product gas would have a large volume of 22.4L, causing blockage of fine microchannel and a uniform reaction cannot be conducted. That is, without efficient removal of by-product gas from the microchannel, bubbles of the generated by-product gas are accumulated and agglomerated in the microchannel and the flow in the microchannel becomes a gas-liquid mixed flow, and for example, a slug flow as shown in FIG. 17 is generated. In the slug flow, agglomerated bubbles B and liquid L to be reacted are alternately present in the flow direction of the microchannel 26. As a result, continuous line of processing of liquid L is obstructed or disturbed, and the line becomes unstable and the reaction field becomes uneven, while the equilibrium of the reaction is difficult to be shifted to the direction where the reaction is promoted. In addition, when the temperature of liquid is controlled for the reaction and if the by-product gas is not efficiently removed in the continuous processing line, the reaction temperature cannot be accurately controlled because of small thermal conductivity of the gas.

Wolfgang Ehrfeld et al., "Microreactors" published from WILEY-VCH 2000, chapter 8 (Gas/liquid Microreactors) discloses a falling-film reactor and a bubble-column reactor as a gas-liquid reaction microreactor. However, such reactors are for conducting a gas-liquid reaction and removal of by-product gas generated by a liquid-liquid reaction has not been considered at all. Accordingly, a liquid-liquid reaction where by-product gas is generated cannot be conducted appropriately using a microreactor for a gas-liquid reaction.

Under these circumstances, there is no report of a chemical reaction in a microreactor involving generation of by-product gas, and this means that kinds of chemical reactions for which a microreactor can be used are greatly reduced. Accordingly, achieving a chemical reaction involving generation of by-product gas even in a microreactor is a major problem.

The present invention has been made in view of such circumstances and aims at providing a method of producing magnetic particles, which can produce high performance magnetic particles for achieving sufficiently reduced noise of magnetic recording media because minute alloy particles excellent in monodispersibility and excellent in ease in transformation can be prepared in the step of preparing alloy particles, and which enables production using a microreactor even if by-product gas is generated in the production of magnetic particles, a reaction method using a microreactor and a microreactor.

The present inventors have found that minute alloy particles excellent in monodispersibility and excellent in ease in transformation can be prepared by subjecting a plurality of solutions for preparing alloy particles capable of forming a CuAu or $Cu_3Au$ hard magnetic ordered alloy phase to a mixing reaction by a liquid phase method using a microreactor, and the present invention has been made based on the findings.

First, reduced noise of magnetic recording media is described to help understanding of the present invention.

According to a sputtering method known as a method of preparing magnetic recording media for hard disk, a polycrystal magnetic film is formed. The single crystal constituting the magnetic film is column-shaped and has a particle size of about 20 nm and a height of about 100 nm, and the coefficient of variation of particle size (particle size) is as high as not less than 20%. Since single crystals constituting the magnetic film are close with each other in the sputtering method, the single crystal is magnetized together with the neighboring single crystal. Consequently, the actual magnetized unit becomes greater than that of the single crystal. In view of this, it is attempted to make the magnetized unit smaller by segregation of chromium to the crystal grain field, but this countermeasure was also insufficient. To reduce the noise of recording media, further decrease of particle size of the magnetized unit and decrease of the coefficient of variation are needed.

On the other hand, in a general production method of magnetic recording media such as magnetic tapes and flexible diskettes, magnetic particles composed of iron, alloy of iron and cobalt, iron oxide or barium ferrite are once subjected to annealing treatment and then kneaded with a biding agent, dispersed and applied. In this method, however, since magnetic particles are subjected to annealing treatment, the particles are easy to be fused or agglomerated. Accordingly, the coefficient of variation of the particle size is at most about 20% and sufficient reduction of the noise has not been achieved. In addition, these magnetic materials have a small magnetic anisotropy constant and when the size is not more than 20 nm, the materials are greatly influenced by thermal fluctuation and a superparamagnetic state is caused and they cannot be used as a magnetic recording medium.

As described above, to achieve sufficient noise reduction, it is important to set the coefficient of variation of the particle size to not more than 20% regardless of magnetic recording media for hard disk or magnetic recording media for magnetic tapes and flexible diskettes.

The present inventors have focused on the following findings as measures to set the coefficient of variation to not more than 20%.

(1) Unlike a sputtering method, a reverse micelle method can prepare magnetic particles having a size of not more than 20 nm in micelles isolated from other magnetic particles.

(2) When using alloy particles capable of forming a CuAu or $Cu_3Au$ hard magnetic ordered alloy phase as a precursor for producing magnetic particles, hard magnetic properties suitable for magnetic recording media are exhibited even if the size is not more than 20 nm, and it is preferred that the particle size of the alloy particles to be prepared is within the range of 1 to 100 nm and the coefficient of the variation of the particle size of the alloy particles is not more than 15%.

(3) Even if alloy particles capable of forming a CuAu or $Cu_3Au$ hard magnetic ordered alloy phase are produced by a reverse micelle method, the coefficient of variation of the particle size cannot be not more than 20% and thus control of particle size is difficult as described in the Related Art in the case of a mixing reactor having a stirring blade in the tank, which may be capable of producing alloy particles having a particle size of not more than 20 nm. However, by subjecting a plurality of solutions for preparing alloy particles capable of forming a CuAu or $Cu_3Au$ hard magnetic ordered alloy phase to a mixing reaction by a liquid phase method using a microreactor, small size alloy particles excellent in monodispersibility and self-alignment property can be obtained and the alloy phase can be easily transformed from a random phase to an ordered phase in the step of forming magnetic particles (e.g. annealing treatment) in which alloy particles are formed into CuAu or $Cu_3Au$ magnetic particles.

(4) The size of alloy particles to be prepared can be accurately controlled by properly controlling the mixing reaction temperature in the microreactor method.

(5) Fusion or agglomeration of particles can be prevented by annealing treatment with the alloy particles applied and fixed on a support.

The particle size (particle size) in the present invention is indicated by the diameter of a circle having the same area as the projected area of the parallel outer surface of the particle. That is, the projected area of the particle is obtained by measuring an area on an electron micrograph and correcting the magnification of the micrograph. Assuming a circle having the same area as the projected area of a particle, the diameter of the circle is defined as the equivalent diameter of the alloy particle (or magnetic particle). In addition, the coefficient of variation of the particle size means a value obtained by dividing the standard deviation of the equivalent diameters of all particles by the average particle size.

In the present invention, a method of producing magnetic particles, magnetic particles and magnetic recording media are specifically constructed based on the above findings.

To achieve the above-mentioned objects, the first aspect of the present invention is a method of producing magnetic particles, comprising the steps of preparing alloy particles capable of forming a CuAu or $Cu_3Au$ hard magnetic ordered alloy phase and forming magnetic particles, wherein the step of preparing alloy particles comprises subjecting a plurality of solutions for preparing the alloy particles to a mixing reaction by a liquid phase method using a microreactor and wherein the alloy particles prepared by the mixing reaction have a particle size of 1 to 100 nm and a coefficient of variation of not more than 15%.

According to the present invention, by subjecting a plurality of solutions for preparing alloy particles to a mixing reaction by a liquid phase method using a microreactor, the reaction components for forming alloy particles can be reacted one-on-one from a microscopic viewpoint, utilizing the minute area of the microreactor. In addition, the plurality of solutions flow through the minute area to one direction in a laminar flow and thus the particle growth of the prepared alloy particles due to partial circulation does not occur. By this, minute alloy particles extremely excellent in monodispersibility can be prepared. Accordingly, the particle size of the alloy particles prepared by the mixing reaction using a microreactor can be 1 to 100 nm and the coefficient of variation of the particle size can be not more than 15%. This is because alloy particles having a particle size of less than 1 nm are easy to become superparamagnetic and not appropriate as alloy particles for preparing magnetic particles used for magnetic recording media, and because a particle size exceeding 100 nm cannot achieve sufficient reduction of noise. A more preferable range of the particle size of the alloy particles is 3 to 20 nm, a particularly preferable range thereof is 3 to 10 nm.

The above is also because a coefficient of variation of the particle size of the alloy particles exceeding 15% cannot achieve sufficient reduction of noise, and a more preferable coefficient of variation is not more than 10%.

In addition, the alloy particles produced by a microreactor is excellent in self-alignment property and therefore the alloy particles can be easily transformed to CuAu or $Cu_3Au$ magnetic particles in the step of forming magnetic particles.

The second aspect of the present invention is a method according to the first aspect, wherein the alloy particles prepared by the mixing reaction have a particle size of 1 to 100 nm and a coefficient of variation of the particle size of not more than 15%.

The second aspect specifies the size and the coefficient of variation of the alloy particles prepared by the mixing reaction of the method of producing magnetic particles in the first aspect.

The third aspect of the present invention is a method according to the first aspect, wherein the liquid phase method is a reverse micelle method and wherein as the plurality of solutions, a reverse micelle solution (solution L1) in which a non-aqueous organic solvent containing a surfactant and an aqueous reducing agent solution are mixed and a reverse micelle solution (solution L2) in which a non-aqueous organic solvent containing a surfactant and an aqueous metal salt solution containing a plurality of metal atoms for preparing the alloy particles are mixed are prepared, and the solution L1 and the solution L2 are subjected to a mixing reaction in the microreactor.

According to the third aspect of the present invention, by conducting the liquid phase method by a reverse micelle method, it becomes easier to control the particle size of the prepared alloy particles. In addition, as the plurality of solutions, solution L1 in which a non-aqueous organic solvent containing a surfactant and an aqueous reducing agent solution are mixed and solution L2 in which a non-aqueous organic solvent containing a surfactant and an aqueous metal salt solution containing a plurality of metal atoms for preparing the alloy particles can be prepared. That is, solution L2 to be subjected to a mixing reaction with solution L1 can contain all of the plurality of metal atoms for preparing alloy particles, and the solution L1 and the solution L2 are subjected to a mixing reaction in a microreactor.

The fourth aspect of the present invention is a method according to the first aspect, wherein the liquid phase method is a reverse micelle method and wherein as the plurality of solutions, a reverse micelle solution (solution L1) in which a non-aqueous organic solvent containing a surfactant and an aqueous reducing agent solution are mixed and a reverse micelle solution (solution L3) comprising a non-aqueous organic solvent containing a surfactant and an aqueous metal salt solution containing one of the plurality of metal atoms for preparing the alloy particles are prepared for the number of the kinds of the metal atoms, and the solutions L1 and a plurality of solutions L3 are subjected to a mixing reaction in the microreactor.

In the fourth aspect of the present invention, a plurality of solutions L3 containing one of the plurality of metal atoms for preparing alloy particles are prepared, and the solutions L1 and a plurality of solutions L3 are subjected to a mixing reaction in a microreactor.

The fifth aspect of the present invention is a method according to the first aspect, wherein the microreactor is a parallel-flow microreactor in which the plurality of solutions are passed through respective liquid supply channels which form parallel tube structure and merge in one microchannel, and each merged solution is passed in a parallel laminar flow while diffusing to the direction normal to the contact interface to mix with each other.

When the fifth aspect is dependent on the third aspect, the plurality of solutions are solution L1 and solution L2 and when the fifth aspect is dependent on the fourth aspect, the plurality of solutions are solution L1 and a plurality of solutions L3. The same applies in the following.

In the fifth aspect of the present invention, a plurality of solutions are subjected to a mixing reaction in a parallel-flow microreactor.

The sixth aspect of the present invention is a method according to the fifth aspect, wherein the respective liquid supply channels are minute microchannels having a size in the width direction of 1 to 500 μm and a size in the in-depth direction of 1 to 500 μm, and wherein the size in the width direction and the size the in-depth direction is determined according to the respective liquid supply channels.

The sixth aspect of the present invention specifies preferable sizes in the width direction and the in-depth direction of the respective liquid supply channels and the microchannels in a parallel-flow microreactor. The size in the width direction of the liquid supply channel is preferably 1 to 500 μm and the size in the in-depth direction of the liquid supply channel is preferably 1 to 500 μm. The size is more preferably 10 to 300 μm in the width direction and 10 to 300 μm in the in-depth direction. On the other hand, the size in the width direction and the size in the in-depth direction of the microchannel are determined by how the size of the liquid supply channel is determined within the above-mentioned range, but a preferable size is in the range of 10 to 500 μm in both the width direction and the in-depth direction.

The seventh aspect of the present invention is a method according to the first aspect, wherein the microreactor is a concentric microreactor in which the plurality of solutions are passed through respective liquid supply channels which form concentric multi-cylindrical structure and merge in one microchannel, and each merged solution is passed in a concentric laminar flow while diffusing to the direction normal to the contact interface to mix with each other.

In the seventh aspect of the present invention, a plurality of solutions are subjected to a mixing reaction in a concentric microreactor.

The eighth aspect of the present invention is a method according to the seventh aspect, wherein the microchannel has a equivalent diameter of a cross-section perpendicular to the flow direction of a central flow flowing through the center of the concentric laminar flows of 10 to 500 µm and a thickness of a peripheral flow flowing outside the central flow of 10 to 500 µm.

The eighth aspect of the present invention specifies a preferable inner diameter of the microchannel in the concentric microreactor. It is preferable that the equivalent diameter of a cross-section perpendicular to the flow direction of a central flow flowing through the center of the concentric laminar flows is 10 to 500 µm and the thickness of a peripheral flow flowing outside the central flow is 10 to 500 µm. More preferably, the equivalent diameter of a cross-section perpendicular to the flow direction of a central flow is 10 to 300 µm and the thickness of a peripheral flow flowing outside the central flow is 10 to 300 µm. Accordingly, the thickness of a plurality of solutions in the concentric liquid supply channels is also determined by the preferable inner diameter of the microchannel.

The ninth aspect of the present invention is a method according to the first aspect, wherein at least two metal atoms constituting the alloy particles capable of forming a CuAu or $Cu_3Au$ hard magnetic ordered alloy phase are selected from groups 6, 8, 9 and 10 in the long-form periodic table and at least one metal atom is selected from groups 11, 12, 13, 14 and 15 in the long-form periodic table and the content of the one metal atom is 1 to 30 at % relative to the whole alloy.

According to the ninth aspect of the present invention, by adding at least one metal atom selected from groups 11, 12, 13, 14 and 15 in the long-form periodic table to at least two metal atoms selected from groups 6, 8, 9 and 10 in the long-form periodic table, the temperature of transformation can be decreased when the alloy phase of alloy particles prepared in the step of preparing alloy particles is transformed from the random phase to an ordered phase in the step of forming magnetic particles.

The 10th aspect of the present invention is a method according to the first aspect, wherein the mixing reaction temperature in the step of preparing alloy particles is controlled in a range of $-5°$ C. to $30°$ C.

According to the 10th aspect of the present invention, the mixing reaction temperature in the step of preparing alloy particles is controlled in a range of $-5°$ C. to $30°$ C. When the mixing reaction temperature is lower than $-5°$ C., there is a problem that the aqueous phase is coagulated and the reduction reaction becomes uneven. When the temperature is higher than $30°$ C., agglomeration and sedimentation easily occur and the system tends to become unstable. The mixing reaction temperature is preferably within the range of $0°$ C. to $25°$ C., and more preferably within the range of $5°$ C. to $25°$ C.

The 11th aspect of the present invention is a method according to the first aspect, wherein the step of forming magnetic particles comprises conducting annealing treatment after applying a solution containing the alloy particles prepared in the step of preparing alloy particles on a support.

The alloy particles prepared in the step of preparing alloy particles has a weak magnetic property. To obtain CuAu or $Cu_3Au$ hard magnetic ordered alloy having a coercivity of not less than 1200 Oe required for magnetic recording media, it is necessary to transform the alloy phase of the alloy particles from the random phase to an ordered phase, and when the annealing treatment of particles is conducted, alloy particles are easily agglomerated.

According to the 11th aspect of the present invention, since it is designed to conduct annealing treatment after applying a solution containing alloy particles prepared in the step of preparing alloy particles on a support, agglomeration of alloy particles can be prevented and minute magnetic particles can be formed. In this case, the particle size of the magnetic particles formed by the annealing treatment is also preferably in the range of 1 to 100 nm, more preferably in the range of 3 to 20 nm, and particularly preferably in the range of 3 to 10 nm. The coefficient of variation of the particle size of the magnetic particles formed by the annealing treatment is also preferably not more than 15%, more preferably not more than 10%.

The 12th aspect of the present invention is a method according to the 11th aspect, wherein the annealing temperature in the annealing treatment is controlled in a range of $100°$ C. to $500°$ C.

The 13th aspect of the present invention is magnetic particles produced by any one method of producing magnetic particles of the first to 12th aspects.

The 14th aspect of the present invention is magnetic recording media containing in the magnetic layer the magnetic particles according to the 13th aspect.

The 15th to 20th aspects of the present invention describe inventions in which a microreactor can be used even in the production of magnetic particles involving generation of by-product gas.

The 15th aspect is a method according to the fifth aspect, where by-product gas is generated in the mixing reaction by a liquid phase method using a microreactor, wherein the mixing reaction comprises the steps of supplying a gas unreactive to the solution to the microchannel to form a gas layer on a solution layer, incorporating the by-product gas into the gas layer, the by-product gas being generated by the mixing reaction and ascending through the solution layer, and discharging the by-product gas outside of the microchannel with the gas unreactive to the solution.

Because a gas layer unreactive to a solution is formed on the solution layer flowing through the microchannel, by-product gas generated by the mixing reaction ascends through the solution layer and is immediately incorporated into the gas layer. The by-product gas incorporated into the gas layer is discharged outside of the microchannel with the gas flowing through the gas layer.

The 16th aspect is a method according to the 15th aspect, wherein the gas is supplied to the microchannel to allow the gas layer to have a thickness of not less than 80% of the thickness of the solution layer.

This is because the flow in the microchannel easily becomes a slug flow when the thickness of the gas layer is about 60% or 70% of the solution layer, but when it is approximately not less than 80%, an annular state can be easily formed although it depends on the kind and the temperature of the gas and the solution. The thickness of the gas layer is preferably not less than 90%, particularly preferably not less than 100% of the thickness of the solution layer.

The 17th aspect is a method according to the seventh aspect, where by-product gas is generated in the mixing reaction by a liquid phase method using a microreactor, wherein the mixing reaction comprises supplying a gas unreactive to the solution to the microchannel to form an annular gas layer outside of an annular solution layer formed by the concentric multi-cylindrical structure, incorporating the by-product gas into the gas layer, the by-product gas being generated by the mixing reaction and ascending through the solution layer, and discharging the by-product gas outside of the microchannel with the gas.

The 17th aspect is a method of producing magnetic particles by a microreactor having a multi-cylindrical structure.

The 18th aspect is a method according to the 17th aspect, wherein the gas is supplied to the microchannel to allow the gas layer to have a thickness of not less than 80% of the thickness of the solution layer.

It is preferable that the gas is supplied to the microchannel to allow the gas layer to have a thickness of not less than 80% of the thickness of the liquid layer also in the case of the microreactor having a multi-cylindrical structure.

The 19th aspect is a method according to the fifth aspect, where by-product gas is generated in the mixing reaction by a liquid phase method using a microreactor, wherein the mixing reaction is conducted with constant permeation of the by-product gas generated with the progress of a liquid-liquid reaction of the plurality of solutions outside of the microchannel through a gas permeation member which is permeable to liquid but impermeable to gas.

According to the 19th aspect, as the by-product gas generated with the progress of the mixing reaction is constantly permeated outside of the microchannel through a gas permeation member which is permeable to liquid but impermeable to gas, the mixing reaction can be conducted without making the flow of solution in the microchannel unstable even if the mixing reaction which generates by-product gas is conducted by a microreactor.

The 20th aspect is a method according to the 19th aspect, wherein a first pressure in the microchannel and a second pressure outside the microchannel are relatively controlled to make the first pressure larger than the second pressure bordered by the gas permeation member.

In some cases, the by-product gas generated inside the microchannel is not permeating through the gas permeation member smoothly depending on the gas permeability of the gas permeation member or the composition of the liquids for the mixing reaction (e.g. liquid containing emulsifier). In the 19th aspect, as the first pressure in the microchannel and the second pressure outside the microchannel are relatively controlled to make the first pressure larger than the second pressure, by-product gas is permeating through the gas permeation member smoothly without the influence of the gas permeability of the gas permeation member or the composition of the liquids for the mixing reaction. Accordingly, the flow of the liquid in the microchannel can be further stabilized even if a mixing reaction involving generation of by-product gas is conducted in a microreactor having a minute microchannel having an equivalent diameter of, for example, not more than 1 mm.

The 21st aspect is a method according to the seventh method, where by-product gas is generated in the mixing reaction by a liquid phase method using a microreactor, wherein the mixing reaction is conducted with constant permeation of the by-product gas generated with the progress of a liquid-liquid reaction of the plurality of solutions outside of the microchannel through a gas permeation member which is permeable to liquid but impermeable to gas.

In the 21st aspect, magnetic particles are produced with the generation of by-product gas by providing a gas permeation member which is permeable to liquid but impermeable to gas on a microreactor having a multi-cylindrical structure.

The 22nd aspect is a method according to the 21st aspect, wherein a first pressure in the microchannel and a second pressure outside the microchannel are relatively controlled to make the first pressure larger than the second pressure bordered by the gas permeation member.

As the first pressure in the microchannel and the second pressure outside the microchannel are relatively controlled to make the first pressure larger than the second pressure, by-product gas is permeating through the gas permeation member smoothly without the influence of the gas permeability of the gas permeation member or the composition of the liquids for the mixing reaction even in the case of the microreactor having a multi-cylindrical structure.

The 23rd to 49th aspects describe reaction methods using a microreactor and microreactors suitable for a liquid-liquid reaction involving generation of by-product gas not only for production of magnetic particles.

To achieve the above-mentioned objects, the 23rd aspect of the present invention is a reaction method using a laminate flow microreactor in which a liquid-liquid reaction involving generation of by-product gas is conducted by passing a plurality of liquids through respective liquid supply channels and merging the liquids into a microchannel, and diffusing each liquid to the direction normal to the contact interface while passing the liquids in a thin-line laminar flow, wherein the liquid-liquid reaction comprises supplying a gas unreactive to the liquid to the microchannel to form a gas layer on a liquid layer, incorporating the by-product gas generated by the liquid-liquid reaction and ascending through the liquid layer into the gas layer and discharging the by-product gas outside of the microchannel with the gas.

The characteristic of the microreactor is that the reaction proceeds as the liquids flowing through the microchannel diffuse to the direction normal to the contact interface, and the by-product gas of the reaction is generated gradually with the progress of the reaction. Accordingly, it is important how quickly the by-product gas is discharged to the outside the microchannel before the generated by-product gas is agglomerated to block the microchannel.

According to the 23rd aspect of the present invention, because a layer of a gas unreactive to the solution is formed on a liquid layer which flows through the microchannel, the by-product gas generated by the liquid-liquid reaction ascends inside the liquid layer and is immediately incorporated into the gas layer. The by-product gas incorporated into the gas layer is discharged outside of the microchannel with the gas flowing through the gas layer. Accordingly, even if a liquid-liquid reaction involving generation of by-product gas is conducted in a microreactor having a minute microchannel having an equivalent diameter of, for example, not more than 1 mm, the liquid-liquid reaction can be conducted without making the flow of solution in the microchannel unstable.

The 24th aspect is a reaction method according to the 23rd aspect, wherein the equivalent diameter of the microchannel is not more than 1 mm.

Here, the equivalent diameter means a diameter obtained by reducing the flow channel cross section to a circle and the same applies in the following.

This is because the smaller the equivalent diameter of the microchannel, the more the flow of the microchannel become unstable due to the by-product gas, and the more effective the present invention. The equivalent diameter of the microchannel is particularly preferably not more than 500 μm.

The 25th aspect is a reaction method according to the 23rd aspect, wherein the gas layer is formed at least between a merging point at which a plurality of the solutions are merged and a position at which the liquid-liquid reaction is completed.

This is because, to stabilize the flow of liquid flowing through the microchannel, it is preferable to constantly remove the by-product gas generated with the progress of the liquid-liquid reaction.

The 26th aspect is a reaction method according to the 23rd aspect, wherein, of the supply pressure and the supply flow rate for supplying the liquids to the microchannel and the supply pressure and the supply flow rate for supplying the gas to the microchannel, at least the supply pressure and the supply flow rate for supplying the gas are controlled to make the flow in the microchannel annular.

This makes it easier for the by-product gas from the liquid layer to be incorporated into the gas layer. Here, the annular state originally means an annular flow, but in the present invention, it is not necessarily annular but by the annular flow is meant a state in which each of the gas layer and the liquid layer form a stable flow separately. The same applies in the following.

The 27th aspect is a reaction method according to the 23rd aspect, wherein the gas is supplied to the microchannel to allow the gas layer to have a thickness of not less than 80% of the thickness of the liquid layer.

This is because the flow in the microchannel easily becomes a slug flow when the thickness of the gas layer is about 60% or 70% of the liquid layer, but when it is approximately not less than 80%, annular state can be formed easily although it depends on the kind and the temperature of the gas and the liquid. The thickness of the gas layer is preferably not less than 90%, particularly preferably not less than 100% of the thickness of the liquid layer.

To achieve the above-mentioned objects, the 28th aspect of the present invention is a reaction method using an annular flow microreactor in which a liquid-liquid reaction involving generation of by-product gas is conducted by forming a plurality of liquid supply channels communicating with a microchannel into a concentric multi-cylindrical structure and passing a plurality of liquids through the liquid supply channels and merging the liquids in the microchannel, whereby the liquids are concentrically layered and passed in the form of laminar flows of which the cross section perpendicular to the concentric axis is annular and each liquid is diffused to the direction normal to the contact interface, wherein the liquid-liquid reaction comprises the steps of supplying a gas unreactive to the liquid to the microchannel to form a gas layer outside of the annular liquid layer, incorporating the by-product gas generated by the liquid-liquid reaction and ascending through the liquid layer into the gas layer and discharging the by-product gas outside of the microchannel with the gas.

The 28th aspect of the present invention is a method in which a reaction involving generation of by-product is conducted by a liquid-liquid reaction using an annular flow microreactor. An annular gas layer unreactive to liquid is formed on the annular liquid layer flowing through the microchannel and the by-product gas generated by the liquid-liquid reaction and ascending through the liquid layer is incorporated into the gas layer and discharged outside of the microchannel with the gas. Accordingly, even if a liquid-liquid reaction involving generation of by-product gas is conducted in a microreactor having a minute microchannel having an equivalent diameter of, for example, not more than 1 mm, the liquid-liquid reaction can be conducted without making the flow of solution in the microchannel unstable.

It is preferable that the 28th aspect of the present invention also satisfies the requirements of the 24th to 27th aspects of the present invention.

To achieve the above-mentioned objects, the 29th aspect of the present invention is a microreactor for conducting a liquid-liquid reaction by passing a plurality of liquids to respective liquid supply channels and merging the liquids into a microchannel, and while passing the liquids in a thin-line laminar flow, diffusing each liquid to the direction normal to the contact interface, the microreactor comprises: a gas supplying device for supplying a gas unreactive to the liquid to the microchannel, a gas introduction path for introducing the gas to be supplied to the microchannel from the upper side of the microchannel, a gas discharge path for discharging the supplied gas from the microchannel and a control device for controlling the supply pressure and the supply flow rate of the gas to be supplied to the microchannel.

The 29th aspect describes a constitution of apparatus preferable for conducting the reaction method according to the 23rd aspect. According to the 29th aspect, even in the case that the flow in the microchannel is unstable due to the generation of the by-product gas in the microchannel, by supplying a gas unreactive to the liquid flowing through the microchannel to the upper side of the liquid flowing through the microchannel and increasing the supply pressure gradually, a gas layer separated at a gas-liquid interface is formed on the liquid layer in the microchannel. By this, the by-product gas generated by the liquid-liquid reaction is incorporated into the gas layer in a stable manner and discharged outside of the microchannel. In this case, when the thickness of the gas layer is approximately not less than 80%, the annular state can be formed easily, although it depends on the kind and the temperature of the gas and the liquid, and so the supply pressure and supply flow rate are to be maintained so as to maintain the gas layer thickness.

The 30th aspect is a microreactor according to the 29th aspect, wherein the main body of the microreactor is constituted by a main body member and a lid member, and wherein both a liquid channel extending from the liquid supply channel to the end of the microchannel and a gas channel in which the gas flows are provided on the main body member, and the main body member and the lid member are bonded.

The 30th aspect is the case in which the apparatus is constituted so that part of the microchannel is also used as a gas channel for flowing gas. In this case, processing to produce the main body of the microreactor is easy but the thickness of the liquid layer is reduced by an amount of the thickness of the gas layer, and therefore the equivalent diameter of the microchannel may be set considering this point. This is because the thinner the thickness of the liquid layer, the lower the production efficiency of the reaction product solution produced by the liquid-liquid reaction.

The 31st aspect is a microreactor according to the 29th aspect, wherein the main body of the microreactor is constituted by a main body member and a lid member, and wherein a liquid channel extending from the liquid supply channel to the end of the microchannel is provided on the main body member and a gas channel in which the gas flows is provided on the lid member, and the main body member and the lid member are bonded.

The 31st aspect is the case in which the apparatus is constituted so that a gas channel for flowing gas is provided separately from the liquid channel. In this case, since the gas layer on the liquid layer mainly flows through the gas channel formed on the lid member, the liquid layer can have a thickness corresponding to the equivalent diameter of the microchannel, which is an advantage that the product efficiency can be easily improved.

However, the gas channel provided on the lid member is formed integrally with the microchannel, and the gas-liquid interface of the liquid layer and the gas layer can be formed on the microchannel side or the gas-liquid channel side. Accordingly, even in the case of providing a gas channel on the lid member as in the 9th aspect, it is explained in the present invention that gas is supplied to the microchannel.

The 32nd aspect is a microreactor according to the 29th aspect, wherein the inner wall of the microchannel is treated hydrophobically or hydrophilically.

This is because, by the hydrophobic treatment or the hydrophilic treatment of the inner wall of the microchannel, the gas-liquid interface of the gas layer and the liquid layer at the cross-section perpendicular to the flow direction of the microchannel becomes stable and the area of the gas-liquid interface increases and the by-product gas in the liquid layer can be incorporated into the gas layer more easily.

The 33rd aspect is a microreactor according to the 29th aspect, wherein the material constituting the main body of the microreactor is any one of metals, glass, ceramics, plastic resins and silicon.

This is because the materials described in the 33rd aspect are suitable for microprocessing of a microchannel. In addition, to be able to observe the state of flow in the microchannel, transparent glass or transparent plastic resin is more preferably used.

The 34th aspect is a microreactor according to the 29th aspect, wherein the microchannel has an equivalent diameter of not more than 1 mm.

This is because the smaller the equivalent diameter, the more the flow of the microchannel become unstable due to the by-product gas, and the more effective the present invention, and the equivalent diameter of the microchannel is particularly preferably not more than 500 μm.

To achieve the above-mentioned objects, the 35th aspect of the present invention is an annular flow microreactor for a liquid-liquid reaction involving generation of by-product gas by forming a plurality of liquid supply channels communicating with a microchannel into a concentric multi-cylindrical structure and passing a plurality of liquids through the liquid supply channels and merging the liquids in the microchannel, whereby the liquids are concentrically layered and passed in the form of laminar flows of which the cross section perpendicular to the concentric axis is annular and each liquid is diffused to the direction normal to the contact interface, the microreactor comprises: a gas supplying device for supplying a gas unreactive to the liquid to the microchannel, a gas introduction path having an annular cross section which is provided outside of the liquid supply channel having a multi-cylindrical structure and introduces the gas to be supplied to the microchannel in an annular flow, a gas discharge path for discharging the supplied gas from the microchannel and a control device for controlling the supply pressure and the supply flow rate of the gas to be supplied to the microchannel.

The 35th aspect describes a constitution of the reactor preferable for conducting the reaction method according to the 28th aspect.

According to the 35th aspect, even in the case that the flow in the microchannel is unstable due to the generation of the by-product gas in the microchannel, by supplying a gas unreactive to the liquid flowing through the microchannel from the gas supply channel having a circular cross section to outside of the liquid flowing through the microchannel and increasing the supply pressure gradually, a gas layer separated at a gas-liquid interface is formed outside of the annular liquid layer in the microchannel. By this, the by-product gas generated by the liquid-liquid reaction is incorporated into the gas layer in a stable manner and discharged outside of the microchannel. In this case, when the thickness of the gas layer is approximately not less than 80%, a stable gas-liquid interface is formed, and so the supply pressure and the supply flow rate are to be maintained so as to maintain this gas layer thickness.

It is preferable that the 35th aspect of the present invention also satisfies the requirements of the 32nd to 34th aspects of the present invention.

To achieve the above-mentioned objects, the 36th aspect is a reaction method using a laminate flow microreactor in which a liquid-liquid reaction involving generation of by-product gas is conducted by passing a plurality of liquids through respective liquid supply channels and merging the liquids into a microchannel, and diffusing each liquid to the direction normal to the contact interface while passing the liquids in a thin-line laminar flow, wherein the liquid-liquid reaction is conducted with constant permeation of the by-product gas generated with the progress of the liquid-liquid reaction outside of the microchannel through a gas permeation member which is permeable to liquid but impermeable to gas.

The 36th aspect is a reaction method which comprises conducting a liquid-liquid reaction involving generation of by-product gas using a laminate flow microreactor.

The characteristic of the microreactor is that as the reaction progresses due to the diffusion of the liquids flowing through the microchannel to the direction normal to the contact interface, the by-product gas from the reaction is gradually generated with the progress of the reaction. Accordingly, it is important how quickly the by-product gas is discharged to the outside the microchannel before the generated by-product gas is agglomerated to block the microchannel.

According to the 36th aspect of the present invention, as it is designed to conduct a liquid-liquid reaction with constant permeation of the by-product gas generated with the progress of the liquid-liquid reaction outside of the microchannel through a gas permeation member which is permeable to liquid but impermeable to gas, the liquid-liquid reaction can be conducted without making the flow of the liquid in the microchannel unstable, even if the liquid-liquid reaction involving generation of by-product gas is conducted in a microreactor having a minute microchannel having an equivalent diameter of, for example, not more than 1 mm.

The 37th aspect is a reaction method according to the 36th aspect, wherein the microchannel has an equivalent diameter of not more than 1 mm.

Here, the equivalent diameter means a diameter obtained by reducing the flow channel cross section to a circle and the same applies in the following.

This is because the smaller the equivalent diameter, the more the flow of the microchannel become unstable due to the by-product gas, and the more effective the present invention, and the equivalent diameter of the microchannel is particularly preferably not more than 500 μm.

The 38th aspect is a reaction method according to the 36th aspect, wherein a first pressure and a second pressure are relatively controlled to make the first pressure outside the microchannel larger than the second pressure outside the microchannel bordered by the gas permeation member.

In some cases, the by-product gas generated in the microchannel due to the liquid-liquid reaction is not permeating through the gas permeation member smoothly depending on the gas permeability of the gas permeation member or the composition of the liquids for the liquid-liquid reaction (e.g. liquid containing emulsifier). In the 38th aspect, the first pressure and the second pressure are relatively controlled to make the first pressure on the microchannel side larger than the second pressure outside the microchannel, by-product gas is permeating through the gas permeation member smoothly without the influence of the gas permeability of the gas permeation member or the composition of the liquids for the liquid-liquid reaction. Accordingly, the liquid-liquid reaction can be conducted without making the flow of the liquid in the microchannel unstable, even if the liquid-liquid reaction involving generation of by-product gas is conducted in a microreactor having a minute microchannel having an equivalent diameter of, for example, not more than 1 mm.

To achieve the above-mentioned objects, the 39th aspect of the present invention is a reaction method using an annular flow microreactor in which a liquid-liquid reaction involving generation of by-product gas is conducted by making a plurality of annular liquid supply channels communicating with a microchannel concentric multi-cylindrical structure and passing a plurality of liquids through the liquid supply channels and merging the liquids in the microchannel, whereby the liquids are concentrically layered and passed in the form of laminar flow of which the cross section perpendicular to the concentric axis is annular and each liquid is diffused to the direction normal to the contact interface, wherein the liquid-liquid reaction is conducted with constant permeation of the by-product gas generated with the progress of the liquid-liquid reaction outside of the microchannel through a gas permeation member which is permeable to liquid but impermeable to gas.

The 39th aspect is a reaction method which comprises conducting a liquid-liquid reaction involving generation of by-product gas using an annular flow microreactor. In this case as well, by conducting the liquid-liquid reaction with constant permeation of the by-product gas generated with the progress of the liquid-liquid reaction outside of the microchannel through a gas permeation member which is permeable to liquid but impermeable to gas, the liquid-liquid reaction can be conducted without making the flow of the liquid in the microchannel unstable, even if the liquid-liquid reaction involving generation of by-product gas is conducted in a microreactor having a minute microchannel having an equivalent diameter of, for example, not more than 1 mm.

It is preferable that the 39th aspect of the present invention also satisfies the requirements of the 37th to 38th aspects of the present invention.

To achieve the above-mentioned objects, the 40th aspect of the present invention is a microreactor for conducting a liquid-liquid reaction by passing a plurality of liquids through respective liquid supply channels and merging the liquids into a microchannel, and diffusing each liquid to the direction normal to the contact interface while passing the liquids in a thin-line laminar flow, wherein, of the liquid supply channel and the microchannel, at least part or all of the channel wall of the microchannel is constituted by a gas permeation member which is permeable to liquid but impermeable to gas.

The 40th aspect describes a laminate flow microreactor in which, of the liquid supply channel and the microchannel, at least part or all of the channel wall of the microchannel is constituted by a gas permeation member. By this, the by-product gas generated in the microchannel due to the liquid-liquid reaction permeates through the gas permeation member and is discharged outside of the microchannel. In the case of laminate flow microreactor, the by-product gas generated in the microchannel ascends through the liquid and accumulated on the upper channel wall of the microchannel, and so the upper channel wall is preferably constituted by a gas permeation member. In the case that part of the channel wall such as upper channel wall is constituted by the gas permeation member, soft materials are available and polymer film having gas permeability such as a Gore-Tex film (trademark) can be suitably used.

The 41st aspect is a reaction method according to the 40th aspect, wherein the microchannel has an equivalent diameter of not more than 1 mm. This is because the smaller the equivalent diameter, the more the flow of the microchannel become unstable due to the by-product gas, and the more effective the present invention, and the equivalent diameter of the microchannel is particularly preferably not more than 500 µm.

The 42nd aspect is a microreactor according to the 40th aspect, further comprising a cavity portion along the flow direction of at least the microchannel of the liquid supply channels and the microchannel, which is formed on the opposite side across the gas permeation member from the microchannel and a pressure control device for controlling relatively a first pressure in the microchannel and the second pressure on the side of the cavity portion to make the first pressure larger than the second pressure.

Even in the case that the by-product is not smoothly passed through the gas permeation member due to the gas permeability of the gas permeation member or the composition of the liquids for the liquid-liquid reaction (e.g., liquid containing emulsifier), smooth permeation of the by-product gas is achieved by making the first pressure in the microchannel larger than the second pressure in the cavity portion by the pressure control device.

The 43rd aspect is a microreactor according to the 42nd aspect, wherein the pressure control device is a suction device which reduces the pressure of the cavity portion by suction.

The 44th aspect is a microreactor according to the 42nd aspect, wherein the pressure control device is a gas flow device which generates high speed gas flow in the cavity portion and causes pitot tube phenomenon.

The 45th aspect is a microreactor according to the 42nd aspect, wherein the pressure control device is a pressurizing device which applies, to the microchannel, a pressure of not less than the pressure loss of the by-product gas permeating through the gas permeation member.

The 43rd to 45th aspects describe various aspects of pressure control device for making the first pressure in the microchannel larger than the second pressure in the cavity portion.

The 46th aspect is a microreactor according to the 40th aspect, wherein the main body of the microreactor is constituted by a main body member and a lid member and a liquid channel extending from the liquid supply channel to the end of the microchannel and the cavity portion are provided on the main body member and the gas permeation member is provided between the liquid channel and the cavity portion.

The 46th aspect is the case in which the main body is constituted so that the liquid channel is separated by a gas permeation member and partially used as a cavity portion.

The 47th aspect is a microreactor according to the 40th aspect, wherein the main body of the microreactor is constituted by a main body member and a lid member, and a liquid channel extending from the liquid supply channel to the end of the microchannel is provided on the main body member and the cavity portion is provided on the lid member, and the gas permeation member is sandwiched by the main body member and the lid member.

According to the 47th aspect, as the liquid channel is provided on the main body member and the cavity portion is provided on the lid member, and the gas permeation member is sandwiched by the main body and the lid member, the upper channel wall of the microchannel can be easily constituted by the gas permeation member, and the production of the apparatus becomes easier than that of the 11th aspect.

The 48th aspect is a microreactor according to the 40th aspect, wherein the material constituting the main body of the microreactor is any one of metals, glass, ceramics, plastic resins and silicon.

This is because the materials described in the 48th aspect are suitable for microprocessing of a microchannel. In addition, to be able to observe the state of flow in the microchannel, transparent glass or transparent plastic resin is more preferably used.

To achieve the above-mentioned objects, the 49th aspect is a microreactor for a liquid-liquid reaction involving generation of by-product gas by forming a plurality of liquid supply channels communicating with a circular microchannel concentric multi-cylindrical structure and passing a plurality of liquids through the liquid supply channels and merging the liquids in the microchannel, whereby the liquids are concentrically layered and passed in the form of laminar flows of which the cross section perpendicular to the concentric axis is annular and each liquid is diffused to the direction normal to the contact interface, wherein, of the liquid supply channels and the microchannel, at least part or all of the channel wall of the circular microchannel is constituted by a gas permeation member which is permeable to liquid but impermeable to gas.

The 49th aspect of the present invention is an annular flow microreactor and of the liquid supply channel and the microchannel, at least part or all of the channel wall of the microchannel is constituted by a gas permeation member. According to this, the by-product gas generated by the liquid-liquid reaction in the microchannel is permeating through the gas permeation member and discharged outside of the microchannel. In the case of an annular flow microreactor, a construction in which the by-product gas generated in the microchannel is immediately permeating through the neighboring gas permeation member is more preferable. Therefore, the entire channel wall is preferably constituted by the gas permeation member. In this way, because soft materials such as a polymer film cannot be used in the case where the entire flow channel is made of the gas permeation member, it is preferable to use, as a gas permeation member, a metal material which is permeable to liquid but impermeable to gas in which extremely minute holes are made by a micromachining technology or hard materials such as plastic resin materials. A gas permeation member made of a hard material is preferable for an annular flow microreactor, because the entire channel wall of the microchannel can be formed by the gas permeation member. In any case, any gas permeation member can be used in the present invention regardless of such technical developments, as long as the member permeates only the by-product gas generated by the liquid-liquid reaction in the microchannel.

It is preferable that the 49th aspect also satisfies the requirements of the 48th aspect.

As explained above, according to the method of producing magnetic particles of the present invention, because alloy particles which satisfy all of small size, excellent monodispersibility and ease in transformation can be produced in the step of preparing alloy particles, magnetic particles having excellent properties can be produced. In addition, magnetic recording media of the present invention produced by the present invention containing magnetic particles in the magnetic layer has reduced noise and has a high recording density and of high quality.

Further, according to the reaction methods using a microreactor and the microreactors of the present invention, because the by-product gas generated by the liquid-liquid reaction in a minute microchannel having an equivalent diameter of, for example, not more than 1 mm can be efficiently degassed from the microchannel, the liquid-liquid reaction can be conducted without making the flow of the liquid in the microchannel unstable, even if a chemical reaction involving generation of by-product gas by a liquid-liquid reaction is conducted in the microreactor.

Accordingly, the reaction methods using a microreactor and the microreactors of the present invention are suitable for the production of magnetic particles involving generation of by-product gas in a mixing reaction by a liquid phase method using a microreactor.

BRIEF DESCRIPTION OF THE DRAWINGS

FIGS. 1A and 1B are cross-sectional views illustrating the construction of a parallel-flow microreactor used in the step of preparing alloy particles in the method of producing magnetic particles of the present invention;

FIGS. 4A and 4B are cross-sectional views illustrating a modified example of the parallel-flow microreactor of FIGS. 1A and 1B;

FIGS. 5A and 5B are cross-sectional views illustrating the construction of a concentric microreactor used in the step of preparing alloy particles in the method of producing magnetic particles of the present invention;

FIGS. 15A and 15B are cross-sectional views illustrating an annular flow microreactor which is the second embodiment of the present invention;

DETAILED DESCRIPTION OF THE PREFERRED EMBODIMENTS

Figure 2:
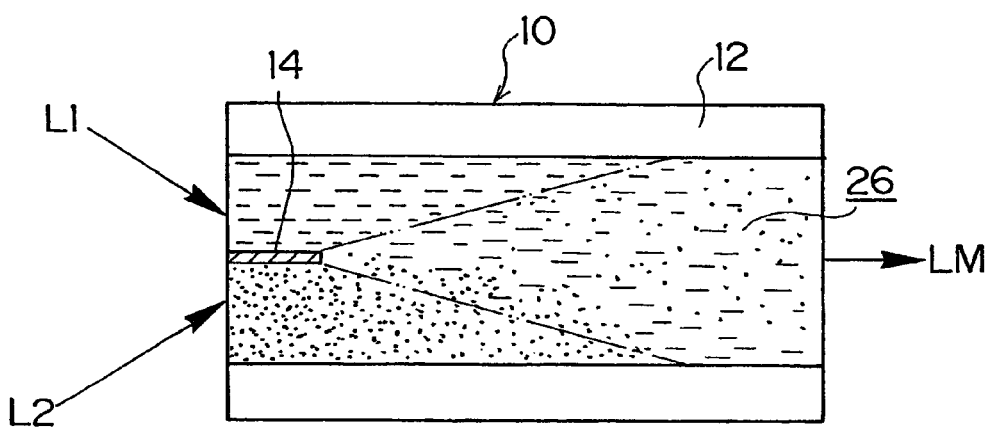
FIG. 2 is a schematic view of mixing reaction of two solutions by a parallel-flow microreactor.

In the following, preferred embodiments of the method of producing magnetic particles, the reaction method using a microreactor and the microreactor according to the present invention are explained in detail referring to attached figures.

(1) Method of Producing Magnetic Particles

The method of producing magnetic particles comprises the step of preparing alloy particles capable of forming hard magnetic ordered alloy phase by a liquid phase method and the step of forming CuAu or $Cu_3Au$ magnetic particles from the prepared alloy particles.

In the following, the method of producing magnetic particles and the magnetic particles of the present invention are explained, illustrating each step mentioned above. The step of forming magnetic particles is explained in the example of the annealing treatment below, but the step is not limited to this.

[Step of Preparing Alloy Particles]

The alloy particles formed into magnetic particles by annealing treatment can be prepared by a gas phase method other than the liquid phase method, but in consideration of the excellent mass productivity, the liquid phase method is preferable. As the liquid phase method, conventionally known various methods can be adopted, but it is preferable to adopt a reducing method which is a modified method thereof. Of the reducing methods, a reverse micelle method in which the particle size of the alloy particles can be easily controlled is particularly preferable.

The reverse micelle method comprises a step of reduction reaction by mixing at least two reverse micelle solutions and a step of aging at a treatment temperature after reduction reaction.

(Reduction Step)

In the reduction step, first a reverse micelle solution in which a non-aqueous organic solvent containing a surfactant and reducing aqueous solution (solution L1) are mixed is prepared. Hereinafter the reverse micelle solution (solution L1) is simply referred to as solution L1.

As the surfactant, oil soluble surfactants are used. Specific examples thereof include sulfonic acid surfactant (e.g., Aerosol OT (Wako Pure Chemical Industries, Ltd.), quaternary ammonium salt surfactant (e.g., cetyltrimethylammonium bromide) and ether surfactant (e.g., pentaethyleneglycol dodecyl ether).

The amount of the surfactant in the non-aqueous organic solvent is preferably 20 to 200 g/L.

Preferable examples of the non-aqueous organic solvent containing surfactant are alkane, ether and alcohol. Alkanes are preferably alkanes having 7 to 12 carbon atoms. Specific examples include heptane, octane, isooctane, nonane, decane, undecane and dodecane. As ethers, diethyl ether, dipropylether, dibutyl ether are preferable. As alcohols, ethoxyethanol and ethoxypropanol are preferable.

As the reducing agent in the aqueous reducing agent solution, alcohols; polyalcohols; $H_2$; and compounds containing HCHO, $S_2O_6^{2-}$, $H_2PO_2^-$, $BH_4^-$, $N_2H_5^+$ and $H_2PO_3^-$ can be used alone but it is preferable to use two or more kinds together. The amount of the reducing agent in the aqueous solution is preferably 3 to 50 mole based on 1 mole of metal salt.

Here, the mass ratio of water and the surfactant (water/surfactant) in the solution L1 is preferably set to not more than 20. When the mass ratio is more than 20, problems may arise that precipitation easily occurs and that particles easily become irregular. The mass ratio is set to more preferably not more than 15, particularly preferably 0.5 to 10.

Next, separately from the above-mentioned solution L1, a reverse micelle solution (solution L2) in which a non-aqueous organic solvent containing surfactant and an aqueous metal salt solution containing a plurality of metal atoms for preparing alloy particles are mixed is prepared. In the following, the reverse micelle solution (solution L2) is simply referred to as solution L2.

In this case, solution L1 in which a non-aqueous organic solvent containing surfactant and an aqueous reducing agent solution are mixed and a reverse micelle solution (solution L3) comprising a non-aqueous organic solvent containing a surfactant and an aqueous metal salt solution containing one of the plurality of metal atoms for preparing alloy particles may be prepared for the number of the kinds of the metal atoms. In the following, the reverse micelle solution (solution L3) is simply referred to as solution L3.

The conditions (substances to be used, concentrations etc) of the surfactant and the non-aqueous organic solvent are as defined in solution L1. The surfactant and the non-aqueous organic solvent which are the same as or different from that of solution L1 may be used. In addition, the mass ratio of water and the surfactant in the solution L2 is as defined in solution L1 and the mass ratio may be the same as or different from that of solution L1.

The metal salt contained in the aqueous metal salt solution is preferably selected so that the magnetic particles to be produced can form CuAu or $Cu_3Au$ hard magnetic ordered alloy.

Examples of the CuAu hard magnetic ordered alloy are FeNi, FePd, FePt, CoPt and CoAu and of these FePd, FePt and CoPt are preferable. Examples of the $Cu_3Au$ hard magnetic ordered alloy are $Ni_3Fe$, $FePd_3$, $Fe_3Pd$, $Fe_3Pt$, $CO_3Pt$, $FePt_3$, $CoPt_3$, $Ni_3Pt$, $CrPt_3$ and $Ni_3Mn$ and of these, $FePd_3$, $FePt_3$, $CoPt_3$, $Fe_3Pd$, $Fe_3Pt$ and $CO_3Pt$ are preferable.

Specific examples of the metal salt are $H_2PtCl_6$, $K_2PtCl_4$, $Pt(CH_3COCHCOCH_3)$, $Na_2PdCl_4$, $Pd(OCOCH_3)_2$, $PdCl_2$, $Pd(CH_3COCHCOCH_3)_2$, $HAuCl_4$, $Fe_2(SO_4)_3$, $Fe(NO_3)$, $(NH_4)_3Fe(C_2O_4)_3$, $Fe(CH_3COCHCOCH_3)_3$, $NiSO_4$, $CoCl_2$ and $Co(OCOCH_3)_2$.

The concentration of the aqueous metal solution (concentration of metal salt) is preferably 0.1 to 1000 μmol/ml, more preferably 1 to 100 μmol/ml.

It is necessary to change the alloy particles from the random phase to an ordered phase by annealing treatment, and preferably at least two metal atoms constituting alloy particles capable of forming a CuAu or $Cu_3Au$ hard magnetic ordered alloy phase are selected from the groups 6, 8, 9 and 10 in the long-form periodic table and at least one metal atom selected from groups 11, 12, 13, 14 and 15 and the content of the one metal atom is 1 to 30 at % relative to the whole alloy. For example, by adding one metal atom selected from groups 11, 12, 13, 14 and 15, such as Sb, Pb, Bi, Cu, Ag, Zn and In (hereinafter referred to as the third element) to a binary alloy composed of two metal atoms selected from the groups 6, 8, 9 and 10 in the long-form periodic table, the transformation temperature for transforming the alloy phase of the alloy particles from the random phase to an ordered phase can be decreased.

The solution L1 and the solution L2 prepared as described above are mixed. In the present invention, by subjecting a plurality of solutions, which are the solution L1 and the solution L2, to a mixing reaction by a microreactor, it is aimed to prepare alloy particles which satisfy all of minute size, monodispersibility and ease in transformation in the step of preparing alloy particles.

As the types of the microreactor, 1. a parallel-flow microreactor and 2. a concentric microreactor can be suitably used. In the following, the construction of each microreactor is described. An apparatus for mixing is sometimes simply referred to as a micromixer, but this is encompassed in the scope of the microreactor if the construction is the same.

(1) Parallel-Flow Microreactor

FIGS. 1A and 1B are cross-sectional views illustrating a preferred construction of a parallel-flow microreactor, in which FIG. 1A is an overhead cross-sectional view and FIG. 1B is a cross-sectional view taken on line B-B of FIG. 1A.

As shown in FIGS. 1A and 1B, two solutions L1 and L2 are subjected to a mixing reaction in the microreactor 10 and a mixed reaction solution LM (alloy particle containing liquid) produced by uniform mixing reaction of the solutions L1 and L2 is discharged.

As described in FIGS. 1A and 1B, the microreactor 10 has a substantially rectangular column outer shape as a whole and is provided with a mixer main body 12 of thin-walled tube which constitutes the outer shell of the reactor. The straight line S in the figure indicates the axis through the cross-section centers of the mixer main body 12. The mixer main body 12 has a square cross-section perpendicular to the axis and a partition wall 14 which separates the interior space of the mixer main body 12 is provided on the mixer main body 12 at the end (on the left side in the figure) along the axial direction. As shown in FIG. 1B, the partition wall 14 divides the interior space of the mixer main body 12 substantially in half in the transverse direction of the cross-section, and this constitutes the first liquid supply channel 16 and the second liquid supply channel 18 which are parallel and linearly extended in the axial direction of the mixer main body 12.

As described in FIG. 1A, the proximal portion of the mixer main body 12 is shut by a cover plate 20 to which two supply pipes 38 and 39 are connected. Through these supply pipes 38 and 39, pressurized solutions L1 and L2 are supplied to the liquid supply channels 16 and 18 from two supplying sources (unrepresented) provided on the upstream of the microreactor 10. These supplying sources include, for example other microreactors for producing solutions L1 and L2 or unrepresented storage tanks or pumps storing solutions L1 and L2.

As shown in FIG. 1B, at the tip of the two liquid supply channels 16 and 18 in the mixer main body 12 are opened, respectively, the first supplying opening 22 and the second supplying opening 24 which are substantially rectangular. The supply openings 22 and 24 are adjacent with each other in the diffusion direction of the solutions L1 and L2 (the direction of arrow D). Here, the diffusion direction means a direction perpendicular to the flow direction of the solutions L1 and L2 in the liquid supply channels 16 and 18 (the direction of arrow F), and the direction corresponds to the transverse direction of the cross-section perpendicular to the axis of the mixer main body 12 in the present embodiment as shown in FIG. 1B. In addition, the supply openings 22 and 24 are each a quadrangle elongated to the interface direction (the direction of arrow B) which is perpendicular to the diffusion direction.

As shown in FIG. 1A, a columnar space at which the liquid supply channels 16 and 18 are combined is formed on the downstream of the liquid supply channels 16 and 18 in the mixer main body 12 along the flow direction. The space is called a microchannel 26 (also referred to as a mixing channel) in which the mixing reaction of the solutions L1 and L2 supplied from each liquid supply channel 16 and 18 is conducted. The upstream end of the microchannel 26 along the flow direction is connected to the supply openings 22 and 24 and the downstream end thereof is communicating with a bleed opening 28 opened at the tip of the mixer main body 12. In addition, a ring-shaped connecting portion 30 is provided at the tip of the mixer main body 12 to be extended toward the outer periphery of the bleed opening 28.

Here, the opening width W1 of the first supplying opening 22 along with the diffusion direction is in the range of not less than 1 μm to not more than 500 μm, and the width is determined accordingly depending on the amount and the kind of the solution L1 supplied to the first liquid supply channel 16. The opening width W2 of the second supplying opening 24 along with the diffusion direction is also in the range of not less than 1 μm to not more than 500 μm and determined accordingly depending on the supplied amount and the kind of the solution L2 supplied to the second liquid supply channel 18. In addition, the opening width WB of the supply openings 22 and 24 along with The interface direction is set to be at least the opening widths W1 and W2. The opening widths W1, W2 and WB each define the opening area of the supply openings 22 and 24, and the initial flow rate of the solutions L1 and L2 introduced into the microchannel 26 through the supply openings 22 and 24 is determined depending on the opening area of the supply openings 22 and 24 and the supplied amount of the solutions L1 and L2. Of the opening widths W1, W2 and WB, the opening widths W1 and W2 are set, for example, so that the flow rates of the solutions L1 and L2 supplied to the microchannel 26 through the supply openings 22 and 24 are the same. When considering reduction of the time for uniform mixing reaction of the solutions L1 and L2 (mixing reaction time), naturally, the narrower the opening widths W1 and W2, the more advantageous, and it is desired that the thickness of the partition wall 14 along with the diffusion direction is made as thinner as possible.

In the microreactor 10, the mixing reaction of the solutions L1 and L2 is conducted in the microchannel 26 and a solution LM is discharged from the bleed opening 28. When the solution LM is produced by the mixing reaction of the solutions L1 and L2, it is necessary to mix the solutions L1 and L2 and finish the reaction before the exit of the microchannel 26. Therefore, the channel length PF of the microchannel 26 along the flow direction (see FIG. 1A) must be set to the length in which the mixing reaction of the solutions L1 and L2 is completed. The solutions L1 and L2 and the solution LM in which the two are mixed are usually filled in the mixer main body 12 with no space and flow through the inside of the liquid supply channels 16 and 18 to the bleed opening 28.

It is preferable that thick-wall board vibration generators 32 are installed on the mixer main body 12 pressed on both the top face and the bottom face on the downstream side. A pair of the vibration generators 32 is installed so that the upstream tip corresponds to the upstream tip of the microchannel 26. Thus, a pair of the vibration generators 32 faces the entire top face and the entire bottom face of the microchannel 26, respectively. A vibration part 34 is provided on the vibration generator 32 at the side pressed to the mixer main body 12. The vibration part 34 transmits vibration having a pre-determined wavelength to the solutions L1 and L2 and the solution LM in the microchannel 26 via the mixer main body 12 when the vibration generator 32 is vibrated. At this point, the vibration from the vibration part 34 is transmitted to the solutions L1 and L2 and solution LM along with the diffusion direction as shown in the arrow V in FIGS. 1A and 1B. The transmitted vibration enhances the molecular motion of the solutions L1, L2 and LM along with the diffusion direction, and so the mixing reaction of the solutions L1 and L2 is accelerated.

For vibration generator 32, a piezo element can be used as a vibration generation source, and vibration corresponding to the current frequency is generated from the vibration part 34 by supplying ac source to the piezo element. In this case, the vibration frequency generated from the vibration part 34 is controlled within the range of 1 KHz to 10 MHz, that is, in a band of high frequency and ultrasonic wave. Specifically, the vibration frequency is to be accordingly set depending on the desired mixing rate or the reaction rate of the solutions L1 and L2 in the mixing reaction of the solutions L1 and L2 flowing through the microchannel 26. Here, when the resonant effect in the mixer body, the solutions L1, L2 and LM to which vibration is transmitted is not considered, the higher the vibration frequency, the greater the vibration energy (kinetic energy), whereby the mixing reaction of the solutions L1 and L2 in the microchannel 26 is accelerated. The vibration generator 32 is not limited to piezo elements, and an eccentric cam activated by a motor, an electromagnetic actuator and a pneumatic actuator can be used as long as the element generates vibration in the range of 1 KHz to 10 MHz.

As shown in FIG. 1A, a drive controller 36 which controls the activation of a pair of the vibration generators 32 is provided on the microreactor 10. The drive controller 36 controls the on/off of the vibration generator 32, the duty ratio which is the ratio of on time and off time and the vibration frequency in order to meet the control conditions previously set up in the internal memory when the solutions L1, L2 and LM flow through the microchannel 26. The control conditions are basically different depending on the kind of the solutions L1 and L2, i.e., the chemical compositions, the liquid temperature and the viscosity of the solutions L1 and L2 and the properties of the reaction components of the solutions L1 and L2, and also, depending on the variation in the supplying amount of the solutions L1 and L2, that is, the flow rate of the solutions L1 and L2 in the microchannel 26. These control conditions are set up by the operator of the product line in which the microreactor 10 is installed using a terminal unit or determined automatically by an upper processing computer which controls the entire product line.

As shown in a two-dot chain line in FIGS. 1A and 1B, a jacket 13 through which a heat medium having a relatively large heat capacity such as oil or water flows is wound around the outer periphery of the mixer main body 12, and the jacket 13 is connected to an unrepresented heat medium supplying device. The heat medium supplying device supplies, to the jacket 13, a heat medium having a temperature by which the temperature of the mixing reaction of the solutions L1 and L2 in the mixer main body 12 can be controlled to a range of −5° C. to 30° C., and the medium is again circulated into the heat medium supplying device. It is preferable to set the mixing reaction temperature accordingly within the range of −5° C. to 30° C. depending on the kind of solutions L1 and L2. A more preferable range of the mixing reaction temperature is 0° C. to 25° C. and a particularly preferable range of the mixing reaction temperature is 5° C. to 25° C. In addition, although the amounts of solutions L1 and L2 subjected to the mixing reaction in the mixer main body 12 are also involved, a temperature controller can be provided on unrepresented preparation tanks for preparing the solutions L1 and L2, in the case that the adjustment to the determined mixing reaction temperature is difficult only by winding the jacket 13.

Figure 3:
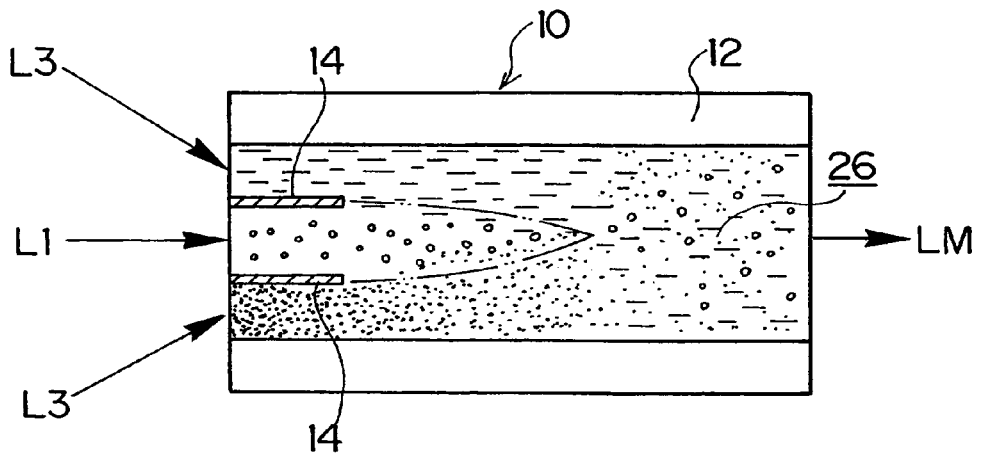
FIG. 3 is a schematic view of mixing reaction of three solutions by a parallel-flow microreactor.

In the microreactor 10 constituted as above, pressurized solutions L1 and L2 are supplied to the liquid supply channels 16 and 18 through supply pipes 38 and 39 under an appropriate mixing reaction temperature condition, and the solutions L1 and L2 flows through the respective liquid supply channels 16 and 18 and introduced to the microchannel 26 through supply openings 22 and 24 as a liquid flow having a pre-determined flow rate. At this point, because the supply openings 22 and 24 have opening widths W1 and W2 of as small as 1 to 500 μm, the solutions L1 and L2 introduced to the microchannel 26 through the supply openings 22 and 24 becomes a thin-plate stratified flow having a width corresponding to the opening widths W1 and W2 and flows toward bleed opening 28, and the molecular diffusion to the normal direction occurs on the contact interface of each stratified flow. According to this, a uniform mixing reaction of the solutions L1 and L2 can be completed in a short period. At the same time, in the microreactor 10, as the vibration from a pair of the vibration generators 32 is transmitted to the solutions L1, L2 and LM in the microchannel 26 along with the diffusion direction, the movement and the molecular motion of the minute fluid bulk of the solutions L1 and L2 flowing through the microchannel 26 to the diffusion direction is enhanced due to the transmitted vibration. Therefore, the movement speed of the molecules to the diffusion direction at the contact interface of the stratified flows formed by the solutions L1 and L2 is increased and the mixing reaction of the solutions L1 and L2 in the microchannel 26 proceeds instantly and efficiently. FIG. 2 is a schematic view illustrating the introduction of solutions L1 and L2 to the microchannel 26 through the respective liquid supply channels 16 and 18. In the mixing reaction of the solution L1 and a plurality of solutions L3, for example, the number of the supply channels is to be increased as shown in FIG. 3, which illustrates the case of a mixing reaction of a solution L1 and two solutions L3.

Accordingly, the mixing reaction of a plurality of solutions for preparing alloy particles by a liquid phase method using a parallel-flow microreactor 10 in the step of preparing alloy particles enables accurate control of the mixing reaction, whereby minute alloy particles excellent in monodispersibility are produced. As a result, alloy particles satisfying the particle size in the range of 1 to 100 nm and the coefficient of variation of the particle size of not more than 15% and which are excellent in self-alignment property can be prepared. In this case, in order to further increase the monodispersibility, accurate temperature control becomes necessary and it is preferable to thin down the microchannel 26 to improve the thermal conductivity of the liquid in the microchannel 26, while the microchannel 26 should be widened when importance is attached to the productivity.

FIGS. 4A and 4B show a modified example of the parallel-lined microreactor 10 of FIGS. 1A and 1B. The difference from FIGS. 1A and 1B is that three vibration generators 42, 44 and 46 are separately provided in the flow direction of the solutions L1, L2 and LM, and it is constructed so that the control conditions can be changed independently. In this way, by providing a plurality of the vibration generators 42, 44 and

46, the control conditions of three vibration generators 42, 44 and 46 can be changed along the flow direction of the solutions L1, L2 and LM. According to this, as the vibration transmitted to the solutions L1, L2 and LM flowing through the microchannel 26 can be gradually changed along the flow direction, the mixing reaction can be more precisely controlled. In FIGS. 4A and 4B the jacket 13 is abbreviated.

(2) Concentric Microreactor

FIGS. 5A and 5B show a cross-sectional view illustrating a preferred construction of a concentric microreactor.

As shown in FIGS. 5A and 5B, the microreactor 110 has a substantially rectangular column shape as a whole and is provided with a cylindrical mixer main body 112 which constitutes the outer shell of the reactor. The straight line S in the figure indicates the axis of the reactor. The direction along the axis S will be referred to as the axis of the apparatus hereafter. The mixer main body 112 has a major diameter part 114, which is the proximal portion of the mixer main body 112 along the axial direction having a greater diameter than that of the tip. In the major diameter part 114, a first header 116 and a second header 118 to which the solutions L1 and L2 are supplied from the outside are provided. The front side of the mixer main body 112 is a circular pipe portion 120 having a fixed inner diameter and a bleed opening 122 of the solution LM is opened at the tip of the circular pipe portion 120 and a ring-shaped connecting portion 124 is provided at the tip of the mixer main body 122 to be extended toward the outer periphery of the bleed opening 122.

The proximal surface of the major diameter part 114 of the mixer main body 112 is shut by a disk cover plate 126 and a hole 128 to fit and insert is opened at the center of the disk cover plate 126. A bar-shaped rectifying member 130 is coaxially provided on the mixer main body 112 so as to be projected to the inside of the circular pipe portion 120 from the major diameter part 114. The proximal portion of the rectifying member 130 is held by fitting and inserting it into the hole 128 to fit and insert of the cover plate 126. In addition, a conical part 132 of which the diameter is reduced toward the tip is formed at the tip of the rectifying member 130. Here, the outer diameter of the rectifying member 130 is smaller than the inner diameter of the circular pipe portion 120, and the difference in the dimension with the inner diameter of the circular pipe portion 120 is set based on the amount of flow of the solutions L1 and L2 in the circular pipe portion 120.

In the major diameter part 114 of the mixer main body 112, a disk barrier plate 134 which separates the space inside the major diameter part 114 substantially in half in the axial direction is provided. The spaces toward the end and the tip separated by the barrier plate 134 are the first header 116 and the second header 118, respectively. Supply pipes 136 and 138 are connected to each of the headers 116 and 118. Pressurized solutions L1 and L2 are supplied to the headers 116 and 118 through supply pipes 136 and 138 from the two supplying sources (unrepresented) provided on the upstream of the microreactor 110.

At the center of the barrier plate 134, a circular opening part is opened of which the opening diameter is in-between the inner diameter of the circular pipe portion 120 and the outer diameter of the rectifying member 130. A pipe-shaped partition member 140 which is protruded from the periphery of the opening part to the circular pipe portion 120 is integrally formed on the barrier plate 134. The partition member 140 is provided coaxially with the circular pipe portion 120 and the rectifying member 130, and separates the space between the circular pipe portion 120 and the rectifying member 130 into the inner side and the outer side. Here, the spaces on the inner side and the outer side separated by the partition member 140 are the first liquid supply channel 142 and the second liquid supply channel 144, and the first and the second liquid supply channels 142 and 144 are each communicating with the first and the second headers 116 and 118 at the end. In addition, in the circular pipe portion 120 of the mixer main body 112, cylindrical space which is wider than the liquid supply channels 142 and 144 is formed on the side closer to the tip than the partition member 140 and closer to the end than the conical part 132 of the rectifying member 130. The cylindrical space is a microchannel 146 in which the mixing reaction of the solutions L1 and L2 supplied from the liquid supply channels 142 and 144 occurs.

In the mixer main body 112, a plurality of spacers 148 (four in this embodiment) are interposed between the inner surface of the circular pipe portion 120 and the outer surface of the partition member 140 and a plurality of spacers 150 (four in this embodiment) are interposed between the inner surface of the partition member 140 and the outer surface of the rectifying member 130. The plurality of spacers 148 and 150 are formed like a rectangular plate and held so that the top surface and the bottom surface are parallel to the flow direction (direction of arrow F) of the solutions L1 and L2 in the circular pipe portion 120. In addition, spacers 148 and 150 are interposed at an interval of 90° in the peripheral direction with the axis S as a center, and the positions in the periphery direction are identical. The spacers 148 on the outer side connect the partition member 140 to the circular pipe portion 120 and specify the opening widths W1 and W2 along with the radial direction of the liquid supply channels 142 and 144 (see FIG. 5A). According to this, each of the partition member 140 and the rectifying member 130 are connected and fixed to the circular pipe portion 120 with a sufficient strength and displacement from the pre-determined position or transformation due to the liquid pressure of the solutions L1 and L2 or the gravity can be prevented, and in addition, the pre-determined size of the opening widths W1 and W2 can be securely maintained.

As shown in FIG. 5B, at the tip of the first liquid supply channel 142 and the second liquid supply channel 144, a first supplying opening 152 and a second supplying opening 154 opened toward the microchannel 146 are each formed. The supply openings 152 and 154 are each opened along with a circle of which the center is the axis S and provided concentrically. The opening width W1 of the first supplying opening 152 along with the radial direction is in the range of not less than 1 μm to not more than 500 μm and accordingly determined depending on the amount or kind of the solution L1 supplied to the first header 116. In addition, the opening width W2 of the second supplying opening 154 along with the radial direction is also in the range of not less than 1 μm to not more than 500 μm, and accordingly determined depending on the amount or kind of the solution L1 supplied to the first header 116. In addition, the microchannel 146 at which the solutions L1 and L2 are combined is designed by how the opening widths W1 and W2 of the first supplying opening 152 and the second supplying opening 154 are set. It is preferable that the equivalent diameter of a cross-section perpendicular to the flow direction of a central flow flowing through the center of the concentric laminar flows passing through the microchannel 146 is 10 to 500 μm and that the thickness of the peripheral flow flowing outside the central flow is 10 to 500 μm. The equivalent diameter is also referred to as an equivalent diameter, which is the term used in mechanical engineering. That is, when a tube equivalent to a pipe having any cross-section (channels in the present invention) is assumed, the diameter of the equivalent tube is called equivalent diameter and defined as deg=4A/P using A=cross section area of pipe, P: wetted edge length of pipe (peripheral length).

The opening widths W1 and W2 each define the opening area of the supply openings 152 and 154, and the initial flow rate of the solutions L1 and L2 introduced into the microchannel 146 through the supply openings 152 and 154 is determined depending on the opening area of the supply openings 152 and 154 and the supplied amount of the solutions L1 and L2. The opening widths W1 and W2 are determined, for example, so that the flow rates of the solutions L1 and L2 supplied to the microchannel 146 through the supply openings 152 and 154 are the same. When considering reduction of the time for uniform mixing reaction of the solutions L1 and L2 (mixing reaction time), naturally, the narrower the opening widths W1 and W2, the more advantageous, and it is desired that the thickness of the partition wall 140 along with the diffusion direction is made as thinner as possible.

The space in the circular pipe portion 120 to the tip from the microchannel 146 is called a bleed channel 156 through which a solution LM after the mixing reaction of the solutions L1 and L2 in the microchannel 146 flows in the direction of the bleed opening 122. When the solution LM is produced by the mixing reaction of the solutions L1 and L2, it is necessary to mix the solutions L1 and L2 and finish the reaction before the exit of the microchannel 146. Therefore, the channel length PF of the microchannel 146 along the flow direction (see FIG. 5A) must be set to the length in which the mixing reaction of the solutions L1 and L2 is completed. The solutions L1 and L2 and the solution LM, which is formed by mixing and reacting the two solutions, are usually filled in the mixer main body 112 with no space and flow through the headers 116 and 118 to the side of the bleed opening 122.

As shown in FIG. 5A, at the circular pipe portion 120 of the mixer main body 112, a plurality of opening parts 158 are opened to face the microchannel 146. The opening parts 158 are opened at each position corresponding to the upstream part, the middle part and the downstream part of the microchannel 146 in the flow direction, and at an interval of 90° in the peripheral direction with the axis S as a center. Accordingly, on the circular pipe portion 120, four opening parts 158 are opened at each position corresponding to the upstream part, the middle part and the downstream part of the microchannel 146, i.e., 12 opening parts 158 in total. In addition, a plurality of microwave generators 160 are installed on the outer periphery of the circular pipe portion 120 to correspond to the opening parts 158. A fit-insertion part 162 which is a columnar projection is provided on the inner periphery of the microwave generators 160 and inserted by the microwave generator 160 to the inside of the opening part 158 to expose the tip of the fit-insertion part 162 to the microchannel 146.

The microwave generator 160 emits microwave to the solutions L1, L2 and LM in the microchannel 146 from the tip of the fit-insertion part 162 when activated. At this stage, the microwave from the microwave generator 160 is emitted to the solutions L1 and L2 and solution LM along with the radial direction which corresponds to the diffusion direction of the solutions L1 and L2 as shown by the broken line in FIGS. 5A and 5B. The microwave enhances the molecular motion of the solutions L1, L2 and LM along with the diffusion direction, and so the mixing reaction of the solutions L1 and L2 is facilitated.

The microwave generator 160 uses, for example, magnetron as a source for generating microwave and intensive microwave corresponding to a current value is generated by supplying driving current to the magnetron. As the microwave generated by the microwave generator 160 in this case, one having a frequency of not less than 10 MHz is selected. Specifically, as the frequency of the microwave, a frequency which does not cause excessive heat generation of the solution L1, L2 and LM flowing through the microchannel 146 and by which the molecular motion of the solutions L1, L2 and LM is efficiently enhanced is selected.

As shown in FIG. 5A, a drive controller 164 which controls the activation of the microwave generator 160 is provided on the microreactor 110. The drive controller 164 controls the on/off of the microwave generator 160, the duty ratio which is the ratio of on time and off time and the vibration frequency in order to meet the control conditions previously set up in the internal memory when the solutions L1, L2 and LM flow through the microchannel 146. The control conditions are basically different depending on the kind of the solutions L1 and L2, i.e., the chemical compositions, the liquid temperature and the viscosity of the solutions L1 and L2 and the properties of the reaction components of the solutions L1 and L2, and also, depending on the variation in the supplying amount of the solutions L1 and L2, that is, the flow rate of the solutions L1 and L2 in the microchannel 146. These control conditions are set up by the operator of the product line in which the microreactor 110 is installed using a terminal unit or determined automatically by an upper processing computer which controls the entire product line.

As shown in a two-dot chain line in FIGS. 5A and 5B, a jacket 113 through which a heat medium having a relatively large heat capacity such as oil or water flows is wound around the outer periphery of the mixer main body 112, and the jacket 113 is connected to an unrepresented heat medium supplying device. The heat medium supplying device supplies, to the jacket 113, a heat medium having a temperature by which the temperature of the mixing reaction of the solutions L1 and L2 in the mixer main body 112 can be controlled to a range of −5° C. to 30° C., and the medium is again circulated into the heat medium supplying device. It is preferable to set the mixing reaction temperature within the range of −5° C. to 30° C. depending on the kinds of solutions L1 and L2. A more preferable range of the mixing reaction temperature is 0° C. to 25° C. A rectifying member 130 is hollow and the outside shell is constituted by a thin-walled metal plate. A supplying tube 131 which has a smaller diameter than the inner diameter of the rectifying member 130 is inserted to the rectifying member 130 from its proximal side, and the supply tube 131 is held coaxially with the rectifying member 130 by a shutting board (unrepresented) which shuts the opening on the proximal portion of the rectifying member 130 and a plurality of spacers 133. The tip of the supply tube 131 leads to the neck of the conical part 132 and a supply opening for supplying a heat medium to the rectifying member 130 is opened at the tip. The heat medium is also supplied to the supply tube 131 from the heat medium supplying device through the supplying opening to control the mixing temperature. In addition, although the amounts of solutions L1 and L2 subjected to the mixing reaction in the mixer main body 112 are also involved, a temperature controller can be provided on unrepresented preparation tanks for preparing the solutions L1 and L2, in the case that the temperature increase to the determined mixing reaction temperature is difficult only by winding the jacket 113.

In the concentric microreactor 110 constructed as above, as in the parallel-flow microreactors 10 and 40, the solutions L1 and L2 introduced to each microchannel 146 through the supply openings 152 and 154 flow through the microchannel 146 in a concentric flow having a thickness corresponding to the opening widths W1 and W2 of the supplying opening 152 and 154 under an appropriate mixing reaction temperature condition. That is, of the concentric laminar flows flowing through the microchannel 146, the central flow from the supplying opening 154 form a thin and cylindrical flow, and the peripheral flow from the supplying opening 152 form a thin and cylindrical flow surrounding the central flow. The two cylindrically-shaped solutions L1 and L2 flowing through the microchannel 146 are subjected to the mixing reaction by the mutual diffusion of the molecules of the solutions L1 and L2 at the contact interface of the adjacent laminar flows. According to this, a uniform mixing reaction of the solutions L1 and L2 can be completed in a short period. At the same time, microwave from the microwave generator 160 is emitted to the solutions L1 and L2 in the microchannel 146 and LM and thus the diffusion rate of the molecules of the solutions L1, L2 and LM in the microchannel 146 is increased to conduct the mixing reaction more efficiently. Further, a plurality of microwave generators 160 are installed on different positions along the flow direction of the solutions L1 and L2, the microwave emitted to the solutions L1, L2 and LM can be gradually changed. Because microwave has a stronger directional characteristic compared to vibration, solutions L1, L2 and LM present in the region corresponding to the microwave generator 160 located at a certain position are less likely to be affected by microwave from a microwave generator 160 located at another position along the flow direction. As a result, the mixing reaction of the solutions L1, L2 and LM in the microchannel 146 can be more precisely controlled compared with the case of providing a vibration generator 32 as described in the parallel-flow microreactor 10. Consequently, alloy particles which satisfy the particle size of 1 to 100 nm and the coefficient of variation of the particle size of not more than 15% and excellent in self-alignment property can be prepared.

Figure 6:
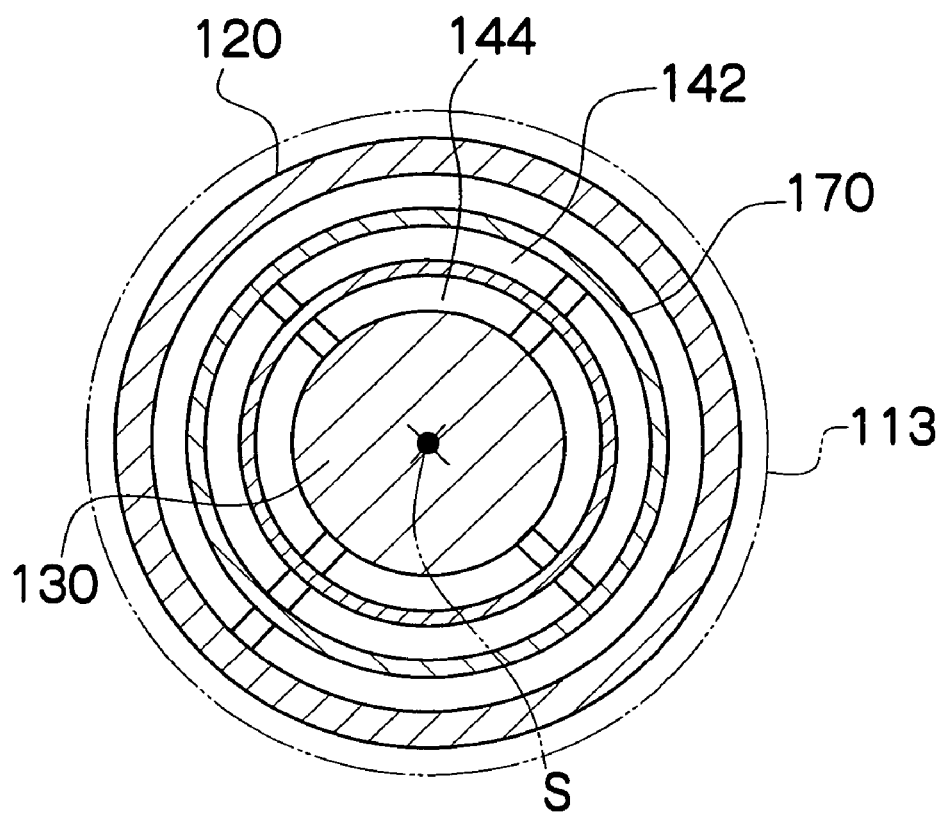
FIG. 6 is an illustrative view of the construction of a liquid supply channel for mixing reaction of three solutions by a concentric microreactor.
Figure 7:
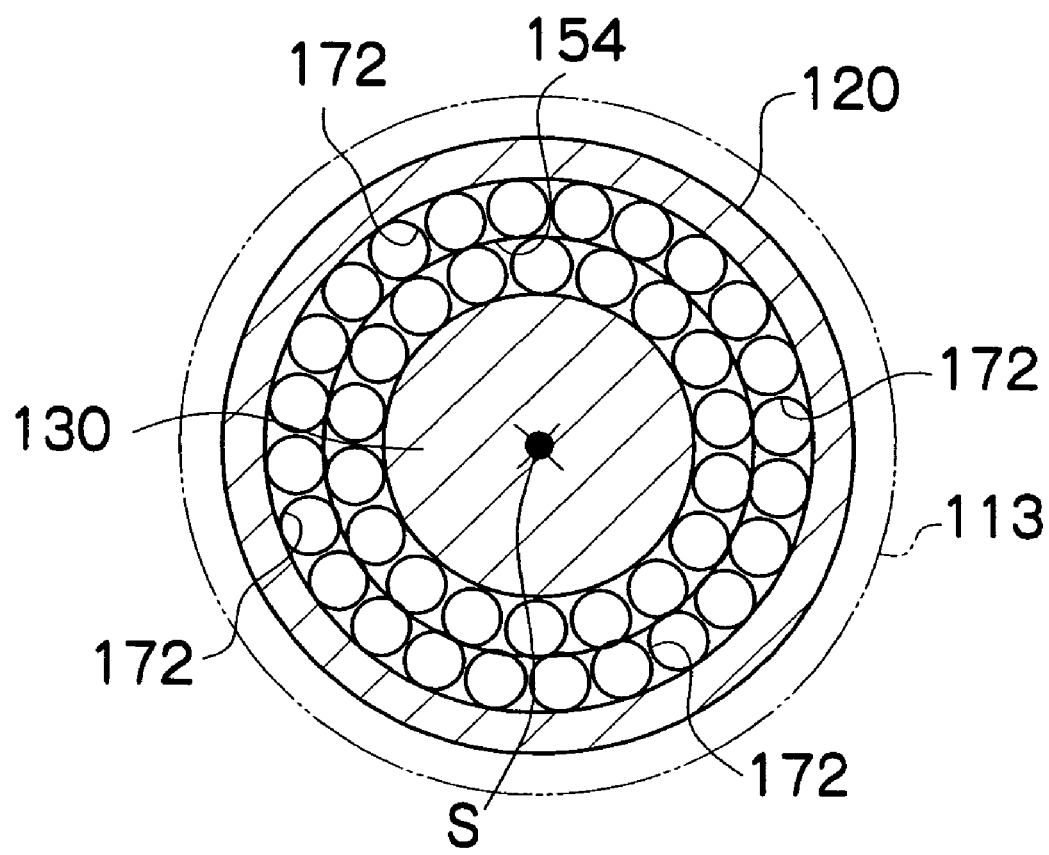
FIG. 7 is an illustrative view of a modified example of a concentric microreactor provided with a circular nozzle plate on the liquid supply channel.
Figure 8:
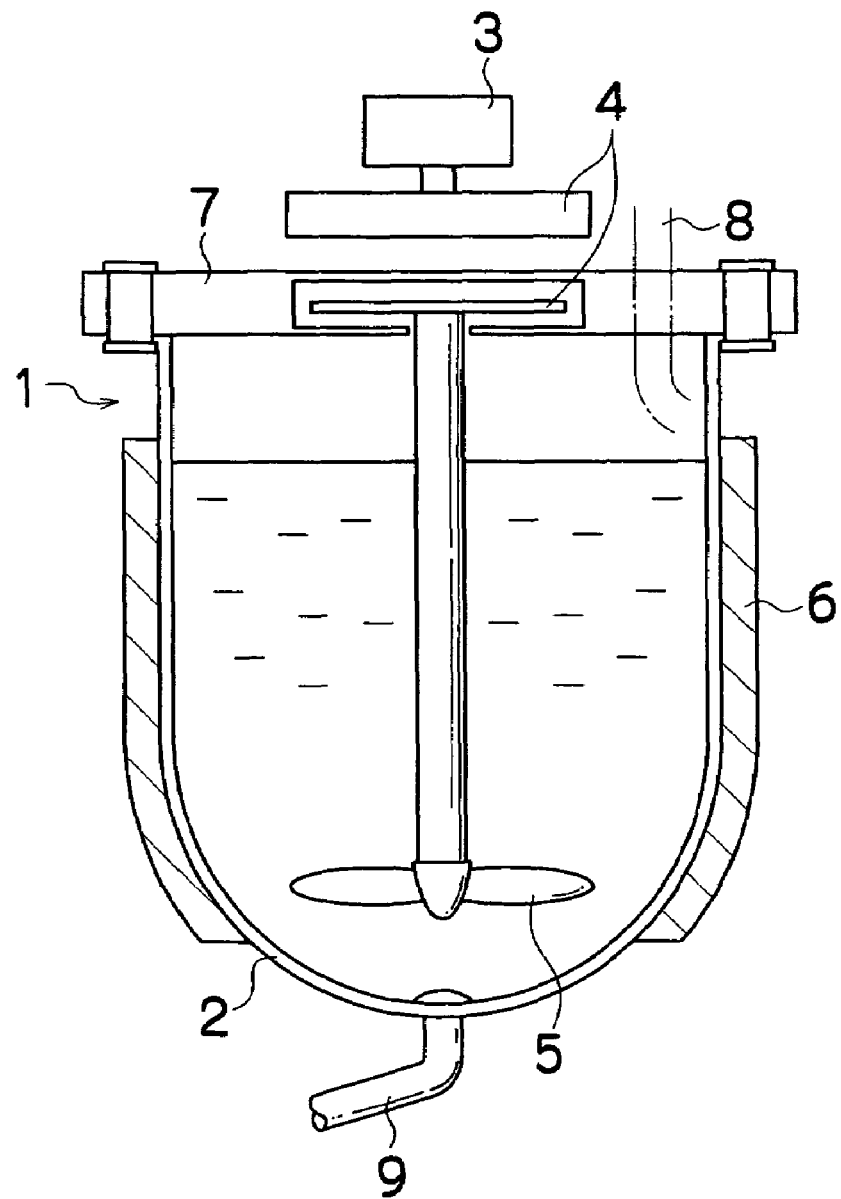
FIG. 8 is an illustrative view of the construction of a conventional mixing reactor.

When conducting a mixing reaction of solution L1 and a plurality of solutions L3, the number of supply channels may be increased, as shown in FIG. 6. FIG. 6 illustrates the case in which a third liquid supply channel 170 on the outer periphery of the first liquid supply channel 142 and the second liquid supply channel 144 described above. FIG. 7 is a modified example of FIGS. 5A and 5B, in which a plurality of circular nozzle plates 172 are installed on the opening parts at the tip of the first liquid supply channel 142 and the second liquid supply channel 144 instead of spacers 148 and 150. In such construction, solutions L1 and L2 introduced to the microchannel 146 from the respective liquid supply channels 142 and 144 flow toward the bleed opening 122 in a plurality of thin-rod laminar flows having an outer diameter corresponding to the inner diameter of the circular nozzle plate 172, and the mixing reaction of the solutions L1 and L2 occurs due to the molecular diffusion to the direction normal to each laminar flow. At this point, the specific surface area of the solutions L1 and L2 can be increased by forming the solutions L1 and L2 into a plurality of thin-rod laminar flows, uniform mixing reaction of the solutions L1 and L2 can be conducted more quickly.

Accordingly, by subjecting a plurality of solutions for preparing alloy particles to a mixing reaction by a liquid phase method using a concentric microreactor 110 in the step of preparing alloy particles, the mixing reaction can be accurately controlled and minute alloy particles excellent in monodispersibility and excellent in ease in transformation can be prepared.

While vibration generators 32 has been put in the parallel-flow microreactor 10 and microwave generators 160 has been put in the concentric microreactor 110, the opposite case is also available, and both the vibration generators 32 and the microwave generators 160 may be put. The temperature of the mixing reaction in the microreactors 10 and 110 may be controlled by putting the entire reactor in a vessel of which the temperature is controlled, or a heater structure made of metal resistance line or polysilicon may be fabricated and incorporated into the reactor to be used for heating in a thermal cycle while cooling is natural cooling. For sensing the temperature, in the case of metal resistance line, another resistance line which is the same as the heater may be incorporated and the temperature is detected based on the variation of the resistance value. In the case of polysilicon, the detection is conducted by using a thermocouple. In addition, it may also be possible to conduct heating and cooling from the outside by contacting a Peltier element with the microreactors 10 and 110.

By mixing the solution L1 and solution L2 using (1) a parallel-flow microreactor 10 and (2) a concentric microreactor 110 described above, alloy particles which satisfy all of small size, monodispersibility and ease in transformation can be prepared in the step of preparing alloy particles.

The mixing reaction temperature of the reduction reaction by mixing mentioned above is preferably set to a pre-determined temperature in the range of $-5°$ C. to $30°$ C. When the temperature is lower than $-5°$ C., there is a problem that the aqueous phase is coagulated and the reduction reaction becomes uneven. When the temperature is higher than $30°$ C., agglomeration and sedimentation easily occur and the system tends to become unstable. The reduction reaction temperature is preferably within the range of $0°$ C. to $25°$ C., and more preferably within the range of $5°$ C. to $25°$ C. Here, the "pre-determined temperature" means that when the preset temperature is T, the T is within the range of T±$3°$ C. Even in this case, the upper limit and the lower limit of the T is the above-mentioned $-5°$ C. to $30°$ C. It is necessary to select the reduction reaction time appropriately based on the capacity of the reverse micelle, but the time is preferably 1 to 30 minutes, more preferably 5 to 20 minutes.

In the above-mentioned reduction step, it is preferable to add 0.001 to 10 mole of at least one of dispersant containing 1 to 3 amino groups or carboxyl groups to at least any of the solution L1 and solution L2 based on 1 mole of the alloy particles to be prepared. By adding such dispersant, alloy particles having a higher monodispersibility and free of coagulation can be obtained. When the addition amount is less than 0.001 mole, the monodispersibility of the alloy particles may not be improved and when it exceeds 10 mole, coagulation may occur.

As the dispersant, an organic compound having a group which adsorbs alloy particles to the surface is preferable. Specific examples include compounds containing 1 to 3 amino groups, carboxyl groups, sulfonic groups or sulfinic acid groups, and these can be used alone or in a combination.

Such compounds are represented by the structural formulas R—$NH_2$, $NH_2$—R—$NH_2$, $NH_2$—R($NH_2$)—$NH_2$, R—COOH, COOH—R—COOH, COOH—R(COOH)—COOH, R—$SO_3H$, $SO_3H$—R—$SO_3H$, $SO_3H$—R($SO_3H$)—$SO_3H$, R—$SO_2H$, $SO_2H$—R—$SO_2H$, $SO_2H$—R($SO_2H$)—$SO_2H$. R in the formula represents a linear, branched or cyclic saturated or unsaturated hydrocarbon.

A particularly preferable compound for the dispersant is oleic acid. The oleic acid is a surfactant known for stabilizing colloid and has been used for protecting metal particles such as iron. The relatively long chain of oleic acid (for example, oleic acid has a chain of 18 carbons of which the length is up to 20 A (up to 2 nm); oleic acid is not aliphatic and has one double bond) gives important steric exclusion which cancels the strong magnetic interaction of particles.

Similar long-chain carboxylic acids such as erucic acid and linoleic acid can also be used as with the case of oleic acid (long-chain organic acid having 8 to 22 carbon atoms can be used alone or in a combination). Oleic acid (such as olive oil) is preferable because it is an inexpensive and readily available natural resource. In addition, oleyl amine derived from oleic acid is also a useful dispersant like oleic acid.

In the reduction step described above, it is considered that electronegative metal (about not more than −0.2V (vs-.N.H.E)) such as Co, Fe, Ni and Cr in the CuAu or $Cu_3Au$ hard magnetic ordered alloy phase is reduced and precipitated in small size and monodispersed state. Thereafter, in the temperature increasing step and the aging step described later, electropositive metal (about not less than −0.2V (vs.N.H.E)) such as Pt, Pd and Rh is reduced by the above precipitated electronegative metal on the surface, with the metal as a nucleus, substituted and precipitated. It is assumed that the ionized electronegative metal is reduced again by a reducing agent and precipitated. By repeating in this way, alloy particles capable of forming CuAu or $Cu_3Au$ hard magnetic ordered alloy can be prepared.

Next, the step of aging in which the temperature of the reaction mixture is increased to the aging temperature which is higher than −5° C. to 30° C. which is the mixing reaction temperature in the reduction step described above is explained.

(Aging Step)

The aging temperature is preferably set to a pre-determined temperature within the range of 30 to 90° C., but higher than the temperature in the reduction reaction. The aging time is preferably 5 to 180 minutes. When the aging temperature and the aging time shift to a higher temperature and a longer time, agglomeration or sedimentation easily occur. When they shift to a lower temperature and a shorter time, the reaction may not be completed or the composition may be altered. The aging temperature and aging time is preferably 40 to 80° C. for 10 to 150 minutes, and more preferably 40 to 70° C. for 20 to 120 minutes.

Here, the "pre-determined temperature" is as defined in the temperature in the reduction reaction (the reduction temperature is replaced by aging temperature). In particular, the temperature is preferably 5° C., more preferably 10° C. higher than the reduction reaction temperature within the range of the aging temperature (30 to 90° C.). When the temperature is lower than 5° C., a prescribed composition may be obtained.

In the aging step described above, noble metal precipitates on the base metal precipitated by the reduction in the reduction step. In other words, reduction of noble metal occurs only on base metal, which means that base metal and noble metal do not precipitate separately, and therefore, alloy particles capable of forming CuAu or $Cu_3Au$ hard magnetic ordered alloy can be efficiently prepared at a high yield in a prescribed composition and can be controlled to a desired composition. In addition, by controlling the stirring speed of the temperature in the aging step accordingly, a desired particle size of the alloy particles can be achieved.

It is preferable to provide a step of washing and dispersing after aging, in which the aged solution is washed with a mixed solution of water and primary alcohol and then precipitation treatment is conducted with the primary alcohol to generate precipitate, and the precipitate is dispersed in an organic solvent.

According to the step of washing and dispersing, impurities are removed and coatability in the case of forming a magnetic layer of magnetic recording media by coating can be further increased. The washing and dispersing are each conducted at least once, preferably twice.

The primary alcohol used in washing is not particularly limited, but methanol and ethanol are preferable. The mixing ratio in volume (water/primary alcohol) is preferably in the range of 10/1 to 2/1, more preferably in the range of 5/1 to 3/1. When the ratio of water is high, surfactant may be difficult to be removed, whereas when the ratio of the primary alcohol is high, agglomeration may occur.

In the above-mentioned way, alloy particles dispersed in a solution (alloy particles containing solution) is obtained.

Because of the monodispersibility of the alloy particles, uniformly dispersed state can be maintained without agglomeration even when applied on a support. Accordingly, alloy particles do not agglomerate even if annealing treatment is conducted and therefore magnetic can be efficiently achieved and the coating property is excellent. In addition, the alloy particles are excellent in self-alignment because they are prepared by the above-mentioned high pressure mixing method, and easily and reliably transformed to an ordered phase from a random phase by conducting annealing treatment. As a result, hard magnetization can be achieved efficiently.

It is preferable that the particle size of alloy particles before the oxidation treatment described later is small from the viewpoint of reducing the noise, but when it is too small, a super paramagnetic state may be caused after annealing, which is inappropriate for magnetic recording. Generally, the particle size is preferably 1 to 100 nm, more preferably 3 to 20 nm and still more preferably 3 to 10 nm.

(Reduction Method)

A general reduction method for preparing alloy particles is herein described.

There are various methods for preparing alloy particles capable of forming CuAu or $Cu_3Au$ ferromagnetic ordered alloy by a reduction method, but it is preferable to adopt at least a method of reducing an electronegative metal (hereinafter sometimes simply referred to as base metal) and an electropositive metal (hereinafter sometimes simply referred to as noble metal) in an organic solvent or water, or a mixed solution of an organic solvent and water using a reducing agent. The order of the reduction of base metal and noble metal is not particularly limited and both can be reduced simultaneously.

As the organic solvent, alcohol and polyalcohol can be used. Examples of alcohol include methanol, ethanol and buthanol and examples of polyalcohol include ethylene glycol and glycerine.

Examples of CuAu or $Cu_3Au$ ferromagnetic ordered alloy are the same as described in the reverse micelle method.

In addition, as a method for preparing alloy particles in which noble metal is precipitated first, a method described in paragraphs 18 to 30 of Japanese Patent Application No. 2001-269255 can be applied.

As an electropositive metal, Pt, Pd and Rh can be preferably used, and $H_2PtCl_6.6H_2O$, $Pt(CH_3COCHCOCH_3)_2$, $RhCl_3.3H_2O$, $Pd(OCOCH_3)_2$, $PdCl_2$ and $Pd(CH_3COCHCOCH_3)_2$ can be used by dissolving in a solvent. The concentration of the metal in the solution is preferably 0.1 to 1000 μmol/ml, more preferably 0.1 to 100 μmol/ml.

As an electronegative metal, Co, Fe, Ni and Cr can be preferably used, and Fe and Co can be particularly preferably used. Such metal can be used by dissolving $FeSO_4.7H_2O$, $NiSO_4.7H_2O$, $CoCl_2.6H_2O$ and $Co(OCOCH_3)_2.4H_2O$. The concentration of the metal in the solution is preferably 0.1 to 1000 μmol/ml, more preferably 0.1 to 100 μmol/ml.

In addition, as in the described reverse micelle method, it is preferable to lower the temperature for transforming to hard magnetic ordered alloy by adding a third element to binary alloy. The addition amount is as defined in the reverse micelle method.

For example, when precipitating base metal and noble metal by reducing in this order using a reducing agent, it is preferable that base metal or part of base metal and noble metal reduced by using a reducing agent having a reduction potential lower than −0.2 V (vs.N.H.E) is added to noble metal source, and after reducing using a reducing agent having an oxidation-reduction potential higher than −0.2 V (vs. N.H.E), reduction is conducted using a reducing agent having a reduction potential lower than −0.2V (vs.N.H.E).

The oxidation-reduction potential is dependent on the pH of the system, but as a reducing agent having an oxidation-reduction potential higher than −0.2 V (vs.N.H.E), alcohols such as 1,2-hexanedecane diol, glycerines, $H_2$ and HCHO are preferably used.

As a reducing agent having an oxidation-reduction potential lower than −0.2 V (vs.N.H.E), $S_2O_6^{2-}$, $H_2PO_2-$, $BH_4-$, $N_2H_{5+}$ and $H_2PO_3-$ can be preferably used.

When a nonvalent metal compound such as Fe carbonyl is used as a material of base metal, a reducing agent of base metal is not particularly needed.

When precipitating noble metal by reduction, alloy particles can be securely prepared with the presence of an adsorbing agent. As the adsorbing agent, a polymer and a surfactant are preferably used.

Example of the polymer include poly(vinyl alcohol)(PVA), poly(N-vinyl-2 pyrrolidone)(PVP) and gelatine. Of these, PVP is particularly preferable.

The molecular weight of the polymer is preferably 20,000 to 60,000, more preferably 30,000 to 50,000. The amount of the polymer is preferably 0.1 to 10 times, more preferably 0.1 to 5 times the mass of the alloy particles to be prepared.

It is preferable that the surfactant preferably used as an adsorbing agent contains an "organic stabilizer" which is a long-chain organic compound represented by the formula R—X. The symbol R in the formula represents a "tail group" which is a linear or branched hydrocarbon or fluorocarbon chain, and usually contain 8 to 22 carbon atoms. The symbol X in the formula represents a "head group" which is a moiety (X) that gives a specific chemical reaction on the surface of the alloy particles, and X is preferably any of sulfinate (—SOOH), sulfonate (—SO$_2$OH), phosphinate (—POOH), phosphonate (—OPO(OH)$_2$), carboxylate and thiol.

The organic stabilizer is preferably any of sulfonic acid (R—SO$_2$OH), sulfinic acid (R—SOOH), phosphinic acid (R$_2$POOH), phosphonic acid (R—OPO(OH)$_2$), carboxylic acid (R—COOH) and thiol (R—SH). Of these, oleic acid is particularly preferable as in the reverse micelle method.

A combination of phosphine and the organic stabilizer (triorganophosphinic acid, etc) can give excellent controllability for the growth and the stabilization of particles. Didecyl ether and didodecyl ether can also be used, but phenyl ether and n-octyl ether are preferably used because of the low cost and the high boiling point.

In a general reduction method of preparing alloy particles, however, a reaction is conducted at a higher temperature than −5° C. to 30° C., which is the mixing reaction temperature in a mixing reaction using a microreactor as in the present invention. That is, the reaction is usually conducted within a temperature range of 80° C. to 360° C., more preferably 80° C. to 240° C., depending on the boiling points of the necessary alloy particles and the solvents. This is because, in a general reduction method, particles may not grow when the temperature is lower than the temperature range, while the particles grow beyond control and the generation of unpreferable by-product may increase when the temperature is higher than the range.

The particle size of the alloy particles is preferably 1 to 100 nm, more preferably 3 to 20 nm and still more preferably 3 to 10 nm, as in the reverse micelle method, which is the same as in the present invention.

As a method of increasing the particle size (particle size), a crystal seeding is effective. When used as magnetic recording media, closest packing of alloy particles is preferable for increasing the recording capacity and for that purpose, the standard deviation of the particle size of the alloy particles is preferably less than 10%, more preferably not more than 5%. In the present invention, the size of the alloy particles is defined by the coefficient of variation. The coefficient of variation is not more than 15%, preferably not more than 10%.

Too small a particle size causes a super paramagnetic state and is not preferable. Thus, in order to increase the particle size, a crystal seeding is preferably used as already described. In doing so, a metal having an oxidation-reduction potential higher than that of the metal constituting the particles is to be precipitated in some cases. In this case, the oxidation of the particles is anticipated and thus the particles may be hydrogenated in advance.

In view of preventing oxidation, the outermost layer of the alloy particles is preferably formed by a noble metal. However, because agglomeration can easily occur, an alloy of noble metal and base metal is preferable in the present invention. Such construction can be achieved easily and efficiently by the liquid phase method which has been already described.

It is preferable to remove salts from the solution after synthesizing alloy particles in view of increasing the dispersion stability of the alloy particles. For demineralization, there is a method in which excess of alcohol is added to cause mild agglomeration and salts are removed with the supernatant after plain sedimentation or centrifugal sedimentation. Such method, however, easily causes agglomeration and therefore an ultrafiltration method is preferably adopted.

In this manner, alloy particles dispersed in a solution (alloy particles containing solution) can be obtained.

For the evaluation of the particle size of the alloy particles, a transmission electron microscope (TEM) can be used. To determine the crystal system of the alloy particles or the magnetic particles, electron diffraction by TEM is available but X-ray diffraction is preferable because of higher accuracy. For the internal composition analysis of the alloy particles or the magnetic particles, it is preferable to conduct evaluation by attaching EDAX to FE-TEM by which the electron beam can be narrowed. In addition, the evaluation of magnetic properties of the alloy particles or the magnetic particles can be conducted by using VSM.

[Oxidation Step]

By conducting oxidation treatment to the prepared alloy particles, magnetic particles having hard magnetic properties can be produced without increasing the temperature in the subsequent annealing treatment under a non-oxidation atmosphere. This is assumed to be due to the phenomenon explained below.

That is, first, oxygen enters upon the crystal lattice by the oxidation of the alloy particles. When annealing treatment is conducted with the oxygen thereon, the oxygen is eliminated from the crystal lattice by heat. It is considered that the elimination of oxygen brings about a defect and the movement of the metal atoms constituting the alloy becomes easy due to the defect, and therefore the phase transformation occurs easily even at a relatively low temperature. Accordingly, the temperature of the annealing treatment can be further decreased by conducting oxidation treatment to the alloy particles having excellent self-alignment property prepared by the described high-pressure mixing method.

This phenomenon can be inferred from, for example, the measurement of the alloy particles after oxidation treatment and the magnetic particles to which annealing treatment is conducted by EXAFS (Extended X-ray Absorption Fine Structure).

For example, in Fe—Pt alloy particles without oxidation treatment, bonding of an Fe atom with a Pt atom or an Fe atom can be confirmed.

On the other hand, in the alloy particles to which oxidation treatment is conducted, bonding of an Fe atom and an oxygen atom can be confirmed. However, bonding with a Pt atom or an Fe atom can hardly be found. This indicates that bondings of Fe—Pt and Fe—Fe have been broken by the oxygen atoms. It is assumed that this has made the Pt atoms and the Fe atoms easy to move.

Then, after the annealing treatment is conducted to the alloy particles, the presence of oxygen atoms cannot be confirmed, and the presence of bonding with a Pt atom or an Fe atom can be found around Fe atoms.

In consideration of the above-mentioned phenomenon, it is suggested that the phase transformation is difficult to proceed without oxidation and it becomes necessary to increase the temperature of the annealing treatment. It is also considered, however, that excess oxidation enhances interaction between easily oxidizable metal such as Fe and oxygen too much, thereby generating metal oxide.

For this reason, controlling the state of oxidation of alloy particles is important and to achieve this, the conditions of the oxidation treatment must be set to be optimal.

For the oxidation treatment, for example, when alloy particles have been prepared by the described liquid phase method, at least a gas containing oxygen is supplied to the prepared solution containing alloy particles.

The partial pressure of oxygen in this case is preferably 10 to 100%, more preferably 15 to 50% of the total pressure. In addition, the temperature of the oxidation treatment is preferably 0° C. to 100° C., more preferably 15° C. to 80° C.

The state of oxidation of alloy particles is preferably evaluated by EXAFS and the like, and the number of bondings of base metal such as Fe and oxygen is preferably 0.5 to 4, more preferably 1 to 3 from the viewpoint that oxygen breaks Fe—Fe bonding and Pt—Fe bonding.

[Step of Annealing Treatment]

The alloy particles after oxidation treatment have a random phase. As already described, hard magnetic properties cannot be obtained from the random phase. Given this fact, thermal treatment (annealing) needs to be conducted to form an ordered phase. The thermal treatment needs to be conducted at a temperature of not less than the transformation temperature which is found by using differential thermal analysis (DTA) and at which the alloy constituting the alloy particles undergoes order-disorder transformation.

The transformation temperature is usually about 500° C., but as the self-alignment property of the prepared alloy particles improves by mixing according to a high pressure method in the already described reduction step, the temperature can be lowered from the temperature usually employed. Accordingly, the temperature of annealing treatment is preferably not less than 100° C., more preferably 100° C. to 500° C. Further, addition of a third element may also lower the temperature.

In addition, when annealing treatment of particles is conducted, movement of particles easily occurs and fusion tends to be caused. Thus, although a high coercivity can be achieved, there easily arises a defect that the particle size becomes greater. Therefore, annealing treatment is preferably conducted after applying on a support from the viewpoint of prevention of the agglomeration of alloy particles.

Magnetic particles are produced by annealing the alloy particles on a support, and magnetic recording media having a magnetic layer made of the magnetic particles can be provided.

As a support, any of inorganic or organic support may be used as long as it is for magnetic recording media.

As the inorganic support Al, magnesium alloys such as Al—Mg and Mg—Al-LMn, glass, quartz, carbon, silicon and ceramics are used. These supports are excellent in impact resistance and have rigidity suitable for thinning and high speed revolution. In addition, compared to an organic support, the inorganic support has a heat-resistant characteristic.

As the organic support, polyesters such as polyethylene terephthalate and polyethylene naphthalate; polyolefins; cellulose triacetate, polycarbonate, polyamide (including aliphatic polyamide and aromatic polyamide such as aramid), polyimide, polyamide imide, polysulfone and polybenzoxazole can be used.

The alloy particles are applied on a support after adding various additives as needed to the solution containing alloy particles to which the above-mentioned oxidation treatment has been conducted.

The content of alloy particles in this case is preferably set to a desired concentration (0.01-0.1 mg/ml).

As a method for coating on a support, air doctor coat, blade coating, rod coating, extrusion coating, air knife coating, squeeze coating, impregnation coating, reverse roll coating, transfer roll coating, gravure coating, kiss coating, cast coating, spray coating and spin coating can be used.

The atmosphere for conducting annealing treatment is a non-oxidation atmosphere of $H_2$, $N_2$, Ar, He or Ne to advance the phase transformation efficiently and prevent the oxidation of alloy.

In particular, a reducing atmosphere such as methane, ethane or $H_2$ is preferable from the viewpoint of eliminating oxygen which has been present on the lattice by oxidation treatment. In addition, it is preferable to conduct annealing treatment in a magnetic field under a reducing atmosphere from the viewpoint of maintaining the particle size. In the case of $H_2$ atmosphere, it is preferable to mix inert gas from the viewpoint of explosion proof.

In addition, to prevent fusion of the particles in the annealing process, it is preferable that the annealing treatment is once conducted in inert gas at a temperature not more than the transformation temperature to carbonize dispersant, and then the annealing treatment is conducted in a reducing atmosphere at a temperature not less than the transformation temperature. At this stage, a most preferred aspect is to conduct annealing treatment at a temperature not less than the transformation temperature by applying Si resin on a layer comprising the alloy particles, after the above-mentioned annealing treatment at a temperature not more than the transformation temperature.

The alloy particles undergo phase transformation from the random phase to an ordered phase by the annealing treatment described above, and the magnetic particles having hard magnetic properties can be obtained.

The magnetic particles produced by the already described method of producing magnetic particles of the present invention has a coercivity of preferably 95.5 to 955 kA/m (1200 to 12000 Oe), more preferably 95.5 to 398 kA/m (1200 to 5000 Oe) in consideration of possible respondence of the recording head when applied to magnetic recording media.

The particle size of the magnetic particles is preferably 1 to 100 nm, more preferably 3 to 20 nm, further preferably 3 to 10 nm.

<<Magnetic Recording Media>>

The magnetic recording media of the present invention contain magnetic particles in the magnetic layer, wherein the magnetic particles are produced by the already described method of producing magnetic particles of the present invention.

Examples of the magnetic recording media include magnetic tapes such as videotapes and computer tapes and magnetic disks such as flexible(R) disk and hard disk. As described above, when magnetic particles are formed by applying alloy particles (alloy particle containing solution) on a support and annealing treatment, the layer made of the magnetic particles can be a magnetic layer. On the other hand, when magnetic particles are prepared by annealing treatment of particles, not by annealing treatment on a support, a magnetic layer may be formed by preparing a coating solution by kneading the magnetic particles by an open kneader or a three roll mill and then finely dispersing by a sand grinder and the like, and then applying the solution to a support according to a known method.

The thickness of the magnetic layer to be formed is preferably 4 nm to 1 μm, more preferably 4 nm to 100 nm depending on the kind of magnetic recording media to which the magnetic layer is applied.

The magnetic recording media of the present invention may have a layer other than the magnetic layer where necessary. For example, in the case of a diskette, a magnetic layer or a non-magnetic layer is preferably formed on the opposite side of the magnetic layer. In the case of a tape, a back layer is preferably formed on the surface of the insoluble support located at the opposite side of the magnetic layer.

In addition, by increasing abrasion resistance by forming an extremely thin protective film on the magnetic layer and by increasing on by improving sliding property by applying a lubricant on the protective film, sufficiently reliable magnetic recording media can be obtained.

Examples of the materials of the protective film include oxides such as silica, alumina, titania, zirconia, cobalt oxide and nickel oxide; nitrides such as titanium nitride, silicon nitride and boron nitride; carbides such as silicon carbide, chromium carbide and boron carbide; and carbons such as graphite and amorphous carbon. The material is more preferably hard amorphous carbon generally called diamond-like carbon.

A carbon protective film made of carbon has sufficient abrasion resistance even with an extremely thin film thickness and less likely to cause burning on a sliding member, and thus the film preferable as a material of protective films.

As a method of forming a carbon protective film, a sputtering method is generally used for hard disk, but for products such as videotapes which require continuous film forming, a number of methods using plasma CVD which have a higher film forming speed have been suggested. Therefore, it is preferable to adopt these methods.

It is reported that of these, a plasma injection CVD (PI-CVD) has an extremely high film forming speed and produces a high quality hard carbon protective film having few pinholes (e.g., Japanese Patent Application Laid-open No. 61-130487, Japanese Patent Application Laid-open No. 63-279426, Japanese Patent Application Laid-open No. 3-113824, etc).

The carbon protective film has a Vickers hardness of preferably not less than 1000 Kg/mm$^2$, more preferably 2000 Kg/mm$^2$. It is preferable that the carbon protective film has an amorphous crystal structure and is non-conductive.

When a diamond-like carbon film is used as a carbon protective film, the structure can be confirmed by Raman spectrophotometry. That is, the structure can be confirmed by the detection of a peak at 1520 to 1560 cm$^{-1}$ when the diamond-like carbon film is subjected to measurement. When the structure of the carbon film shifts from the diamond-like structure, the peak detected by Raman spectrophotometry shifts from the above-mentioned range and the hardness of the protective film also decreases.

As carbon materials for forming the carbon protective film, it is preferable to use compounds containing carbon including alkanes such as methane, ethane, propane and butane, alkenes such as ethylene and propylene and alkines such as acetylene. In addition, carrier gas such as argon or additive gas for improving film properties such as hydrogen or nitrogen can be added where necessary.

A large film thickness of the carbon protective film causes deterioration of magnetic parametric performance or decrease in the adhesion to the magnetic layer, while a small film thickness causes insufficient abrasion resistance. Accordingly, the film thickness is preferably 2.5 to 20 nm, more preferably 5 to 10 nm.

To improve the adhesion between the protective film and the magnetic layer which is the substrate, it is preferable to conduct surface modification in advance by etching on the magnetic layer surface using inert gas or by exposing to reactive gas plasma such as oxygen.

The magnetic layer may have a multi-layered structure or have a known non-magnetic underlayer or an intermediate layer below the magnetic layer for improving the magnetic parametric performance. To improve the running durability and the corrosion resistance, it is preferable to apply a lubricant or a rust proofing agent on the magnetic layer or the protective film as already described. As a lubricant to be added, known hydrocarbon lubricants, fluorine lubricants and extreme-pressure additives can be used.

Examples of hydrocarbon lubricants include carboxylic acids such as stearic acid and oleic acid; esters such as butyl stearate; sulfonic acids such as octadecyl sulfonic acid; phosphoric esters such as phosphoric monooctadecyl; alcohols such as stearyl alcohol and oleyl alcohol; carboxylic amides such as stearic acid amide; and amines such as stearylamine.

Examples of fluorine lubricants include lubricants such that part or all of the alkyl groups of the above-mentioned hydrocarbon lubricants are substituted by a fluoroalkyl group or a perfluoropolyether group.

Examples of the perfluoropolyether group include a perfluoromethylene oxide polymer, a perfluoroethylne oxide polymer, a perfluoro-n-propylene oxide polymer $(CF_2CF_2CF_2O)_n$, a perfluoroisopropylene oxide polymer $(CF(CF_3)CF_2O)_n$ or a copolymer thereof.

In addition, a compound having a polar functional group such as a hydroxyl group, an ester group or a carboxyl group at the terminal of the alkyl group or in the molecule of the hydrocarbon lubricant is preferable because the effect of reducing frictional force is high.

The molecular weight of the lubricant is 500 to 5000, preferably 1000 to 3000. When the molecular weight is less than 500, the lubricant may have high volatility and low lubricity. When the molecular weight exceeds 5000, the viscosity becomes high and thus the slider and the disk easily adheres, and shutdown or head crush tend to occur easily.

Such perfluoropolyether is commercially offered with product names such as FOMBLIN available from Ausimont and KRYTOX available from Dupont as specific examples.

Examples of extreme-pressure additives include phosphoric esters such as trilauryl phosphate; phosphorous esters such as trilauryl phosphite; thiophosphorous esters or thiophosphoric esters such as trilauryl trithiophosphite; and sulfur extreme-pressure additives such as dibenzyl disulfide.

The lubricant may be used alone or a plurality of lubricants are used together. As a method of applying lubricant to a magnetic layer or a protective film, the lubricant is dissolved in an organic solvent and then applied according to a wire bar method, a gravure method, a spin coating method or a dip coating method, or adhered by a vacuum deposition method.

Examples of the rust-proofing agent include nitrogen containing heterocycles such as benzotriazole, benzoimidazole, purine and pyrimidine and derivatives to which an alkyl side chain is introduced to the nucleus thereof; nitrogen and sulfur containing heteroxycles such as benzothiazole, 2-mercaptobenzothiazole, tetrazaindene ring compound and thiouracil compounds, and derivatives thereof.

As already described, in the case that the magnetic recording media is a magnetic tape, a back coat layer (backing layer) may be formed on the surface of a non-magnetic support without a magnetic layer. The back coat layer is formed by applying a back coat layer forming coating in which a particle component such as a polishing agent or an antistatic agent and a binding agent are dispersed in a known organic solvent on the surface of a non-magnetic support without a magnetic layer.

As a particle component, various organic pigments and carbon black can be used. As a binding agent, nitrocellulose and resins such as phenoxy resin, vinyl chloride resin and polyurethane can be used alone or in a mixture thereof.

In addition, a known adhesive layer may be formed on the surfaces to which an alloy particles containing solution is applied and on which a back coating layer is formed.

The magnetic recording media produced as described above have a surface centerline average roughness of preferably 0.1 to 5 mm, more preferably 1 to 4 nm at a cutoff value of 0.25 mm. This is because forming a surface having an extremely good smoothness is preferable for magnetic recording media for high density recording.

Examples of the method of obtaining such surface include a method in which calender treatment is conducted after forming a magnetic layer. Alternatively, varnish treatment may also be conducted.

The obtained magnetic recording media can be used after punching by a punching machine or cutting into a desired shape by a cutting machine, as necessary.

(2) Reaction Method Using Microreactor and Microreactor

Next, a reaction method using a microreactor and a microreactor suitable for the case involving generation of by-product gas in the production of magnetic particles explained above is described. As the reaction method using a microreactor can be applied to all the reactions by a liquid-liquid reaction where by-product gas is generated in addition to the production of magnetic particles, explanation is made by replacing the term "solution" used above with "liquid" in the following.

First Embodiment

Figure 9:
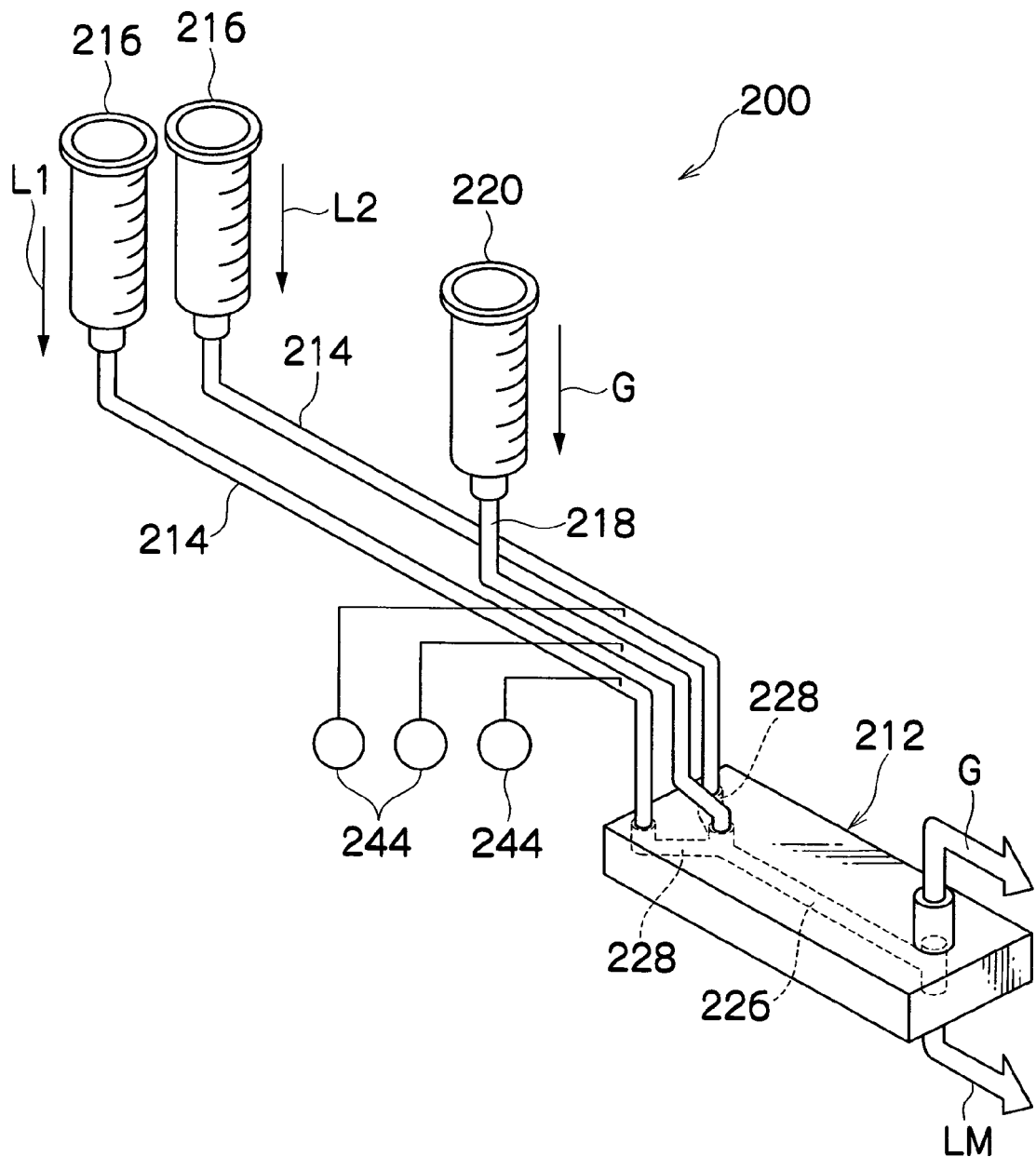
FIG. 9 is a perspective view illustrating the concept of the laminate flow microreactor which is the first embodiment of the present invention.
Figures 10A, 10B:
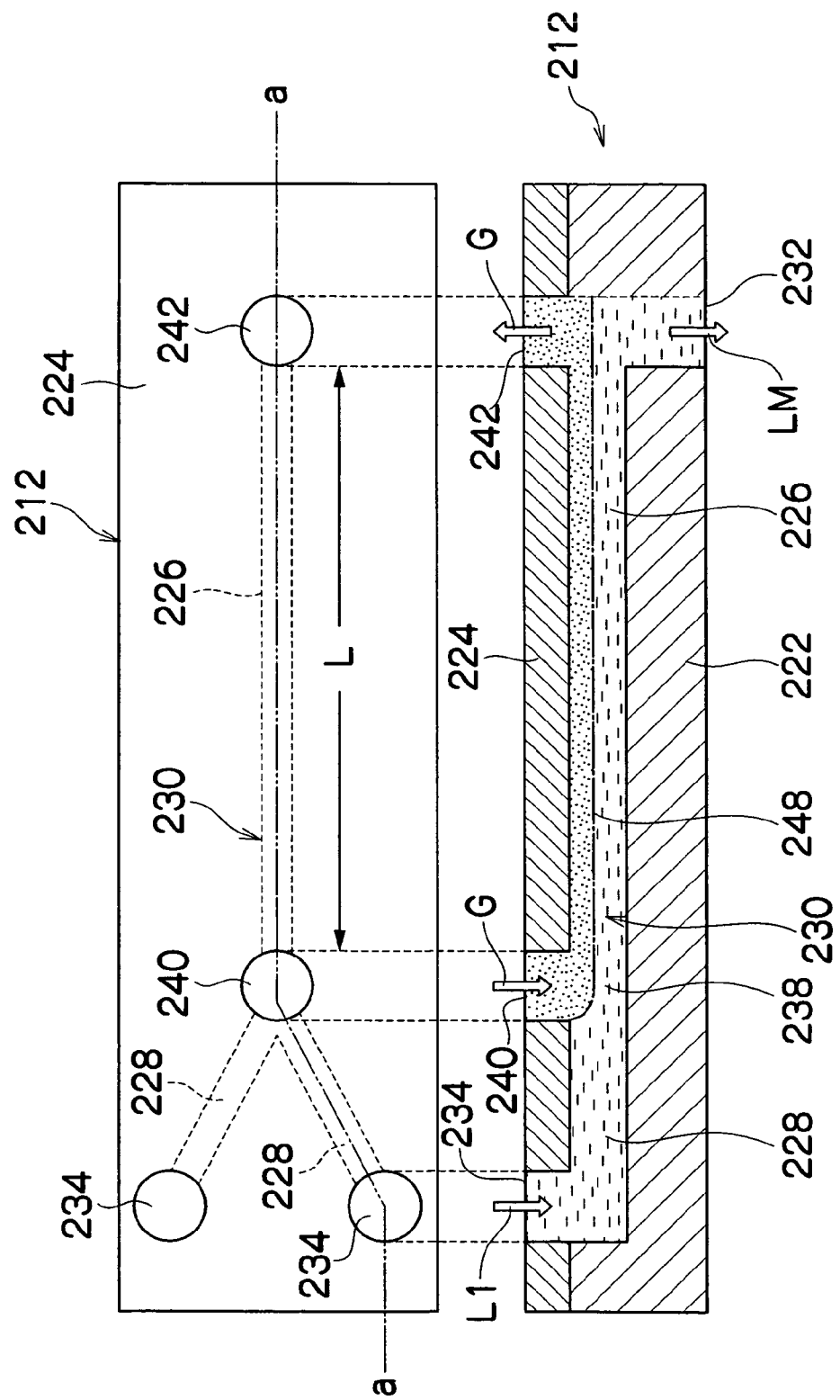
FIGS. 10A and 10B are a top view and a cross-sectional view of the main body of a microreactor.

FIG. 9 is a perspective view illustrating the concept of the microreactor according to the first embodiment of the present invention, which is laminate flow microreactor 200. FIG. 10A is a top view of a microreactor main body (hereinafter referred to as main body 212) and FIG. 10B is a cross-sectional view taken on line a-a of FIG. 10A.

As shown in FIG. 9, laminate flow (substantially synonymous with parallel tube structure) microreactor 10 is mainly composed of a main body 212, liquid supply devices 216 and 216 which supply liquids L1 and L2 for liquid-liquid reaction to the main body 212 via liquid supply pipes 214 and 214, and a gas supplying device 220 which supplies gas G unreactive to liquids L1 and L2 for liquid-liquid reaction to the main body 212 via gas supply pipe 218. In this embodiment, explanation is made referring to an example of a liquid-liquid reaction involving generation of by-product gas using two liquids L1 and L2.

As shown in FIGS. 10A and 10B, the main body 212 is composed of a main body member 222 and lid member 224 and on the main body member 222 is formed a Y-shaped liquid channel 230 having a microchannel 226 for conducting a liquid-liquid reaction of two liquids L1 and L2 and two liquid supply channels 228 and 228 which combine the liquids L1 and L2 at the microchannel 226. In addition, at the terminal of the microchannel 226, a liquid discharge opening 232 for discharging the reaction product liquid LM by the liquid-liquid reaction is formed. On the other hand, lid member 224 has two liquid inlet ports 234 and 234 which introduce the liquids L1 and L2 to the two liquid supply channels 228 and 228, and each of the above-mentioned two liquid supply pipes 214 and 214 are connected to the two liquid inlet ports 234 and 234. In addition, a gas inlet port 240 which introduces gas G to the microchannel 226 from the upper side of the microchannel 226 is formed at the position on the lid member 224 corresponding to a merging point 238 at which the two liquid supply channels 228 and 228 are combined with the microchannel 226. The above-mentioned gas supply pipe 218 is connected to the gas inlet port 240. In addition, a gas exhaust port 242 which discharges gas supplied to the microchannel 226 is formed at the position on the lid member 224 corresponding to the liquid discharge opening 232. By this, the gas G introduced from the gas inlet port 240 at the merging point 238 of the two liquids L1 and L2 flowing through the Y-shaped liquid channel 230 flows through the microchannel 226 and is discharged from the gas exhaust port 242. The gas G used here may be air as long as it does not react with the liquids L1 and L2, but for a multi-purpose use, inert gas such as nitrogen gas is preferable.

As the microchannel 226, a minute channel having an equivalent diameter of not more than 1 mm (1000 μm), preferably not more than 500 μm is preferable. The microchannel 226 generally has a quadrangular cross section in the radial direction, but the shape is not limited to quadrangles. When two liquid supply channels 228 and 228 are used, it is preferable that the equivalent diameter of one of the liquid supply channels 228 is designed to be half of that of the microchannel 226. For example, when the width and the depth of the microchannel 226 having a quadrangular cross section in the radial direction is 500 μm and 200 μm, the width and the depth of the one liquid supply channel 228 is set to be 250 μm and 200 μm. In addition, the length L of the microchannel 226 (see FIG. 2) is set to a length in which the liquid-liquid reaction is completed and is different depending on the kind of the liquid-liquid reaction.

To fabricate the main body 212 having such micro-order, minute Y-shaped liquid channel 230, microprocessing technology is used. The Y-shaped liquid channel 230 and inlet ports 234 and 240 and discharge openings 232 and 242 of the liquids L1 and L2 and the gas G are formed on the main body member 222 by microprocessing technology, and the lid member 224 is covered on the top surface of the main body member 222 to joint the main body member 222 and the lid member. Examples of the microprocessing technology include the followings.

(1) LIGA technology in which X-ray lithography and electroplating is combined
(2) High aspect ratio photolithography using EPON SU8
(3) Mechanical micro-cutting (micro-drill processing in which a drill having a micro-order diameter is rotated at a high speed)
(4) High aspect ratio processing of silicon by Deep RIE
(5) Hot embossing
(6) Stereo lithography
(7) Laser processing
(8) Ion beam method As the material for fabricating the main body 212, glass, ceramics, plastic, silicon and Teflon can be suitably used depending on the required heat resistance, pressure resistance, solvent resistance and ease in processing. In the fabrication of the main body 212, fabrication of the Y-shaped liquid channel 230 is certainly important, but bonding technology for bonding the lid member 224 to be covered on the Y-shaped liquid channel 230 to the main body member 222 is also important. For the bonding method of the lid member 224, a desired method is a high-precision method which can maintain dimensional accuracy without destruction of Y-shaped liquid channel 230 due to property change or deformation of materials by high temperature heating. It is preferable to select solid-state bonding (e.g., pressure welding bonding, diffusion bonding, etc.) and liquid-state bonding (e.g., welding, eutectic bonding, soldering, adhesion etc.) in relation to fabrication materials. For example, when using silicon as a material, direct silicon bonding in which silicon is bonded with each other is used, and fusion welding for bonding glass, anode bonding for bonding silicon and glass and diffusion bonding for bonding metals can also be used. For bonding of ceramics, a bonding technology other than mechanical sealing is necessary as in the case of metal, and there is a method in which a bonding agent called glass solder is printed on alumina in 80 μm by screen printing and treatment is conducted at 440° C. to 500° C. without applying pressure. In addition, there are some new bonding technologies which are being developed, such as surface activation bonding, direct bonding using hydrogen bond and bonding using an aqueous HF (hydrogen fluoride) solution.

As the liquid supply device 216 and the gas supplying device 220 used in the microreactor 200 of the present invention, a continuous fluidized syringe pump which also controls the supply pressure of the liquids L1 and L2 and the gas G can be preferably used, which is described as examples of syringe pumps 216 and 220 in the following. A microreactor requires liquid control technology for introducing the liquids L1 and L2 and the gas G into the microchannel 226. In particular, behavior of liquid and gas in the micro-order, minute microchannel 226 is different from micro scale, and therefore a fluid control system suitable for micro scale must be adopted. In a continuous fluid system, the interiors of the main body 212 and the channels reaching the main body 212 are all filled with fluid and the entire fluid is driven by the syringe pumps 216 and 220 provided outside, optionally controlling the supply pressure and the supply flow rate of the liquids L1 and L2 and the supply pressure and the supply flow rate of the gas G supplied to the microchannel 226. In addition, as in FIG. 9, pressure gauges 244, 244 and 244 are each provided on the liquid supply pipes 214 at the positions near the liquid supplying opening 234 and on the gas supply pipe 218 near the gas inlet port 240 to monitor the supply pressure of the liquids L1 and L2 the supply pressure of the gas G.

Although not particularly shown in the first embodiment, a temperature control device for controlling the temperature of the liquid-liquid reaction in the microreactor 200 may be provided. For a temperature control method when conducting a reaction in the microreactor 200, a classical method of supplying warm water and cold water to the microreactor is known. In addition to this, conventional temperature control methods include a method in which a heater structure such as metal resistance line or polysilicon is fabricated in the microreactor. In the case of the heater structure such as metal resistance line or polysilicon, the structure is used for heating and for cooling, a thermal cycle is conducted with natural cooling. For sensing the temperature in this case, another same resistance line may be incorporated in the case of metal resistance line and the temperature is detected based on the variation of the resistance value. In the case of polysilicon, a method of conducting temperature detection by using a thermocouple is generally adopted. In addition, in recent years, it is attempted to conduct accurate temperature control in the reaction by incorporating a Peltier element into the main body 212. In any case, temperature control itself is possible by both the conventional temperature control technologies or novel temperature control technologies represented by the Peltier element, and it is important to select an optimal method by combining the selection of the heating and cooling mechanism and the temperature sensing mechanism in accordance with purposes and materials of the main body 212 and the construction of the external control system.

Next, a reaction method of the present invention in which a liquid-liquid reaction involving generation of by-product gas is conducted using a laminate flow microreactor 200 constructed as above is described.

Liquids L1 and L2 supplied to liquid supply channels 228 and 228 from syringe pumps 216 and 216 are combined at the microchannel 226 at the merging point 238 and passed in a thin-line laminar flow, and the liquids L1 and L2 are diffused to the direction normal to the contact surface, whereby a liquid-liquid reaction occurs. By-product gas is generated by the liquid-liquid reaction, and the bubbles of the generated by-product gas are accumulated and agglomerated in the microchannel 226 and a slug flow which is a gas-liquid mixed flow is generated in the microchannel 226. As a result, continuous line of processing of liquids L1 and L2 to be reacted is obstructed or disturbed, and the line becomes unstable and the reaction field becomes uneven, while the equilibrium of the reaction is difficult to be shifted to the direction where the reaction is promoted. In addition, when the temperature of liquid is controlled for the reaction and if the by-product gas is not efficiently removed in the continuous processing line, the reaction temperature cannot be accurately controlled because of small thermal conductivity of the gas.

Figure 11:
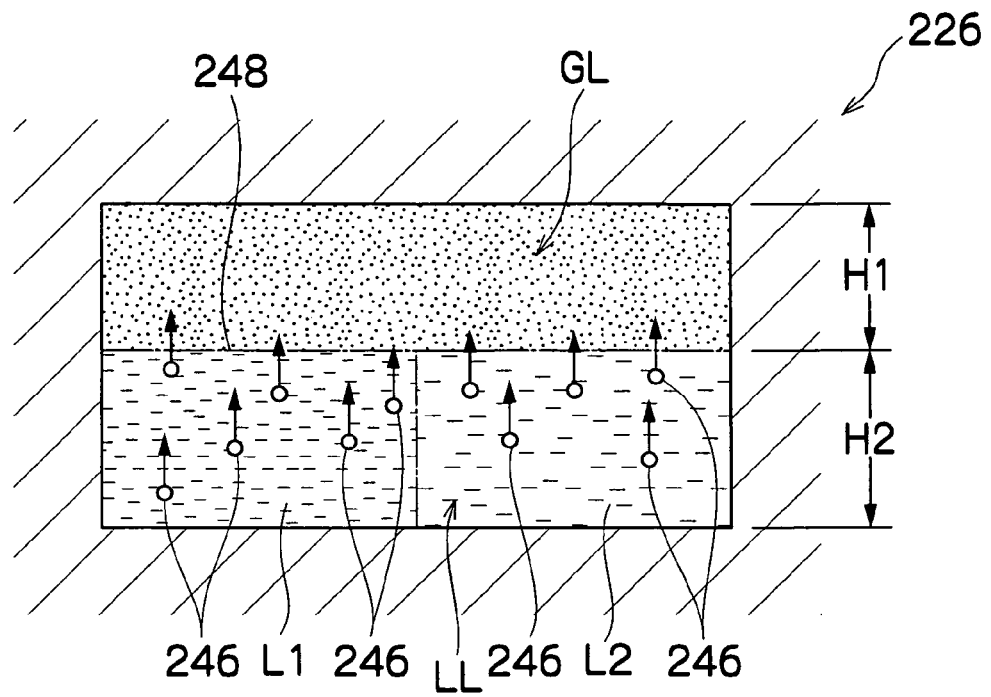
FIG. 11 is an illustrative view illustrating the flow of the microchannel when conducting a liquid-liquid reaction involving generation of by-product gas using a laminate flow microreactor of the present invention.

Given this fact, in the reaction method of the present invention, as shown in FIG. 11, a liquid-liquid reaction is conducted by supplying a gas G unreactive to liquids L1 and L2 for the liquid-liquid reaction to the microchannel 226 to form a gas layer GL (Gas Layer) on a liquid layer LL (Liquid Layer) comprising the liquids L1 and L2, and incorporating the by-product gas generated by the liquid-liquid reaction and ascending through the liquid layer LL into the gas layer GL and discharging the by-product gas outside of the microchannel 226 with the gas G. The important thing when passing the gas G through the microchannel 226 is that the liquids L1 and L2 in the microchannel 226 do not prevent the flow of the gas G and that the gas G and the liquids L1 and L2 are not mixed to generate a gas-liquid mixed flow. For this purpose, the syringe pump 220 for the gas G is controlled and the supply pressure and the supplying slow rate of the gas G supplied to the microchannel 226 are optimized. That is, when a gas G unreactive to the liquids L1 and L2 is supplied to the upper side of the flow of the liquids L1 and L2 combined at the microchannel 226 from the liquid supply channels 228 and the supply pressure of the gas G is gradually increased, the flow in the microchannel 226 changes from a slug flow to an annular flow, whereby a gas layer GL separated at the gas-liquid interface 248 is formed on the liquid layer LL as shown in FIG. 11. The supply pressure and the supply flow rate of the gas G in the annular flow state are maintained. As a result, bubbles 246 of the by-product gas generated by the liquid-liquid reaction and ascending through the liquid layer LL ascends through the liquid layer LL without being accumulated in the microchannel 226 and are continuously incorporated into the gas layer GL, and the by-product gas incorporated into the gas layer GL is discharged through the gas exhaust port 242 with the gas G. Consequently, the flow in the microchannel 226 does not become unstable even if a liquid-liquid reaction involving generation of by-product gas is conducted using the microreactor 200. Accordingly, the equilibrium of the reaction is easily shifted to the direction where the reaction is promoted, and accurate control of the reaction temperature becomes easy. In this case, the amount of the by-product gas generated is different depending on the kind of the liquid-liquid reaction, and an annular flow in the microchannel 226 is easily formed in some cases but difficult in other cases, and therefore, of the pressure and the flow rate for supplying the liquids L1 and L2 to the microchannel 226 and the pressure and the flow rate for supplying the gas G to the microchannel 226, at least the pressure and the flow rate of the gas needs to be controlled so that the flow in the microchannel 226 becomes annular. An annular flow is easy to be formed when the thickness H1 of the gas layer GL is approximately not less than 80% the relative to the thickness H2 of the liquid layer LL as shown in FIG. 11, although the situation depends on the kind and the temperature of the gas and the liquid. Accordingly, it is preferable to control the supply flow rate of the liquids L1 and L2 and the gas G from the syringe pump 216 and 220, while monitoring the pressure of the liquids L1 and L2 flowing the liquid supply pipes 214 and the pressure of the gas G flowing through the gas supply pipe 218 using a pressure gauge 244 (see FIG. 9).

Figure 12:
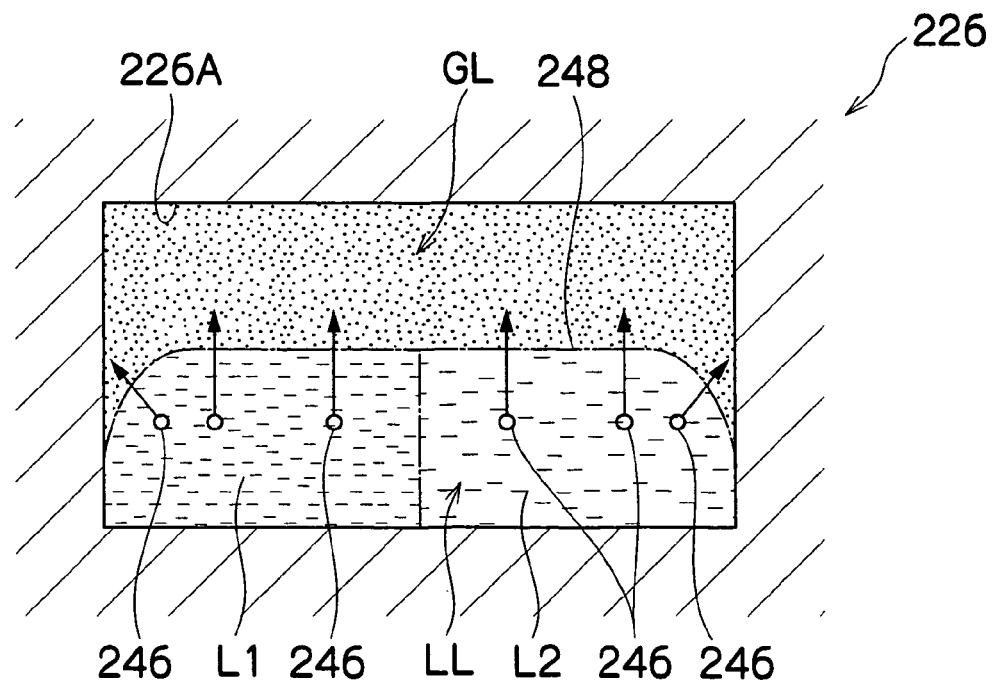
FIG. 12 is an illustrative view illustrating the configuration of the gas-liquid interface when the inner wall of the microchannel has been treated by hydrophobic treatment.
Figure 13:
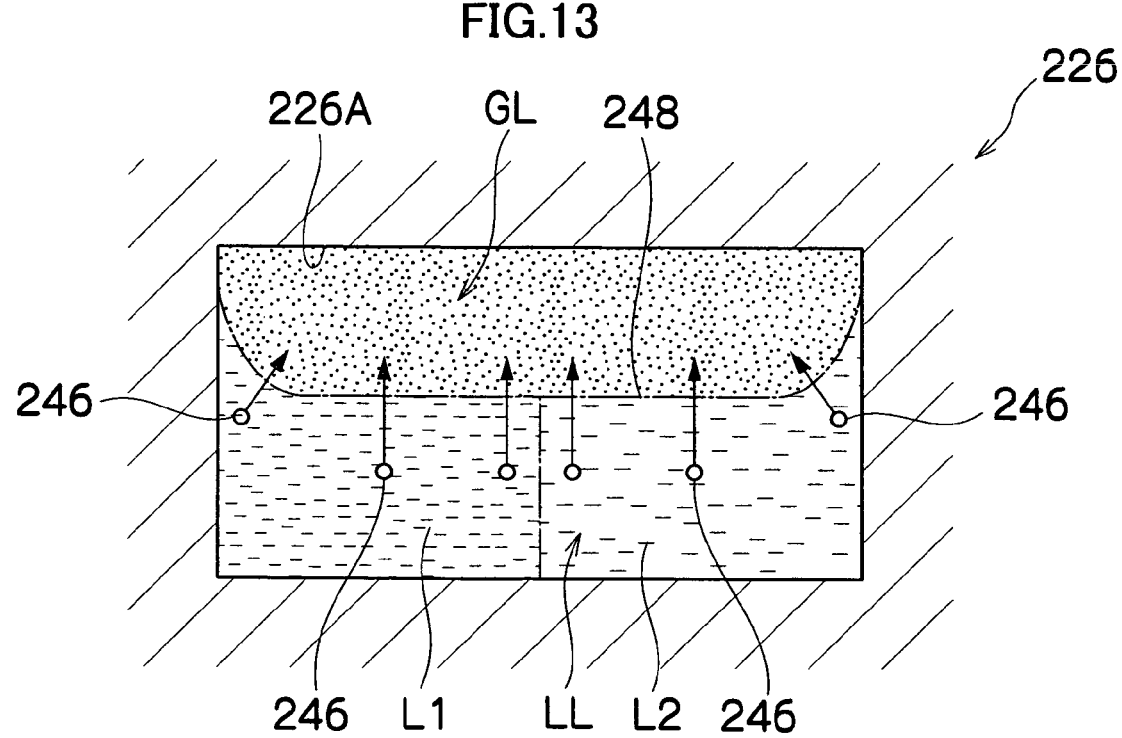
FIG. 13 is an illustrative view illustrating the configuration of the gas-liquid interface when the inner wall of the microchannel has been treated by hydrophilic treatment.

In addition, it is preferable to conduct hydrophobic treatment or hydrophilic treatment on the inner wall 226A of the microchannel 226. When the inner wall 226A of the microchannel 226 is made hydrophobic, the gas-liquid interface 248 of the gas layer GL and the liquid layer LL at a cross section perpendicular to the flow direction of the microchannel 226 is inverted concave as the upper side gas layer GL encloses the lower side liquid layer LL as shown in FIG. 12. When the inner wall 226A of the microchannel 226 is made hydrophilic, the gas-liquid interface 248 of the gas layer GL and the liquid layer LL at a cross section perpendicular to the flow direction of the microchannel 226 is concave as the lower side liquid layer LL encloses the upper side gas layer GL as shown in FIG. 13. According to this, in both cases of the hydrophobic treatment and the hydrophilic treatment, the gas-liquid interface 248 becomes stable and the area of the gas-liquid interface 248 becomes grater than that of a straight interface (gas-liquid interface in FIG. 11), and thus it becomes easier for the by-product gas from the liquid layer LL to be incorporated into the gas layer GL. In particular, as the microchannel 226 of the microreactor 200 is a minute channel having an equivalent diameter of not more than 1 mm, the gas incorporation effect can be improved by the increased area of the gas-liquid interface 248.

As described above, according to the present invention, because the by-product gas generated by the liquid-liquid reaction in the minute microchannel 226 having an equivalent diameter of not more than 1 mm can be efficiently degassed from the microchannel 226, the liquid-liquid reaction can be conducted without making the flow of the liquids L1 and L2 in the microchannel 226 unstable, even if a chemical reaction involving generation of by-product gas by a liquid-liquid reaction is conducted in the microreactor.

Accordingly, even if by-product gas is generated in the step of preparing alloy particles in the production of magnetic particles, minute alloy particles excellent in monodispersibility can be prepared by using the microreactor 200 of the first embodiment of the present invention. As a result, high performance magnetic particles which can achieve sufficiently reduced noise of magnetic recording media can be produced.

The above-mentioned reaction method of the present invention describes a case in which liquids L1 and L2 for the liquid-liquid reaction are previously passed through the microchannel 226 and then the gas G is passed through the microchannel 226. However, it is also possible to pass the gas G through the microchannel 226 and then pass the liquids L1 and L2 and control each supply pressure and supply flow rate to form a gas layer GL on a liquid layer LL. In addition, it is also possible to pass the liquids L1 and L2 and the gas G through the microchannel simultaneously and to control each supply pressure and supply flow rate to form a gas layer GL on a liquid layer LL.

Figures 14A, 14B:
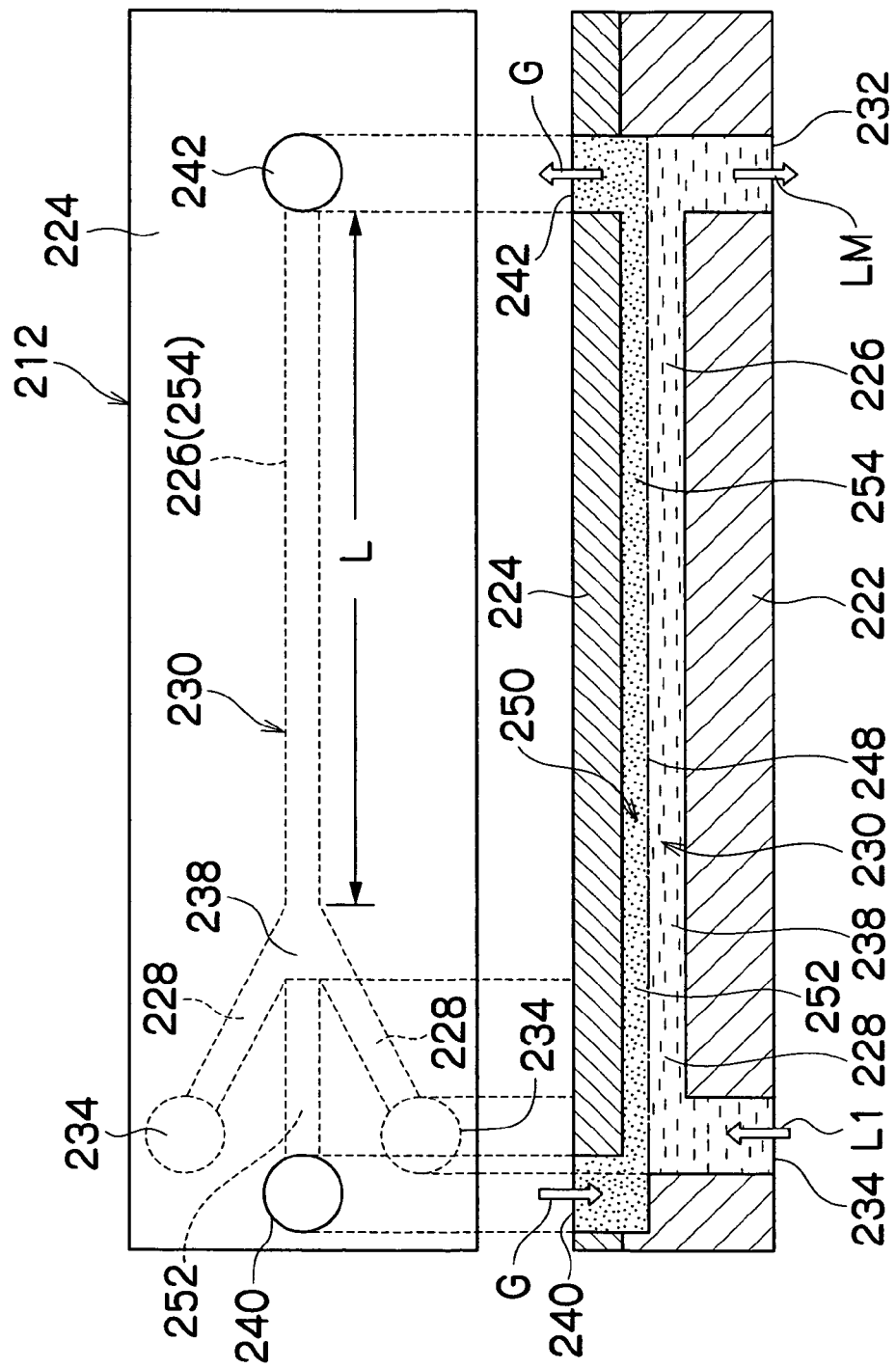
FIGS. 14A and 14B are a top view and a cross-sectional view illustrating a modified example of the main body of a laminate flow microreactor according to the present invention.

In the main body 212 in FIGS. 10A and 10B, part (upper part) of microchannel 226 is also used as a gas channel in which gas G flows when passing the gas G through the microchannel 226. As shown in FIGS. 14A and 14B, however, a Y-shaped liquid channel 230 and a gas channel 250 may be formed separately on the main body member 222 and the lid member 224. FIG. 14B is a cross-sectional view illustrating the relationship of the gas channel 250 and the Y-shaped liquid channel 230. That is, as shown in FIGS. 14A and 14B, liquid channel space of the Y-shaped liquid channel 230 in which the liquids L1 and L2 flow is formed on the main body member 222, gas channel 250 in which the gas G flows is formed on the lid member 224, and the lid member 224 is bonded to the main body member 222 to fabricate the main body 212. The gas channel 250 is constituted by a gas supply channel 252 from the gas inlet port 240 to the merging point 238 and a gas incorporation channel 254 from the merging point 238 to a gas exhaust port 242. In FIGS. 10A and 10B, both the liquid layer LL and the gas layer GL are formed in the microchannel 226, the thickness of the liquid layer LL is reduced by the thickness of the gas layer GL. Accordingly, it is preferable to set the equivalent diameter of the microchannel 226 in consideration of this fact. This is because the thinner the thickness of the liquid layer LL, the lower the product efficiency of the product solution LM produced by the liquid-liquid reaction. On the contrary, in FIGS. 14A and 14B, the liquid layer LL is mainly formed on the microchannel 226 and the gas layer GL formed on the liquid layer LL mainly flows through the gas channel 250 formed on the lid member 224, and therefore the liquid layer LL for the liquid-liquid reaction can have a thickness corresponding to the equivalent diameter of the microchannel 226, and so the production efficiency can be easily improved. Naturally, because the gas incorporation channel 254 of the gas channel 250 is a space formed integrally with the microchannel 226, part of the gas layer GL may be formed on the microchannel 226, or part of the liquid layer LL may be formed on the gas incorporation channel 254, depending on the supply pressure and the supply flow rate of the gas G. The point is that, in the case of FIGS. 14A and 14B, the gas channel 250 for the gas layer GL is formed separately from the microchannel 226.

Second Embodiment

Next, an annular flow (synonymous with concentric multi-cylindrical structure) microreactor 260, which is the second embodiment of the microreactor of the present invention is described. Explanation is made referring to a liquid-liquid reaction using two liquids L1 and L2.

As shown in FIGS. 15A and 15B, the annular microreactor 260 is formed into a substantially columnar shape as a whole and provided with a circular pipe member 262 which constitutes the outer shell of the main body.

The straight line S in the figure indicates the axis of the reactor and the following description will be made referring to the direction along the axis S as the axial direction of the main body. At the tip of the circular pipe member 262 is opened a discharge opening 264 for a reaction product solution LM produced by the reaction of the liquids L1 and L2, and a ring-shaped flange part 266 is provided at the tip of the circular pipe member 262 to be extended toward the outer periphery of the discharge opening 264. The flange part 266 is connected to piping which carries the subsequent processing of the reaction product solution LM.

The circular pipe member 262 has a major diameter part 268 which is greater than the body 267, and the space inside the major diameter part 268 is substantially trisected by two barrier plates having hollow space in the center, i.e., a first barrier plate 270 and a second barrier plate 272 along with the axial direction. The three spaces divided by the first and the second barrier plates 270 and 272 are defined to be, from the tip to the end, a gas header part 274, a first liquid header part 276 and a second liquid header part 278.

The proximal surface of the circular pipe member 262 is shut by a disk cover plate 280 and a hole 282 to fit and insert is opened at the center of the disk cover plate 280. A columnar rectifying member 284 is coaxially provided on the circular pipe member 262 so as to be inserted into the circular pipe member 262 from its proximal side. The proximal portion of the rectifying member 284 is fit and inserted into the hole 282 to fit and insert of the cover plate 280 to hold it.

In the circular pipe member 262, a cylindrical first partition member 286 and a cylindrical second partition member 288 which separate the interior space of the circular pipe member 262 in the axial direction are provided to form a multi-cylindrical structure. The first partition member 286 is integrally formed on the first barrier plate 270 so that the proximal surface thereof is protruded from the periphery of the opening part of the first barrier plate 270 in the axial direction of the circular pipe member 262. Similarly the second partition member 288 is integrally formed on the second barrier plate 272 so that the end thereof is protruded from the periphery of the opening part of the second barrier plate 272 in the axial direction of the circular pipe member 262. The first and the second partition members 286 and 288 are provided concentrically with the circular pipe member 262 and the rectifying member 284 and concentrically trisects the space between the circular pipe member 262 and the rectifying member 284. A plurality of spacers 290 (four in this embodiment) are interposed between the inner surface of the circular pipe member 262 and the outer surface of the first partition member 286, and a plurality of spacers 292 (four in this embodiment) are interposed between the first partition member 286 and the second partition member 288. In addition, a plurality of spacers 294 (four in this embodiment) are interposed between the inner surface of the second partition member 288 and the outer surface of the rectifying member 284. The plurality of spacers 290, 292 and 294 are formed like a rectangular plate and held so that the top and the bottom are parallel to the flow direction (direction of arrow F) in the circular pipe member 262. The spacers 290, 292 and 294 connect and fix the two partition members 286 and 288 and the rectifying member 284 to the circular pipe member 262 and define the opening widths W1, W2 and W3 of three supply channels 296, 298 and 300 in the axial directing. The spaces having a circular cross section separated by the first and the second partition members 286 and 288 are defined as, from the outside, a gas supply channel 296, a first liquid supply channel 298 of liquid L1 and a second liquid supply channel 300 of liquid L2. In addition, a hole to fit and insert communicating with the gas header part 274 is opened at the outer periphery of the proximal surface of the circular pipe member 262, and a gas supply pipe 302 is connected to the hole to fit and insert. In addition, holes to fit and insert communicating with a first liquid header part 276 and a second liquid header part 278 are opened on the cover plate 280 provided on the proximal surface of the circular pipe member 262, and a first and a second liquid supply pipes 304 and 306 are connected to the holes to fit and insert. Syringe pumps 216 and 216 shown in FIG. 9 which supply liquids L1 and L2 are each connected to the two liquid supply pipes 304 and 306, while a syringe pump 220 for gas shown in FIG. 9 is connected to the gas supply pipe 302. By this, pressurized liquids L1 and L2 for liquid-liquid reaction are supplied to the first and the second liquid supply channels 298 and 300 through the liquid supply pipe 304 and 306, and pressurized gas G unreactive to the liquids L1 and L2 is supplied to the gas supply channel 296 through a gas supply pipe 290.

In the circular pipe member 262, a space having a circular cross section communicating with the gas supply channel 296 and the first and the second liquid supply channels 298 and 300 is formed on the side closer to the tip than the first and the second partition members 286 and 288 and closer to the end than the conical part 284A of the rectifying member 284. The space having a circular cross section is a microchannel 308 in which the liquids L1 and L2 are combined to cause a liquid-liquid reaction involving generation of by-product gas, and the microchannel 308 is also used as a gas channel which makes the flow of the gas G from gas supply channel 296 circular outside of the liquids L1 and L2 flowing having a circular cross section.

At the tip of the circular pipe member 262, a gas exhaust pipe 310 which exhausts the gas G supplied to the microchannel 308 is provided.

As shown FIG. 15B, at the tip of the gas supply channel 296, the first and the second liquid supply channels 298 and 300, a gas supply opening 312 and first and second liquid supply openings 314 and 316 opened to the microchannel 308 are formed. The supply openings 312, 314 and 316 are each opened with circular cross sections along with the circle of which the center is the axis S and provided concentrically. The opening widths W1, W2 and W3 (See FIG. 15A) define the opening area of the supply openings 312, 314 and 316, and the initial flow rates of the gas G and the liquids L1 and L2 introduced into the microchannel 308 through the supply openings 312, 314 and 316 are determined depending on the opening area of the supply openings 312, 314 and 316 and the supplies of the gas G and the liquids L1 and L2.

The space in the circular pipe member 262 to the tip from the microchannel 308 is called a bleed channel 318 through which the reaction product solution LM obtained by the reaction of the liquids L1 and L2 in the microchannel 308 flows in the direction of the discharge opening 264. When the reaction product solution LM is produced by the liquid-liquid reaction of the liquids L1 and L2, it is necessary that the liquid-liquid reaction of the liquids L1 and L2 is completed at the exit of the microchannel 308. Therefore, the channel length PL of the microchannel 308 along the flow direction (see FIG. 15A) must be set to the length in which the liquid-liquid reaction of the liquids L1 and L2 is completed.

It is preferable to install the temperature control device for controlling the temperature of the liquid-liquid reaction described in the first embodiment also in the second embodiment, and the temperature control device described in the first is embodiment can be used. The material used for the main body of the annular flow microreactor 260 is the same as in the above-mentioned laminate flow microreactor 200.

Next, a reaction method of the present invention in which a liquid-liquid reaction involving generation of by-product gas is conducted using an annular flow microreactor 260 constructed as above is described.

Liquids L1 and L2 supplied to liquid supply channels 298 and 300 from syringe pumps 216 and 216 are combined at the microchannel 308 and passed in a concentrically layered laminar flow having a circular cross section, and the liquids L1 and L2 are diffused to the direction normal to the contact surface, whereby a liquid-liquid reaction occurs. Bubbles of the by-product gas generated by the liquid-liquid reaction are accumulated and agglomerated in the microchannel 308 and a slug flow is generated in the microchannel 308. As a result, continuous line of processing of liquids L1 and L2 to be reacted is obstructed or disturbed, and the line becomes unstable and the reaction field becomes uneven, while the equilibrium of the reaction is difficult to be shifted to the direction where the reaction is promoted. In addition, when the temperature of liquid is controlled for the reaction and if the by-product gas is not efficiently removed in the continuous processing line, the reaction temperature cannot be accurately controlled because of the small thermal conductivity of the gas.

Figure 16:
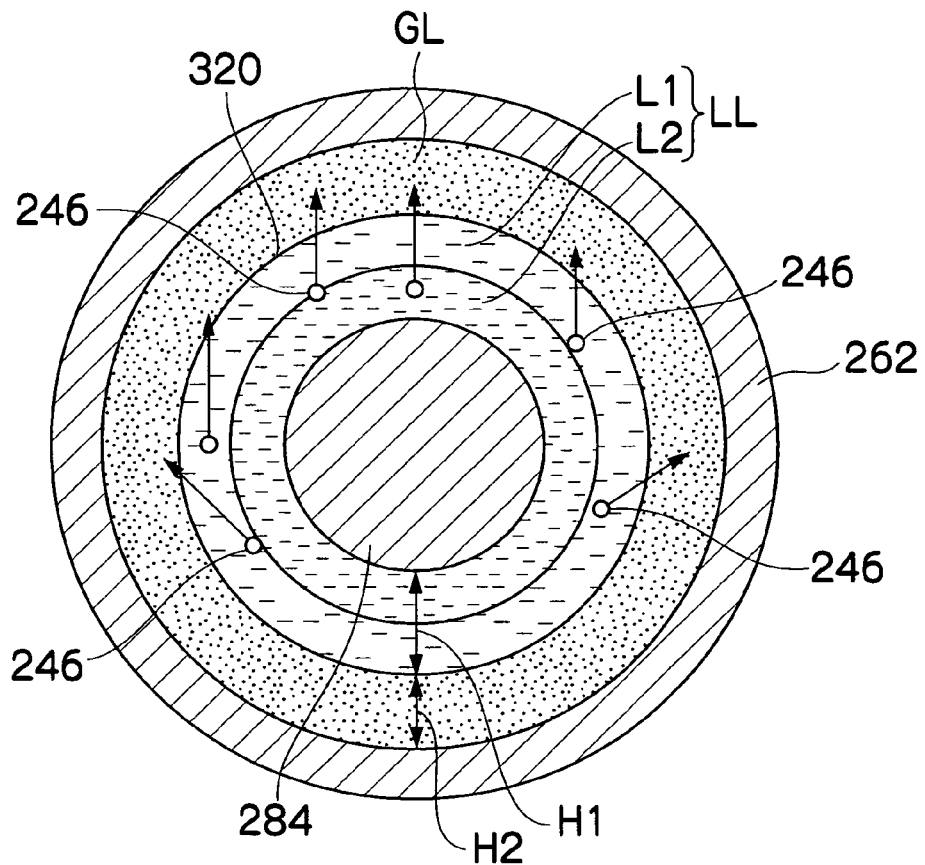
FIG. 16 is an illustrative view illustrating the flow of the microchannel when conducting a liquid-liquid reaction involving generation of by-product gas using an annular flow microreactor of the present invention.
Figure 17:
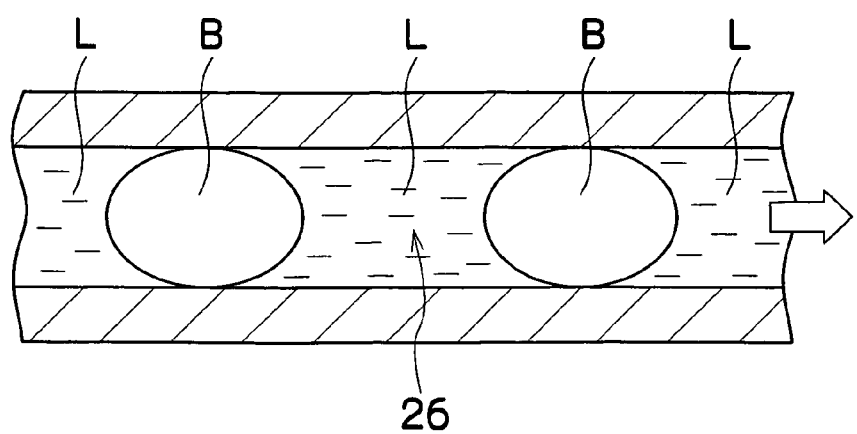
FIG. 17 is an illustrative view illustrating the flow of the microchannel when conducting a reaction involving generation of by-product gas by a conventional microreactor.

Given this fact, in the reaction method of the present invention, a liquid-liquid reaction is conducted by supplying a gas G unreactive to liquids L1 and L2 for the liquid-liquid reaction to the microchannel 308 to form an annular gas layer GL outside of an annular liquid layer LL as shown in FIG. 16, and incorporating the bubbles 246 of the by-product gas generated by the liquid-liquid reaction and ascending through the liquid layer LL into the gas layer GL and discharging the by-product gas outside of the microchannel 308 with the gas G. The important thing when passing the gas G through the microchannel 308 is the same as described in the first embodiment, which is to keep the gas G and the liquids L1 and L2 being mixed to generate a gas-liquid mixed flow. That is, when a gas G unreactive to the liquids L1 and L2 is supplied outside of the annular flow of the liquids L1 and L2 combined at the microchannel 308 from the liquid supply channels 298 and 300 and the supply pressure of the gas G is gradually increased, the flow in the microchannel 308 changes from a slug flow to an annular flow, whereby a gas layer GL separated at the gas-liquid interface 320 is formed outside of the liquid layer LL as shown in FIG. 16. The supply pressure and the supply flow rate of the gas G in the annular flow state are maintained. As a result, bubbles 246 of the by-product gas generated by the liquid-liquid reaction and ascending through the liquid layer LL ascends through the liquid layer LL without being accumulated in the microchannel 308 and are continuously incorporated into the gas layer GL, and the by-product gas incorporated into the gas layer GL is discharged through the gas exhaust port 310 with the gas G. Such annular state can be formed more easily when the thickness H2 of the gas layer GL is approximately not less than 80% of the thickness H1 of the liquid layer LL also in the case of conducting the reaction method of the present invention using the annular flow microreactor 260.

According to this, because the by-product gas generated by the liquid-liquid reaction in the minute microchannel 308 having an equivalent diameter of, for example, not more than 1 mm can be efficiently degassed from the microchannel 308 also in the second embodiment of the present invention, the liquid-liquid reaction can be conducted without making the flow of the liquids L1 and L2 in the microchannel 308 unstable, even if a chemical reaction involving generation of by-product gas by a liquid-liquid reaction is conducted in the microreactor.

Accordingly, even if by-product gas is generated in the step of preparing alloy particles in the production of magnetic particles, minute alloy particles excellent in monodispersibility can be prepared by using the microreactor 260 of the second embodiment of the present invention. As a result, high performance magnetic particles which can achieve sufficiently reduced noise of magnetic recording media can be produced.

Third Embodiment

Figure 18:
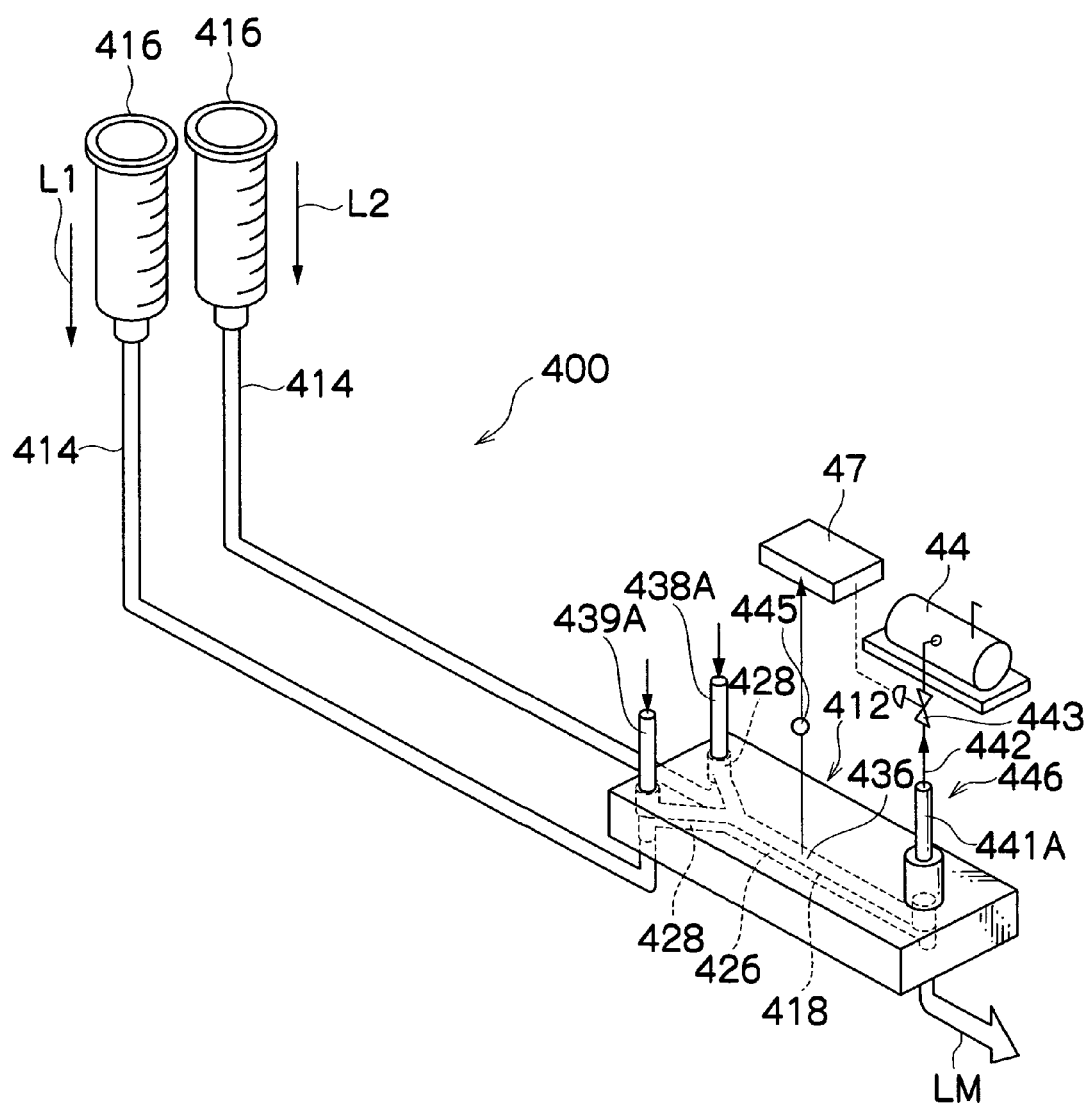
FIG. 18 is a perspective view illustrating the concept of a laminate flow microreactor which is the third embodiment of the present invention, to which a gas permeation member is incorporated.
Figure 19:
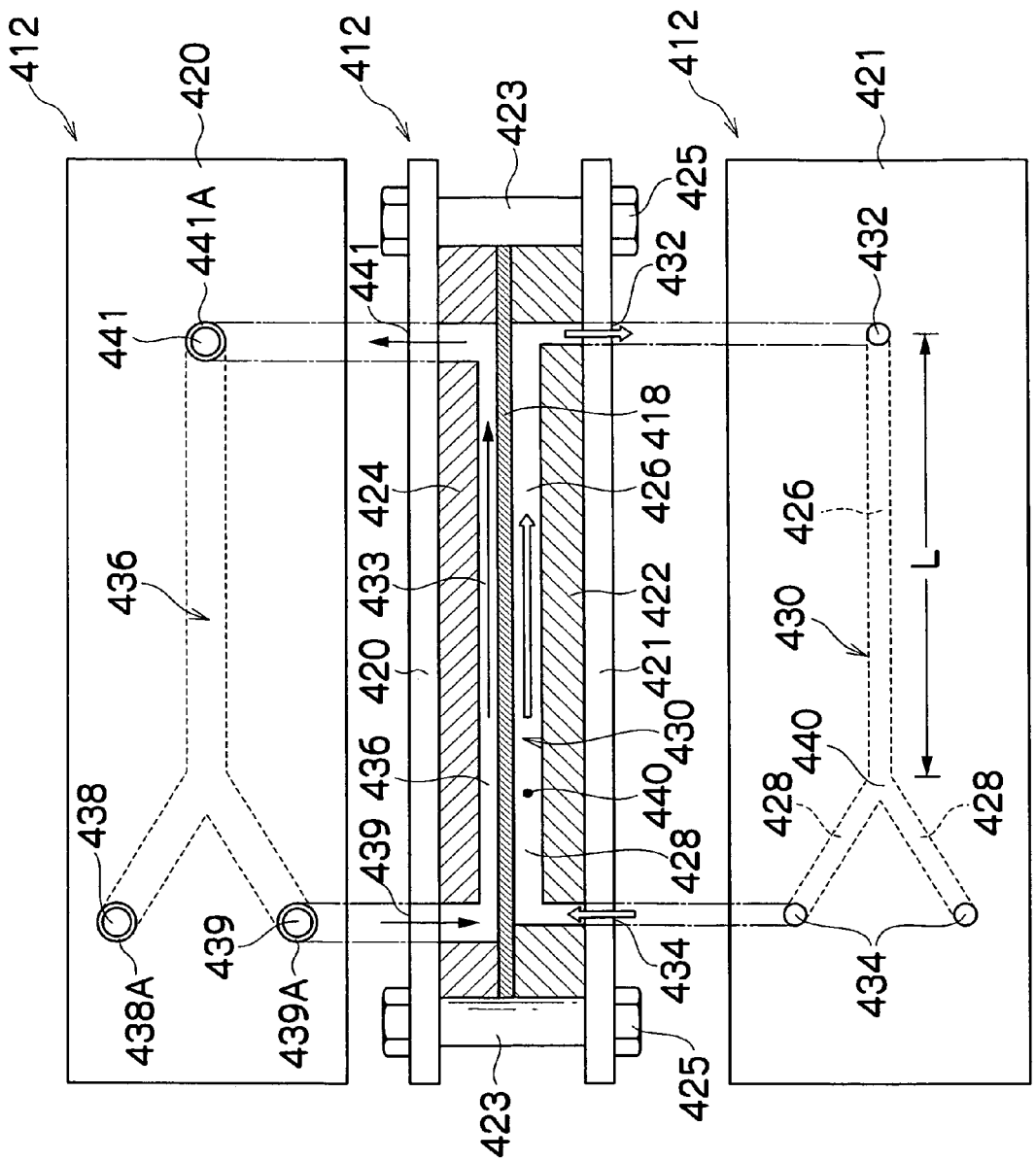
FIGS. 19A to 19C are a top view, a cross-sectional view and a bottom view of the main body of the microreactor in the third embodiment of the present invention.

FIG. 18 is a perspective view illustrating the third embodiment of the present invention, which is a laminate flow microreactor 400. FIG. 19A is a top view, FIG. 19B is a cross-sectional view, and FIG. 19C is a bottom view of a microreactor main body (hereinafter referred to as main body 12).

As shown in FIG. 18 the laminate flow microreactor 400 is mainly composed of a main body 412 equipped with a gas permeation member 418, liquid supply devices 416 and 416 which supply liquids L1 and L2 for a liquid-liquid reaction involving generation of by-product gas to the main body 412 through liquid supply pipes 414 and 414 and a pressure control device 446 for improving the gas permeability of the gas permeation member 418. In this embodiment, explanation is made referring to an example of a liquid-liquid reaction using two liquids L1 and L2.

As shown in FIGS. 19A to 19C, the main body 412 is assembled by bonding a main body member 422 and lid member 424 by an adhesive with a plate-like gas permeation member 418 interposed therebetween and sandwiching by a top plate 420 and a bottom plate 421, and tightening bolts 423 put in bolt holes formed at four corners of the top plate 420 and the bottom plate 421 with nuts 425. On the main body member 422 is formed a Y-shaped liquid channel 430 having a microchannel 426 for conducting a liquid-liquid reaction of two liquids L1 and L2 and two liquid supply channels 428 and 428 which combine the liquids L1 and L2 at the microchannel 426. On the other hand, a Y-shaped cavity portion 436 is formed on the lid member 424, faced with the Y-shaped liquid channel 430, and the Y-shaped liquid channel 430 and the Y-shaped cavity portion 436 are separated by the gas permeation member 418. That is, the gas permeation member 418 constitutes the upper channel wall of the Y-shaped liquid channel 430 and the Y-shaped cavity portion 436 is formed on the gas permeation member 418. In this embodiment, Y-shaped cavity portion 436 is formed on the gas permeation member 418 and as described later, the pressure of the Y-shaped cavity portion 436 is reduced so that the by-product gas generated in the microchannel 426 is easily transmitted through the gas permeation member 418. However, when the gas permeation member 418 has excellent gas permeability and provision of Y-shaped cavity portion 436 which serves as a reduced-pressure cavity portion is not necessary a main body 412 having a construction in which the gas permeation member 418 is exposed to an ambient atmosphere is also available. In that case, the by-product gas generated in the microchannel 426 is permeating through the gas permeation member 418 and released to the atmosphere directly. In this embodiment, explanation has been made referring to the gas permeation member 418 provided on the entire top surface of the Y-shaped liquid channel 430 constituted by the liquid supply channel 428 and the microchannel 426. However, the gas permeation member 418 may be provided only on the top face of the microchannel 426 in which the by-product gas is generated.

The most important point when fabricating the main body 412 is to use a gas permeation member 418 having as high a gas permeability as possible. According to the recent development in the polymer science, films having a high gas permeability such as Gore-Tex (trademark) film are on market, and such films can be used. In addition, thanks to the advancement in the recent micromachining technologies, making extremely minute holes which do not allow liquid to permeate but allows gas to permeate on hard materials such as metal and plastic resin has been achieved, and a gas permeation member 418 can be fabricated using hard materials by utilizing such technology. The gas permeation member 418 in the present invention, however, may be of any type regardless of such technical advancement as long as the member can permeate only the by-product gas generated by a liquid-liquid reaction in the microchannel 426.

As the microchannel 426, a minute channel having an equivalent diameter of not more than 1 mm (1000 µm), preferably not more than 500 µm is preferable. The microchannel 426 generally has a quadrangular cross section in the radial direction, but the shape is not limited to quadrangles. When two liquid supply channels 428 and 428 are used, it is preferable that the equivalent diameter of one of the liquid supply channels 428 is designed to be half of that of the microchannel 426. For example, when the width and the depth of the microchannel 426 having a quadrangular cross section in the radial direction is 500 µm and 200 µm, the width and the depth of the one liquid supply channel 428 is set to be 250 µm and 200 µm. In addition, the length L of the microchannel 426 (see FIGS. 19A to 19C) is set to a length in which the liquid-liquid reaction is completed and is different depending on the kind of the liquid-liquid reaction.

To fabricate the main body 412 having such micro-order, minute Y-shaped liquid channel 430 and Y-shaped cavity portion 436, microprocessing technology is used. Examples of microprocessing technology are as described in the first embodiment.

As the material for fabricating the main body 412, glass, ceramics, plastic, silicon and Teflon can be suitably used depending on the required heat resistance, pressure resistance, solvent resistance and ease in processing. In the fabrication of the main body 412, fabrication of the Y-shaped liquid channel 430 and Y-shaped cavity portion 436 is certainly important, but bonding technology for bonding the lid member 424 to the main body 422 with the gas permeation member 418 therebetween is also important. For the bonding method of the lid member 424, a desired method is a high-precision method which can maintain dimensional accuracy without destruction of Y-shaped liquid channel 430 or Y-shaped cavity portion 436 due to property change or deformation of materials by high temperature heating, and the same bonding methods as described in the first embodiment can be employed.

In addition, as shown in FIGS. 19A to 19C, at the end of the liquid supply channels 428 and 428 formed on the main body member 422, liquid inlet ports 434 and 434 for liquids L1 and L2 are formed perforating through the bottom plate 421, and liquid supply pipes 414 and 414 are connected to the liquid inlet ports 434 and 434. By this, liquids L1 and L2 are supplied to the main body 412 from liquid supply devices 416 and 416. In addition, at the end of the microchannel 426, a liquid discharge opening 432 for discharging a reaction product solution LM generated by a liquid-liquid reaction is formed perforating through the bottom plate 421. On the other hand, at three ends of the Y-shaped cavity portion 436 formed on the lid member 424, openings 438, 439 and 441 are formed perforating through the top plate 420, and short pipes 438A, 439A and 441A are connected to openings 438, 439 and 441.

As the liquid supply device 416 used for the microreactor 400 of the present invention, the same syringe pump as used in the first embodiment can be preferably used, and explanation is made referring to syringe pump 416.

As shown in FIG. 18, a pressure control device 446 which controls pressure of the Y-shaped cavity portion 436 is mainly composed of a suction device 444 for reducing the pressure of the Y-shaped cavity portion 436, such as a vacuum pump or an aspirator, a pressure gauge 445 for measuring the pressure of the Y-shaped cavity portion 436, and a controller 447 for controlling the opening of a valve 443 which regulates the suction force of the suction device 444 based on the measured value from the pressure gauge 445. That is, of the short pipes 438A, 439A and 441A of the main body 412, the short pipes 438A and 439A are exposed to an ambient atmosphere, while the suction device 444 is connected to the short pipe 441A via a suction pipe 442. The pressure of the Y-shaped cavity portion 436 measured at the pressure gauge 445 is inputted to the controller 447. According to the pressure control device 446 constructed as above, when the suction device 444 is activated, an air drawn in into the Y-shaped cavity portion 436 through the short pipes 438A and 439A is exhausted via the short pipe 441A, and then a high-speed gas flow is generated in the Y-shaped cavity portion 436 as shown by an arrow 433 in FIGS. 19A to 19C, and due to a pitot tube phenomenon, gas permeation force from the Y-shaped liquid channel 430 to the Y-shaped cavity portion 436 can be generated in the minute holes in the gas permeation member 418. The speed of the gas flow is controlled by the opening of the valve 443. Although the speed of the gas flow depends on the gas permeability of the gas permeation member 418, the speed may be of a level which helps smooth permeation of the by-product gas through the gas permeation member 418, and a moderate pressure reduction of the Y-shaped cavity portion 436 is preferable. For this reason, it is also preferable to use an aspirator as the pressure control device 446. As the valve 443 used for the pressure control device 446, a servo valve which can control the valve opening by switching at a response speed of not more than 10 msec, more preferably not more than 5 msec may be used. This enables to keep a constant suction force of the suction device 444, and so the speed of the gas flow generated in the Y-shaped cavity portion 436 can be kept constant.

The pressure control device 446 is not limited to the above-mentioned gas flow device which generates gas flow from one end to the other end of the Y-shaped cavity portion 436. Adoptable devices include a suction type in which a suction device 444 is activated with the short pipes 438A and 439A being closed to reduce the pressure of the Y-shaped cavity portion 436 and a pressurizing type in which a pressure of not less than the pressure loss of the by-product gas permeating through the gas permeation member 418 is applied to the Y-shaped liquid channel 430. Pressurization of the Y-shaped liquid channel 430 can be controlled by the liquid supply device 416. In the case of the pressurizing device, the Y-shaped cavity portion 436 may be brought to an atmospheric pressure by opening the short pipes 438A, 439A and 441A to an ambient atmosphere, or the pressure of the Y-shaped cavity portion 436 may be reduced by combining the gas flow device and the suction device.

Although not particularly shown in this embodiment, a temperature control device for controlling the temperature of the liquid-liquid reaction in the microreactor 400 may be provided as explained in the first embodiment.

Next, a reaction method of the present invention in which a liquid-liquid reaction involving generation of by-product gas is conducted using a laminate flow microreactor 400 incorporating a gas permeation member is described.

Liquids L1 and L2 supplied to liquid supply channels 428 and 428 from syringe pumps 416 and 416 are combined at the microchannel 426 at the merging point 440 and passed in a thin-line laminar flow, and the liquids L1 and L2 are diffused to the direction normal to the contact surface, whereby a liquid-liquid reaction occurs. By-product gas is generated by the liquid-liquid reaction, and the bubbles of the generated by-product gas are accumulated and agglomerated in the microchannel 426 and a slug flow which is a gas-liquid mixed flow is generated in the microchannel 426. As a result, continuous line of processing of liquids L1 and L2 to be reacted is obstructed or disturbed, and the line becomes unstable and the reaction field becomes uneven, while the equilibrium of the reaction is difficult to be shifted to the direction where the reaction is promoted. In addition, when the temperature of liquid is controlled for the reaction and if the by-product gas is not efficiently removed in the continuous processing line, the reaction temperature cannot be accurately controlled because of small thermal conductivity of the gas.

Figure 20:
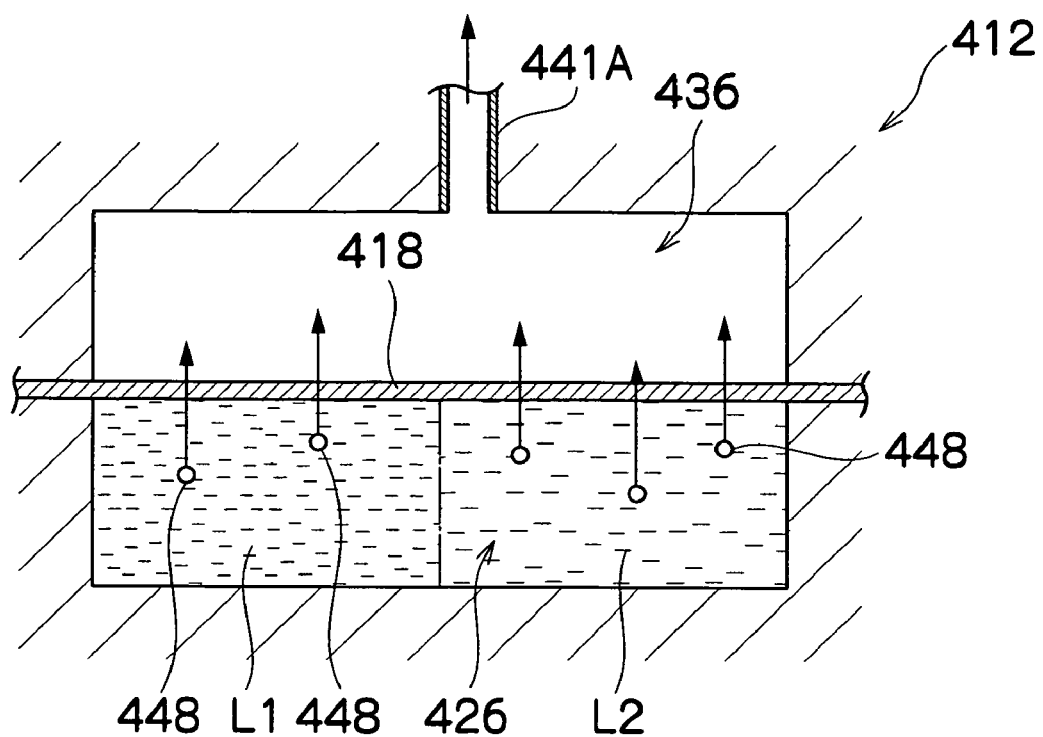
FIG. 20 is an illustrative view illustrating the flow of the circular microchannel when conducting a liquid-liquid reaction involving generation of by-product gas using the microreactor of the third embodiment of the present invention.

Given this fact, according to the laminate flow microreactor 400 of the present invention into which a gas permeation member is incorporated, a liquid-liquid reaction is conducted by constituting the upper channel wall of the Y-shaped liquid channel 430 by a gas permeation member 418 which is permeable to liquid but impermeable to gas, and permeating only the by-product gas generated by the liquid-liquid reaction in the microchannel 426 to the Y-shaped cavity portion 436 via the gas permeation member 418. By this, as shown in FIG. 20, the bubbles 448 of the by-product gas generated by the liquid-liquid reaction of the liquid L1 and L2 ascends through the liquids and is permeating through the gas permeation member 418, and then discharged to the Y-shaped cavity portion 436. The by-product gas discharged to the Y-shaped cavity portion 436 is discharged outside of the main body 412 via short pipe 441A with the gas flowing through the Y-shaped cavity portion 436.

As described above, according to the present invention, because the by-product gas generated by the liquid-liquid reaction in the minute microchannel 426 having, for example, an equivalent diameter of not more than 1 mm can be efficiently degassed from the microchannel 426, the liquid-liquid reaction can be conducted without making the flow of the liquids L1 and L2 in the microchannel 426 unstable, even if a chemical reaction involving generation of by-product gas by a liquid-liquid reaction is conducted in the microreactor. Consequently, the equilibrium of the reaction is easily shifted to the direction where the reaction is promoted, and accurate control of the reaction temperature becomes easy.

Accordingly, even if by-product gas is generated in the step of preparing alloy particles in the production of magnetic particles, minute alloy particles excellent in monodispersibility can be prepared by using the microreactor 400 of the third embodiment of the present invention. As a result, high performance magnetic particles which can achieve sufficiently reduced noise of magnetic recording media can be produced.

Accordingly, even if by-product gas is generated in the step of preparing alloy particles in the production of magnetic particles, minute alloy particles excellent in monodispersibility can be prepared by using the microreactor 400 of the third embodiment of the present invention. As a result, high performance magnetic particles which can achieve sufficiently reduced noise of magnetic recording media can be produced.

Figure 21:
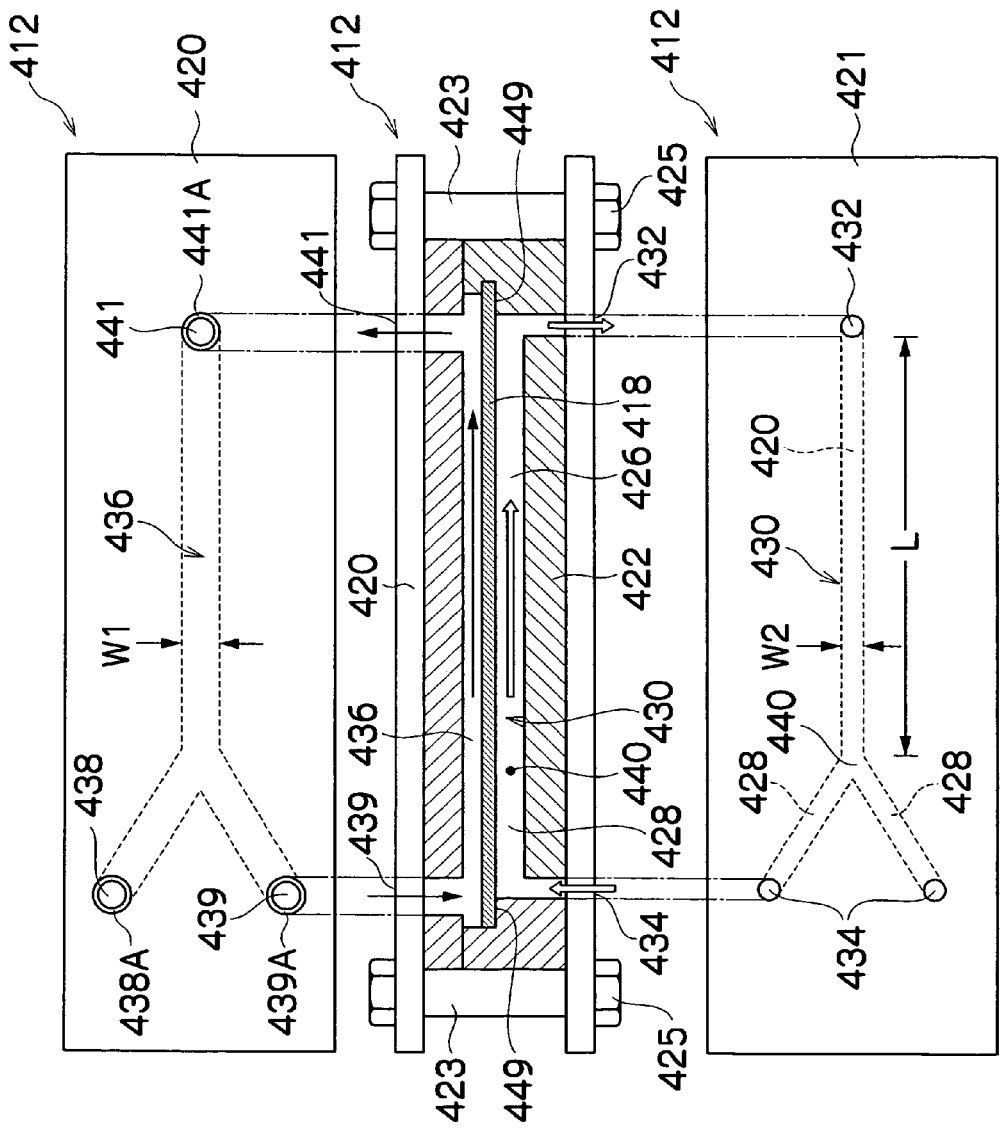
FIGS. 21A to 21C are a top view, cross-sectional view and a bottom view of the main body of the laminate flow microreactor in the third embodiment according to the present invention.

In the main body 412 of FIGS. 19A to 19C, the Y-shaped liquid channel 430 has been provided on the main body member 422 and the Y-shaped cavity portion 436 has been provided on the lid member 424. As shown in FIGS. 21A to 21C, however, both the Y-shaped liquid channel 430 and the Y-shaped cavity portion 436 may be formed on the main body member 422. That is, as shown in FIGS. 21A to 21C, a Y-shaped liquid channel 430 and a Y-shaped cavity portion 436 are created by forming an integral Y-shaped space on the main body member 422 and dividing the integral space into an upper space and a lower space by a gas permeation member 418. In this case, by making the width (W1) of the Y-shaped cavity portion 436 slightly larger than the width (W2) of the Y-shaped liquid channel 430, a step 449 is created at the border of the Y-shaped liquid channel 430 and the Y-shaped cavity portion 436, and the gas permeation member 418 is inserted to the step 449 and bonded by an adhesive.

Fourth Embodiment

Figure 22:
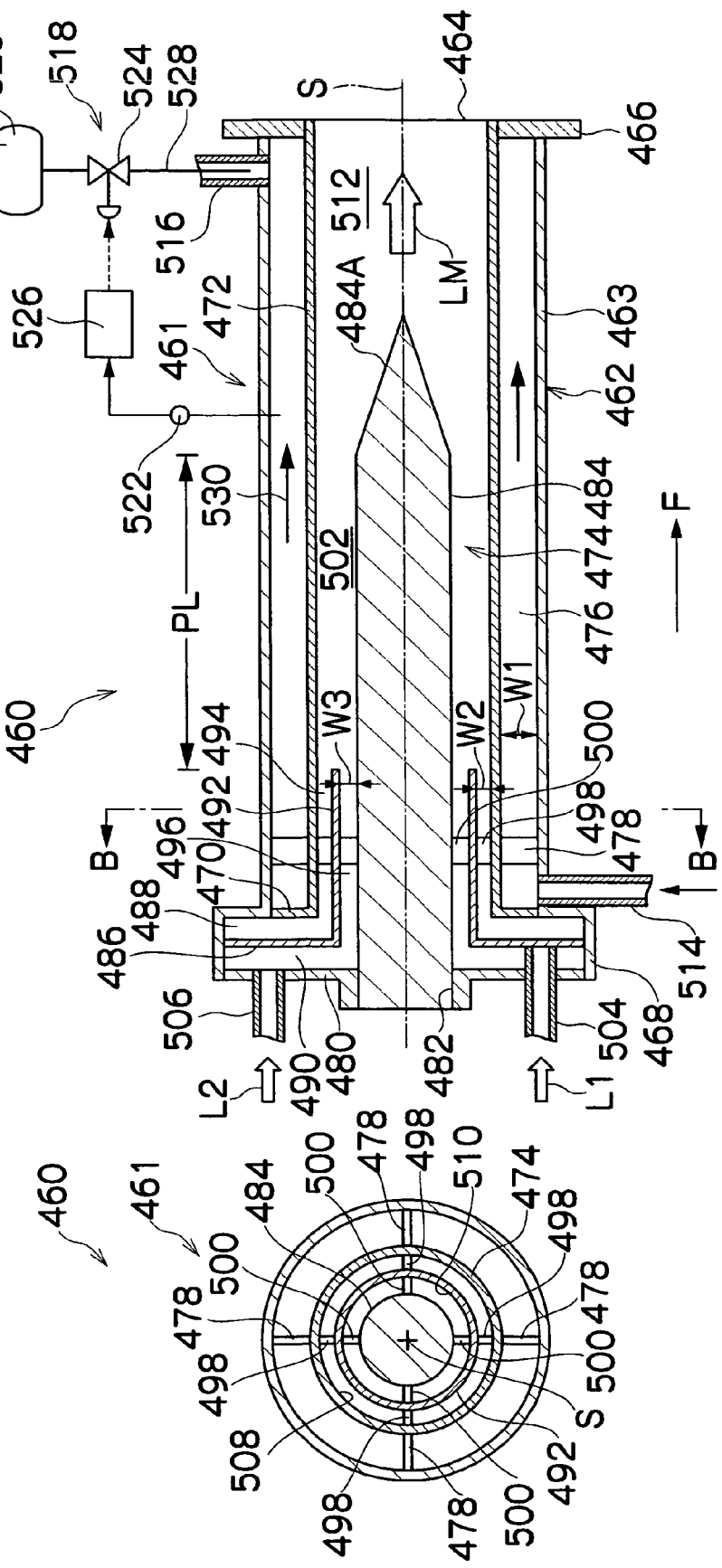
FIGS. 22A and 22B are cross-sectional views illustrating the concept of an annular flow microreactor which is the fourth embodiment of the present invention, to which a gas permeation member is incorporated.

Next, the fourth embodiment of the present invention, i.e., an annular flow microreactor 460 into which a gas permeation member is incorporated is explained referring to FIGS. 22A and 22B.

As shown in FIGS. 22A and 22B, the annular flow microreactor 460 into which a gas permeation member is incorporated is mainly composed of a main body 461 equipped with a gas permeation member 472, liquid supply devices 416 and 416 (abbreviated in FIGS. 22A and 22B; see FIG. 18) which supply liquids L1 and L2 for liquid-liquid reaction involving generation of by-product gas to the main body 461 through liquid supply pipes 504 and 506, and a pressure control device 518 for improving the gas permeability of the gas permeation member 472. In the fourth embodiment, explanation is made referring to an example of a liquid-liquid reaction using two liquids L1 and L2.

As shown in FIGS. 22A and 22B, an annular flow microreactor 460 is formed into a substantially columnar shape as a whole and provided with a circular pipe member 462 which constitutes the outer shell of the main body. The straight line S in the figure indicates the axis of the reactor and the following explanation is made referring to the direction along with the axis S as the axial direction of the main body. At the tip of the circular pipe member 462 is opened a discharge opening 464 for a reaction product solution LM produced by the reaction of the liquids L1 and L2, and a ring-shaped flange part 466 is provided at the tip of the circular pipe member 462 to be extended toward the outer periphery of the discharge opening 464. The flange part 466 is connected to piping which carries the subsequent processing of the reaction product solution LM.

The circular pipe member 462 has a major diameter part 468 which is greater than the body 463 at the end, and at a position closer to the end from the body 463, a first barrier plate 470 having a circular hole at the center is provided so as to be extended to the inside of the circular pipe member 462. A cylindrical gas permeation member 472 which divides the space inside the body 463 in the axial direction is provided in the body 463, and the both ends of the gas permeation member 472 is fixed and held by the opening periphery of the first barrier plate 470 and the opening periphery of the flange part 466. By this, the inside of the body 463 is divided into two spaces, i.e., an inner space and an outer space, by the gas permeation member 472. The inner space defines an annular liquid channel 474 having a circular cross section through which liquids L1 and L2 flow, while the outer space defines an annular cavity portion 476 to which by-product gas generated in the annular liquid channel 474 is permeating through the gas permeation member 472. In other words, the entire channel wall of the annular liquid channel 474 is constituted by the gas permeation member 472 and the annular cavity portion 476 is formed outside of the gas permeation member 472. A plurality of spacers 478 (four in this embodiment) are interposed between the body 463 and the gas permeation member 472, thereby defining the width W1 of the annular cavity portion 476 (see FIG. 22A). When the entire channel wall of an annular liquid channel 474 is constituted by a gas permeation member 472 as in the annular flow microreactor 460, the gas permeation member 472 may be fabricated by making extremely minute holes which do not allow liquid to permeate but allows gas to permeate on hard materials such as metal and plastic resin according to micromachining technologies.

The proximal surface of the circular pipe member 462 is shut by a disk cover plate 480 and a hole 482 to fit and insert is opened at the center of the disk cover plate 480. A columnar rectifying member 484 is coaxially provided on the circular pipe member 462 so as to be inserted into the circular pipe member 462 from its proximal side. The proximal portion of the rectifying member 484 is fit-held by the hole 482 to fit and insert of the cover plate 480.

The space inside the major diameter part 468 of the circular pipe member 462 is divided in half by a second barrier plate 486 having a circular hole at the center, whereby a first header 488 into which liquid L1 is introduced and a second header 490 into which liquid L2 is introduced. A cylindrical partition member 492 is formed integrally with the second barrier plate 486 so as to be projected in the axial direction of the circular pipe member 462 from the opening periphery of the second barrier plate 486. The partition member 492 divides part of the annular liquid channel 474 in half, whereby a first liquid supply channel 494 which is a supply channel for liquid L1 introduced to the first header 488 is formed bordered by the gas permeation member 472 and the partition member 492, and a second liquid supply channel 496 which is a supply channel for liquid L2 introduced to the second header 490 is formed between the partition member 492 and the rectifying member 484. A plurality of spacers 498 (four in this embodiment) are interposed between the inner surface of the gas permeation member 472 and the outer surface of the partition member 492, and a plurality of spacers 500 (four in this embodiment) are interposed between the partition member 492 and the rectifying member 484. The plurality of spacers 498 and 500 are formed like a rectangular plate and held so that the top and the bottom are parallel to the flow direction (direction of arrow F) in the annular liquid channel 474. This defines the channel width W2 of the first liquid supply channel 494 and the channel width W3 of the second liquid supply channel 496.

In the circular pipe member 462, a space having a circular cross section communicating with the first and the second liquid supply channels 494 and 496 is formed on the side closer to the tip than the partition member 492 and closer to the end than the conical part 484A of the rectifying member 484. The space having a circular cross section is a microchannel 502 in which the liquids L1 and L2 are combined to cause a liquid-liquid reaction involving generation of by-product gas. In this case, it is necessary that the liquid-liquid reaction of the liquids L1 and L2 is completed at the exit of the microchannel 502 and therefore, the channel length PL of the microchannel 502 along the flow direction (see FIG. 22A) must be set to the length in which the liquid-liquid reaction of the liquids L1 and L2 is completed. In the case described above, the entire channel wall of the annular liquid channel 474 is constituted by the gas permeation member 472, but only the channel wall of the circular microchannel 502 in which by-product gas is generated by the reaction of liquids L1 and L2 may be constructed by the gas permeation member 472.

In addition, holes to fit and insert communicating with the first and the second liquid supply channels 494 and 496 are opened on the cover plate 480 provided on the proximal surface of the circular pipe member 462, and a first and a second liquid supply pipes 504 and 506 are connected to the holes to fit and insert. Syringe pumps 416 and 416 shown in FIG. 18 which supply liquids L1 and L2 are each connected to the two liquid supply pipes 504 and 506, and pressurized liquids L1 and L2 for liquid-liquid reaction are supplied to the first and the second liquid headers 488 and 490 through the liquid supply pipe 504 and 506. As shown in FIG. 22B, at the tip of the first and the second liquid supply channels 494 and 496, a first and second liquid supply openings 508 and 510 opened to the microchannel 502 are formed. The supply openings 508 and 510 are each opened with circular cross sections along with the circle of which the center is the axis S and provided concentrically. The opening widths W2 and W3 define the opening area of the supply openings 508 and 510, and the initial flow rates of the liquids L1 and L2 introduced into the circular microchannel 502 through the supply openings 508 and 510 are determined depending on the opening area of the supply openings 508 and 510 and the supplied amount of the liquids L1 and L2.

The space in the circular pipe member 462 to the tip from the microchannel 502 is called a bleed channel 512 through which the reaction product solution LM obtained by the reaction of the liquids L1 and L2 in the microchannel 502 flows in the direction of the discharge opening 464. A short pipe 514 is connected to the end (cover plate side) of the circular pipe member 462, while a short pipe 516 is connected to the tip (flange side) of the circular pipe member 462.

The pressure control device 518 which control the pressure of the annular cavity portion 476 is mainly composed of a suction device 520 for reducing the pressure of the annular cavity portion 476, such as a vacuum pump or an aspirator, a pressure gauge 522 for measuring the pressure of the annular cavity portion 476, and a controller 526 for controlling the opening of a valve 524 which regulates the suction force of the suction device 520 based on the measured value from the pressure gauge 522. That is, of the short pipes 514 and 516 of the main body 461, the short pipe 514 are exposed to an ambient atmosphere, while the suction device 520 is connected to the short pipe 516 via a suction pipe 528. The pressure of the annular cavity portion 476 measured at the pressure gauge 522 is inputted to the controller 526. According to the pressure control device 518 constructed as above, when the suction device 520 is activated, an air drawn in into the annular cavity portion 476 through the short pipe 514 is exhausted via the short pipe 516, and then a high-speed gas flow is generated in the annular cavity portion 476 as shown by an arrow 530 in FIGS. 22A and 22B, and due to a pitot tube phenomenon, gas permeation force from the annular liquid channel 474 to the annular cavity portion 476 can be generated in the minute holes in the gas permeation member 472. The speed of the gas flow is controlled by the opening of the valve 524. Although the speed of the gas flow depends on the gas permeability of the gas permeation member 472, the speed may be of a level which helps smooth permeation of the by-product gas through the gas permeation member 472, and a moderate pressure reduction of the annular cavity portion 476 is preferable. For this reason, it is also preferable to use an aspirator as the pressure control device 518. As the valve 524 used for the pressure control device 518, a servo valve which can control the valve opening by switching at a response speed of not more than 10 msec, more preferably not more than 5 msec may be used. This enables to keep a constant suction force of the suction device 520, and so the speed of the gas flow generated in the annular cavity portion 476 can be kept constant.

The pressure control device 518 is not limited to the above-mentioned gas flow device which generates gas flow from one end to the other proximal surface of the annular cavity portion 476. Acceptable devices include a suction type in which a suction device 520 is activated with the short pipe 514 being closed to reduce the pressure of the annular cavity portion 476 and a pressurizing type in which a pressure of not less than the pressure loss of the by-product gas permeating through the gas permeation member 472 is applied to the annular liquid channel 474. Pressurization of the annular liquid channel 474 can be controlled by the above-mentioned liquid supply device 416. In the case of the pressurizing device, the annular cavity portion 476 may be brought to an atmospheric pressure by opening the short pipes 514 and 516 to an ambient atmosphere, or the pressure of the annular cavity portion 476 may be reduced by combining the gas flow device and the suction device.

Next, a reaction method of the present invention in which a liquid-liquid reaction involving generation of by-product gas is conducted using an annular flow microreactor 460 incorporating a gas permeation member as constructed above is described.

Liquids L1 and L2 supplied to the first and the second liquid supply channels 494 and 496 from syringe pumps 416 and 416 are combined at the microchannel 502 and passed in a concentrically layered laminar flow having a circular cross section. The liquids L1 and L2 are diffused to the direction normal to the contact surface, whereby a liquid-liquid reaction occurs. Bubbles of the by-product gas generated by the liquid-liquid reaction are accumulated and agglomerated in the microchannel 502 and a slug flow is generated in the microchannel 502. As a result, continuous line of processing of liquids L1 and L2 to be reacted is obstructed or disturbed, and the line becomes unstable and the reaction field becomes uneven, while the equilibrium of the reaction is difficult to be shifted to the direction where the reaction is promoted. In addition, when the temperature of liquid is controlled for the reaction and if the by-product gas is not efficiently removed in the continuous processing line, the reaction temperature cannot be accurately controlled because of the small thermal conductivity of the gas.

Figure 23:
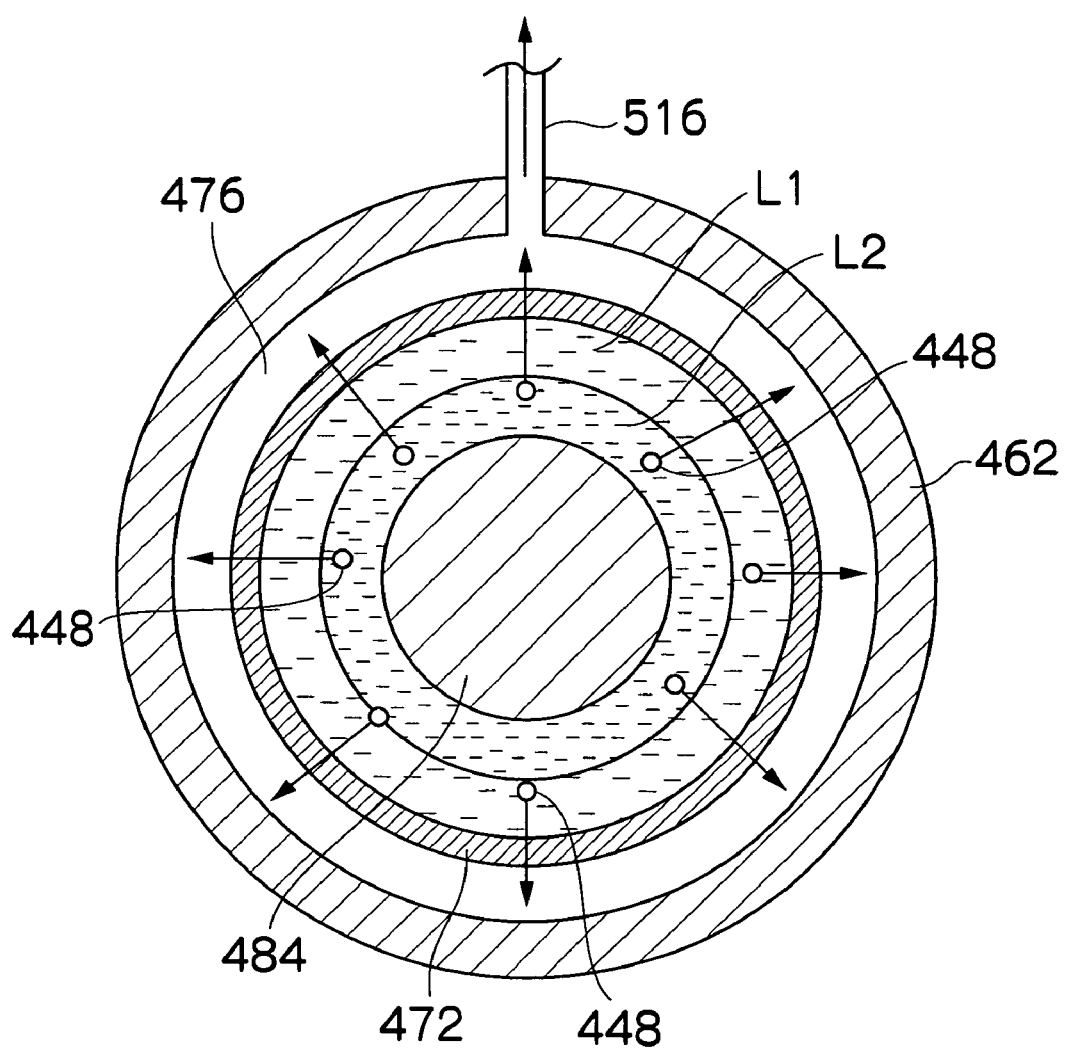
FIG. 23 is an illustrative view illustrating the flow of the circular microchannel when conducting a liquid-liquid reaction involving generation of by-product gas using the annular flow microreactor of the fourth embodiment of the present invention.

Given this fact, according to the annular flow microreactor 460 of the present invention into which a gas permeation member is incorporated, a liquid-liquid reaction is conducted by constituting the entire circular channel wall of the annular liquid channel 474 by a gas permeation member 472 which is permeable to liquid but impermeable to gas, and permeating only the by-product gas generated by the liquid-liquid reaction in the microchannel 502 to the annular cavity portion 476 via the gas permeation member 472. By this, as shown in FIG. 23, the bubbles 448 of the by-product gas generated by the liquid-liquid reaction of the liquid L1 and L2 are permeating through the gas permeation member 472, and then discharged to the annular cavity portion 476. The by-product gas discharged to the annular cavity portion 476 is discharged outside of the main body 461 via short pipe 516 with the gas flowing through the annular cavity portion 476.

According to this, also in the fourth embodiment of the present invention, even if by-product gas is generated by the liquid-liquid reaction of liquids L1 and L2 flowing through the annular liquid channel 474 in the minute microchannel 474 having, for example, an equivalent diameter of not more than 1 mm, the by-product gas can be efficiently degassed from the circular microchannel 502. Thus, a liquid-liquid reaction can be conducted without making the flow of the liquids L1 and L2 in the circular microchannel 502 unstable, even if a chemical reaction involving generation of by-product gas by a liquid-liquid reaction is conducted in the microreactor. Consequently, the equilibrium of the reaction is easily shifted to the direction where the reaction is promoted, and accurate control of the reaction temperature becomes easy.

Accordingly, even if by-product gas is generated in the step of preparing alloy particles in the production of magnetic particles, minute alloy particles excellent in monodispersibility can be prepared by using the microreactor 460 of the fourth embodiment of the present invention. As a result, high performance magnetic particles which can achieve sufficiently reduced noise of magnetic recording media can be produced.

EXAMPLES

Example 1

An Example in which a liquid-liquid reaction of two liquids L1 and L2 involving generation of by-product gas is conducted by using the laminate flow microreactor 200 described in the first embodiment of the present invention is illustrated below. As shown in FIGS. 14A and 14B, a main body 212 having a gas channel 250 formed on a lid member 224 and a Y-shaped liquid channel 230 formed on a main body member 222 was used.

(Fabrication of Microreactor)

The main body 212 of the microreactor 200 was fabricated by subjecting a transparent glass sheet to mechanical cutting. First, a glass plate for preparing main body member 222 was arranged and by using a diamond sintered microdrill in a machining center (MC system) made by PMT Corporation, a Y-shaped liquid channel 230 having two liquid supply channels 228 and a microchannel 226 was formed by cutting. The width of the liquid supply channel 228 was set to 250 μm and the depth thereof was set to 200 μm, and the width of the microchannel 226 was set to 500 μm and the depth thereof was set to 200 μm. At the end of each liquid supply channel 228, a liquid inlet port 234 of 1000 μm was opened so as to perforate through the glass plate. A Teflon tube (liquid supply pipe 214) having an outer diameter of 950 μm and an inner diameter of 250 μm was inserted to the two liquid inlet ports 234 and fixed by an adhesive. The end of the Teflon tube which was not connected to the liquid inlet port 234 was connected to a syringe pump 216 for liquid. In addition, at the terminal of the microchannel 226, a liquid discharge opening 232 of 1000 μm was opened so as to perforate through the glass plate, to which a Teflon tube having an outer diameter of 950 μm and an inner diameter of 250 μm was inserted and fixed by an adhesive.

On the other hand, a glass plate for fabricating a lid member 224 was subjected to the same mechanical cutting as in the main body member 222 to form a gas channel 250 having a gas supply channel 252 and a gas incorporation channel 254. Then, the lid member 224 was covered on the main body member 222 and adhered by an adhesive. By this, the gas incorporation channel 254 is integrally formed on the microchannel 226. The width of the gas channel 250 was set to 500 μm, which is the same as that of the microchannel 226, and the depth thereof was set to 160 μm. The depth of the gas channel 250 is 80% of the depth of the microchannel 226. A gas inlet port 240 was opened at the end of the gas supply channel 252 so as to perforate through the glass plate, and the diameter of the gas inlet port 240 was set to 1000 μm. A Teflon tube having an outer diameter of 950 μm and an inner diameter of 250 μm was inserted to the gas inlet port 240 and fixed by an adhesive. The end of the Teflon tube which was not connected to the gas inlet port 240 was connected to a syringe pump 220 for gas. In addition, at the terminal of the gas channel 250, a gas exhaust port 242 of 1000 μm was opened so as to perforate through the glass plate, to which a Teflon tube having an outer diameter of 950 μm and an inner diameter of 250 μm was inserted and fixed by an adhesive. A microreactor of the present invention was fabricated as above.

A liquid-liquid reaction involving generation of by-product gas was carried out using the microreactor 200 as follows. In this case, in order to create an annular flow when flowing liquids L1 and L2 and gas G in the microchannel 226, experimental control of the supply pressure and the supply flow rate of the gas G is necessary. The conditions were set, however, first by setting conditions under which a liquid-liquid reaction due to diffusion of liquids L1 and L2 to be reacted was finished, and then by flowing gas G to determining the supply pressure and the flow rate of the gas G at which the gas-liquid interface 248 became stable.

As the liquid-liquid reaction involving generation of by-product gas, a reaction experiment comprising allowing an aqueous manganese dioxide solution L1 in which 1 g of powdery manganese dioxide was dispersed in 100 ml of water and a hydrogen peroxide solution L2 to react to generate oxygen gas as by-product gas was conducted. The flow rates of the aqueous manganese dioxide solution L1 and the hydrogen peroxide solution L2 were set to 100 μl/min. The width and the depth of the liquid supply channel 228 and the width and the depth of the microchannel 226 were as defined above, and the length of the microchannel was 30 cm. The width and the depth of the gas channel 250 are as defined above.

The liquids L1 and L2 were combined at the microchannel 226 through the liquid supply channels 228 to conduct a liquid-liquid reaction, and generation of oxygen gas by the liquid-liquid reaction was observed. As a result, the volume of the gas generated with the progress of the liquid-liquid reaction increased and a gas-liquid mixed flow was found, which made the flow in the microchannel 226 uneven. In this circumstance, air was introduced to the liquids L1 and L2 flowing through the microchannel 226 from the gas inlet port 240 provided on the lid member 224, and the pressure of the air was gradually increased. Upon this, the flow changed from a slug flow to an annular flow, and a gas layer GL separated at the gas-liquid interface 248 was formed on the liquid layer LL. The oxygen gas generated by the liquid-liquid reaction ascended through the liquid layer LL and was incorporated into the gas layer GL, and could be discharged with gas G in a stable way from the gas exhaust port 242. When the flow was stable and annular, the pressure gauge 244 showed a pressure of the liquids L1 and L2 of 0.15 kg/cm$^2$ and a pressure of the air G of 0.20 kg/cm$^2$.

Example 2

An Example in which a liquid-liquid reaction of two liquids L1 and L2 involving generation of by-product gas is conducted by using the annular flow microreactor 400 incorporating a gas permeation member described in the third embodiment of the present invention is illustrated below. As shown in FIGS. 19A to 19C, a main body 412 having a Y-shaped cavity portion 436 formed on a lid member 420 and a Y-shaped liquid channel 430 formed on a main body member 421 was used.

(Fabrication of Microreactor)

The main body 412 of the microreactor 400 was fabricated by subjecting a transparent glass sheet to mechanical cutting. First, a glass plate for preparing main body member 422 was arranged and by using a diamond sintered microdrill in a machining center (MC system) made by PMT Corporation, a Y-shaped liquid channel 430 having two liquid supply channels 428 and a microchannel 426 was formed by cutting. The width of the liquid supply channel 428 was set to 250 μm and the depth thereof was set to 200 μm, and the width of the microchannel 426 was set to 500 μm and the depth thereof was set to 200 μm. And the length of the microchannel 426 was set to 30 cm.

On the other hand, a glass plate for fabricating a lid member 424 was subjected to the same mechanical cutting as in the main body member 422 to form a Y-shaped cavity portion 436 so as to be faced with the above-mentioned Y-shaped liquid channel 430. The channel width of the Y-shaped cavity portion 436 was set to be wider than the channel width of the Y-shaped liquid channel 430. With interposing a Gore-Tex (trademark) film (gas permeation member 418) between the main body member 422 and the lid member 424, the both were adhered by an adhesive in a way that the Y-shaped cavity portion 436 or the Y-shaped liquid channel 430 are not closed. Further, by sandwiching by a top plate 420 and a bottom plate 421 and tightening bolts 423 put in bolt holes formed at four corners of the top plate 420 and the bottom plate 421 with nuts 425, the main body 412 was assembled.

On the main body member 422 and the bottom plate 421, liquid inlet ports 434 and 434 of 1000 μm communicating with liquid supply channel 428 were previously formed. A Teflon tube (liquid supply pipe 414) having an outer diameter of 950 μm and an inner diameter of 250 μm was inserted to the respective liquid inlet ports 434 and 434 and fixed by an adhesive. The end of the Teflon tube which was not connected to the liquid inlet port 434 was connected to a syringe pump 416 for liquid. In addition, at the terminal of the microchannel 426, a liquid discharge opening 432 of 1000 μm was opened so as to perforate through the glass plate, to which a Teflon tube having an outer diameter of 950 μm and an inner diameter of 250 μm was inserted and fixed by an adhesive.

On the other hand, on the lid member 424 and the top plate 420, openings 438, 439 and 441 were opened in advance at the position corresponding to the three terminals of the Y-shaped cavity portion 436, and short pipes 438A, 439A and 441A were connected to the openings 438, 439 and 441, respectively. The short pipe 438A and 439A were exposed to ambient atmosphere and an aspirator (suction device 444) was connected to the short pipe 441A via suction pipe 442.

The pressure of the Y-shaped cavity portion 436 was reduced to 300 Torr. A laminate flow microreactor 400 for this Example was fabricated as above.

A conventional microreactor for comparison was fabricated in the same manner as in the microreactor of the present invention except that the main body was assembled by covering the opened surface of the main body member 422 on which the Y-shaped liquid channel 430 was formed by cutting by the lid member 424 (plate-like, without Y-shaped cavity portion 436).

Using the microreactor 400 of the present invention and the conventional microreactor fabricated as above, a liquid-liquid reaction was conducted by combining, at the microchannel 426, two liquids L1 and L2 which generate by-product gas by a liquid-liquid reaction through the liquid supply channels 428, and the change of flow in the microchannel 426 due to oxygen gas generated by the liquid-liquid reaction was observed.

As the liquid-liquid reaction involving generation of by-product gas, a reaction experiment comprising allowing an aqueous manganese dioxide solution L1 in which 1 g of powdery manganese dioxide was dispersed in 100 ml of water and a hydrogen peroxide solution L2 to react to generate oxygen gas as by-product gas was conducted. The flow rates of the aqueous manganese dioxide solution L1 and the hydrogen peroxide solution L2 were set to 100 μl/min.

As a result, in the conventional microreactor, bubbles 448 of oxygen gas generated by the liquid-liquid reaction were accumulated and formed large volumes in the microchannel 426, which turned the flow in the microchannel 426 into an extremely unstable slug flow.

On the other hand, according to the microreactor 400 of the present invention, bubbles 448 of oxygen gas generated by the liquid-liquid reaction ascended through the liquid and were smoothly permeated to the Y-shaped cavity portion 436 through the gas permeation member 418 (a Gore-Tex (trademark) film), and degassed from the microchannel 426. This made the flow in the microchannel 426 stable and a stable liquid-liquid reaction was achieved.

As described above, the microreactor of the present invention can smoothly discharge by-product gas generated in the microchannel outside of the microchannel even in a liquid-liquid reaction involving generation of by-product gas. Accordingly, by using the microreactor of the present invention, minute magnetic particles excellent in monodispersibility can be prepared even if by-product gas is generated in the step of preparing alloy particles in the production of magnetic particles. As a result, high performance magnetic particles which can achieve sufficiently reduced noise of magnetic recording media can be produced.

What is claimed is:

1. A method of producing magnetic particles, comprising the steps of:
preparing alloy particles capable of forming a CuAu or $Cu_3Au$ hard magnetic ordered alloy phase; and
forming magnetic particles,
wherein the step of preparing the alloy particles comprises subjecting a plurality of solutions for preparing the alloy particles to a mixing reaction by a liquid phase method using a microreactor, wherein the microreactor is a parallel-flow microreactor in which:
the plurality of solutions merge in one microchannel through respective liquid supply channels which form a parallel tube structure, and
each merged solution is passed in a parallel laminar flow while diffusing to the direction normal to the contact interface to mix with each other; where by-product gas is generated in the mixing reaction by the liquid phase method using the microreactor,
wherein the mixing reaction comprises the steps of:
supplying a gas unreactive to the solution to the microchannel to form a gas layer over a solution layer;
incorporating the by-product gas into the gas layer, the by-product gas being generated by the mixing reaction and ascending through the solution layer; and
discharging the by-product gas outside of the microchannel along with the gas unreactive to the solution.

2. The method of producing magnetic particles according to claim 1, wherein the gas is supplied to the microchannel to allow the gas layer to have a thickness of not less than 80% of the thickness of the solution layer.

3. A method of producing magnetic particles, comprising the steps of:
preparing alloy particles capable of forming a CuAu or $Cu_3Au$ hard magnetic ordered alloy phase; and
forming magnetic particles,
wherein the step of preparing the alloy particles comprises subjecting a plurality of solutions for preparing the alloy particles to a mixing reaction by a liquid phase method using a microreactor, wherein the microreactor is a concentric microreactor in which:
the plurality of solutions merge in one microchannel through respective liquid supply channels which form a concentric multi-cylindrical structure, and
each merged solution is passed in a concentric laminar flow while diffusing to the direction normal to the contact interface to mix with each other where by-product gas is generated in the mixing reaction by the liquid phase method using the microreactor,
wherein the mixing reaction comprises:
supplying a gas unreactive to the solution to the microchannel to form an annular gas layer outside of an annular solution layer formed by the concentric multi-cylindrical structure;
incorporating the by-product gas into the gas layer, the by-product gas being generated by the mixing reaction and ascending through the solution layer; and
discharging the by-product gas outside of the microchannel with the gas.

4. The method of producing magnetic particles according to claim 3, wherein the gas is supplied to the microchannel to allow the gas layer to have a thickness of not less than 80% of the thickness of the solution layer.

5. A method of producing magnetic particles, comprising the steps of:
preparing alloy particles capable of forming a CuAu or $Cu_3Au$ hard magnetic ordered alloy phase; and
forming magnetic particles,
wherein the step of preparing the alloy particles comprises subjecting a plurality of solutions for preparing the alloy particles to a mixing reaction by a liquid phase method using a microreactor, wherein the microreactor is a parallel-flow microreactor in which:
the plurality of solutions merge in one microchannel through respective liquid supply channels which form a parallel tube structure, and
each merged solution is passed in a parallel laminar flow while diffusing to the direction normal to the contact interface to mix with each other; where by-product gas is generated in the mixing reaction by the liquid phase method using the microreactor,
wherein the mixing reaction is conducted with constant permeation of the by-product gas generated with the progress of a liquid-liquid reaction of the plurality of solutions outside of the microchannel through a gas permeation member which is permeable to liquid but impermeable to gas.

6. The method of producing magnetic particles according to claim 5, wherein a first pressure in the microchannel and a second pressure outside the microchannel are relatively controlled to make the first pressure larger than the second pressure bordered by the gas permeation member.

7. A method of producing magnetic particles, comprising the steps of:

preparing alloy particles capable of forming a CuAu or $Cu_3Au$ hard magnetic ordered alloy phase; and forming magnetic particles, wherein the step of preparing the alloy particles comprises subjecting a plurality of solutions for preparing the alloy particles to a mixing reaction by a liquid phase method using a microreactor, wherein the microreactor is a concentric microreactor in which:

the plurality of solutions merge in one microchannel through respective liquid supply channels which form a concentric multi-cylindrical structure, and each merged solution is passed in a concentric laminar flow while diffusing to the direction normal to the contact interface to mix with each other, where by-product gas is generated in the mixing reaction by the liquid phase method using the microreactor, wherein the mixing reaction is conducted with constant permeation of the by-product gas generated with the progress of a liquid-liquid reaction of the plurality of solutions outside of the microchannel through a gas permeation member which is permeable to liquid but impermeable to gas.

8. The method of producing magnetic particles according to claim 7, wherein a first pressure in the microchannel and a second pressure outside the microchannel are relatively controlled to make the first pressure larger than the second pressure bordered by the gas permeation member.

\* \* \* \* \*